United States Patent
Kawamura et al.

(10) Patent No.: US 9,181,478 B2
(45) Date of Patent: Nov. 10, 2015

(54) FLUOROBIPHENYL-CONTAINING COMPOSITION

(71) Applicant: DIC Corporation, Tokyo (JP)

(72) Inventors: Joji Kawamura, Kita-adachi-gun (JP); Makoto Negishi, Kita-adachi-gun (JP); Masahiro Niwa, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 14/389,215

(22) PCT Filed: Dec. 27, 2012

(86) PCT No.: PCT/JP2012/083902
§ 371 (c)(1),
(2) Date: Sep. 29, 2014

(87) PCT Pub. No.: WO2014/102972
PCT Pub. Date: Jul. 3, 2014

(65) Prior Publication Data
US 2015/0053891 A1  Feb. 26, 2015

(51) Int. Cl.
*C09K 19/12* (2006.01)
*G02F 1/13* (2006.01)
*C09K 19/20* (2006.01)
*C09K 19/04* (2006.01)
*C09K 19/30* (2006.01)

(52) U.S. Cl.
CPC .............. *C09K 19/12* (2013.01); *C09K 19/20* (2013.01); *C09K 19/3003* (2013.01); *G02F 1/13* (2013.01); *C09K 2019/0466* (2013.01); *C09K 2019/122* (2013.01); *C09K 2019/123* (2013.01); *C09K 2019/3004* (2013.01); *C09K 2019/3016* (2013.01); *C09K 2019/3019* (2013.01); *C09K 2019/3027* (2013.01)

(58) Field of Classification Search
CPC ..................... C09K 19/0446; C09K 2019/123; C09K 2019/3004; C09K 2019/301; C09K 2019/3016; C09K 19/12; C09K 19/20; C09K 2019/0446; C09K 2019/3001; C09K 2019/3019
See application file for complete search history.

(56) References Cited

U.S. PATENT DOCUMENTS

2001/0038092 A1* 11/2001 Kondou et al. .......... 252/299.67
2001/0038891 A1* 11/2001 Kondou et al. ................ 428/1.1
2003/0186002 A1* 10/2003 Heckmeier et al. ............ 428/1.1
2005/0279968 A1 12/2005 Manabe et al.
2009/0314988 A1 12/2009 Kibe et al.
2011/0186776 A1 8/2011 Kuriyama et al.
2012/0138852 A1 6/2012 Yanai et al.
2012/0256124 A1 10/2012 Ohgiri et al.

FOREIGN PATENT DOCUMENTS

| JP | 10-101598 A | 4/1998 |
|----|----|----|
| JP | 2009-191264 A | 8/2009 |
| JP | 2010-006853 A | 1/2010 |
| JP | 2012-117062 A | 6/2012 |
| JP | 2012-121964 A | 6/2012 |
| KR | 2005-0057653 A | 6/2005 |
| TW | 201202399 A | 1/2012 |
| TW | 201245427 A | 11/2012 |

OTHER PUBLICATIONS

International Search Report dated Jan. 29, 2013, issued in corresponding application No. PCT/JP2012/083902.

\* cited by examiner

*Primary Examiner* — Shean C Wu
(74) *Attorney, Agent, or Firm* — Westerman, Hattori, Daniels & Adrian, LLP

(57) ABSTRACT

A composition contains three or more compounds represented by general formula (i) below.

[Chem. 1]

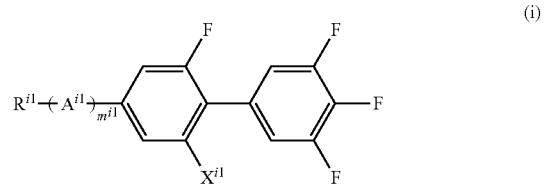

(i)

(In the formula, $R^{i1}$ represents an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—; $m^{i1}$ represents 1 or 2; $A^{i1}$ represents a 1,4-cyclohexylene group or a 1,4-phenylene group which may have a fluorine atom or a chlorine atom substituted for a hydrogen atom, when $m^{i1}$ represents 1, $A^{i1}$ represents a 1,4-phenylene group which may have a fluorine atom or a chlorine atom substituted for a hydrogen atom, and when $m^{i1}$ represents 2 and a plurality of $A^{i1}$ are present, $A^{i1}$ may be the same or different, and $X^{i1}$ represents a hydrogen atom, a fluorine atom, or a chlorine atom.)

8 Claims, 1 Drawing Sheet

FLUOROBIPHENYL-CONTAINING COMPOSITION

TECHNICAL FIELD

The present invention relates to a nematic liquid crystal composition particularly useful as a liquid crystal display material and exhibiting a positive value of dielectric anisotropy ($\Delta\varepsilon$).

BACKGROUND ART

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a vertical alignment mode using TFT (thin-film transistor), an IPS (in-plane switching) mode, and the like. Liquid crystal compositions used for these liquid crystal display devices are required to have stability to external stimuli such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have optimum values of dielectric anisotropy ($\Delta\varepsilon$), refractive index anisotropy ($\Delta n$), etc. for a display device.

A horizontal alignment-mode display, such as a TN mode, a STN mode, an IPS (in-plane switching) mode, FFS (fringe field switching-mode liquid crystal display device), or the like, uses a liquid crystal composition having positive $\Delta\varepsilon$. Also, there has been reported a driving method in which a liquid crystal composition having positive $\Delta\varepsilon$ is vertically aligned with no voltage applied, and display is performed by applying a transverse electric field, and the need for a liquid crystal composition having positive $\Delta\varepsilon$ is further increased.

In addition, low-voltage driving, fast response, and a wide operating temperature range are required for all driving methods. That is, a large absolute value of positive $\Delta\varepsilon$, low viscosity ($\eta$), and a high nematic-isotropic liquid phase transition temperature (Tni) are required. Also, in view of setting of $\Delta n \times d$ which is the product of $\Delta n$ and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low rotational viscosity ($\gamma_1$) is required.

A liquid crystal composition disclosed as a configuration of a liquid crystal composition contains, for example, a compound represented by general formula (A-1) below and a compound represented by general formula (A-2) below, which are liquid crystal compounds having positive $\Delta\varepsilon$ (refer to Patent Literature 1).

[Chem. 1]

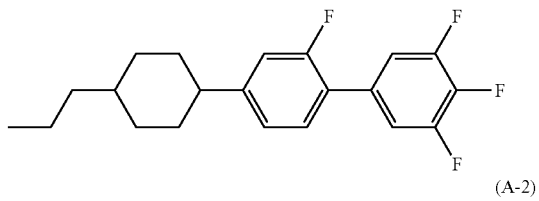

(A-1)

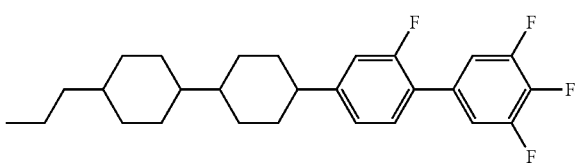

(A-2)

Also, a liquid crystal composition containing a compound represented by formula (A-3) below is disclosed (refer to Patent Literature 2).

[Chem. 2]

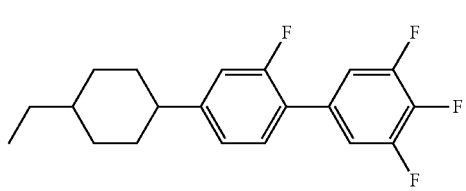

(A-3)

One of the characteristics of these liquid crystal compositions is that they contain one or two tricyclic or tetracyclic compounds having a 2,3',4',5'-tetrafluorobiphenyl structure.

On the other hand, with expanding application of liquid crystal display devices, significant changes are found in use method and manufacturing method thereof. In order to cope with these changes, it is demanded to optimize characteristics other than basic physical property values which have been known. That is, VA-mode and IPS-mode liquid crystal display devices using liquid crystal compositions are widely used, and supersized liquid crystal devices of 50 inches or more are put into practical application. With increases in substrate size, instead of a usual vacuum injection method, a one drop fill (ODF) method becomes the mainstream of a method of injecting a liquid crystal composition into a substrate. However, when a liquid crystal composition is dropped on a substrate, the problem of degrading display quality by dropping marks is surfaced.

Further, in a process of manufacturing a liquid crystal display device by the ODF method, it is necessary to drop a liquid crystal in an optimum amount according to the size of a liquid crystal display device. A large deviation of the dropping amount from the optimum value disrupts a balance between previously designed refractive index and driving electric field of a liquid crystal display device and causes the occurrence of spots and display defects such as contrast defect and the like. In particular, small liquid crystal display devices in heavy use for recently popular smart phones have a small optimum amount of liquid crystal filling, and thus it is difficult to control a deviation from the optimum value within a predetermined range.

Therefore, in order to maintain liquid crystal display devices in high yield, for example, there is the necessity for the performance of being little influenced by a rapid pressure change and impact produced in a dropping apparatus during dropping of a liquid crystal, and being capable of continuous stable dropping over a long time.

Accordingly, for liquid crystal compositions used for active matrix drive liquid crystal display devices which are driven with TFT elements or the like, developments are being required in view of a method for manufacturing a liquid crystal display device in addition to the characteristic of having high resistivity or high voltage holding ratio, and stability to external stimuli such as light, heat, and the like, which has been regarded as important, while maintaining the characteristics and performance, such as fast response and the like, which are required for liquid crystal display devices.

CITATION LIST

Patent Literature

PTL 1: Japanese Unexamined Patent Application Publication No. 2003-301178
PTL 2: Japanese Unexamined Patent Application Publication (Translation of PCT Application) No. 10-504032

SUMMARY OF INVENTION

Technical Problem

A problem to be solved by the invention is to provide a composition exhibiting a liquid crystal composition value of positive $\Delta \in$ and stability to heat and light.

Solution to Problem

As a result of research on various compounds, the inventors of the present invention found that the problem can be resolved by combining specified compounds, leading to the achievement of the present invention.

That is, the present invention provides a composition containing three or more compounds represented by general formula (i) below.

[Chem. 3]

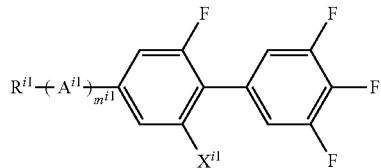

(i)

(In the formula, $R^{i1}$ represents an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—; $m^{i1}$ represents 1 or 2; $A^{i1}$ represents a 1,4-cyclohexylene group or a 1,4-phenylene group which may have a fluorine atom or a chlorine atom substituted for a hydrogen atom, when $m^{i1}$ represents 1, $A^{i1}$ represents a 1,4-phenylene group which may have a fluorine atom or a chlorine atom substituted for a hydrogen atom, and when $m^{i1}$ represents 2 and a plurality of $A^{i1}$ are present, $A^{i1}$ may be the same or different, and $X^{i1}$ represents a hydrogen atom, a fluorine atom, or a chlorine atom.)

Advantageous Effects of Invention

A composition according to the present invention can obtain low viscosity and exhibits a stable nematic phase at a low temperature and very small changes in resistivity and voltage holding ratio after heating and UV irradiation, and thus has high practicability for products, and a TN-mode liquid crystal display device and the like using the composition can achieve fast response. Also, the composition of the present invention is very useful because it can stably exhibit its performance in a process for manufacturing a liquid crystal display device, and thus display defects due to the manufacturing process are suppressed, thereby permitting manufacture of a liquid crystal display device in high yield.

DESCRIPTION OF EMBODIMENTS

Figure 1:
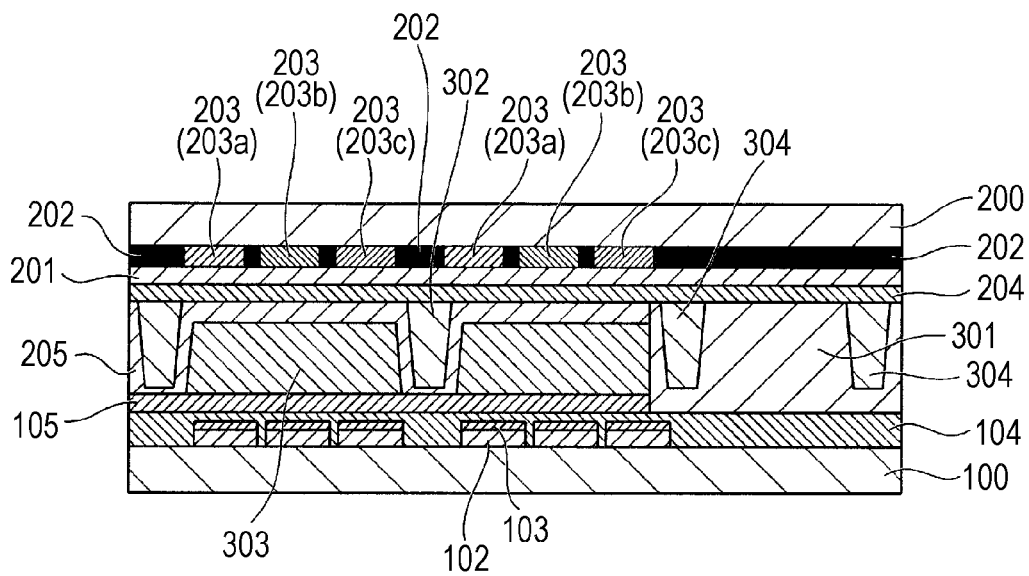
FIG. 1 is a sectional view of a liquid crystal display device of the present invention. A substrate denoted by 100 to 105 is referred to as a "back plane", and a substrate denoted by 200 to 205 is referred to as a "front plane".

A composition of the present invention contains three or more compounds represented by general formula (i) below.

[Chem. 4]

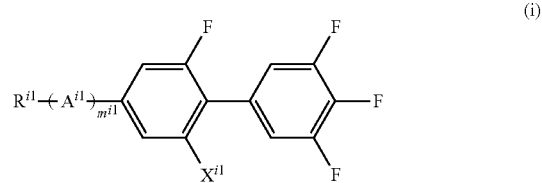

(i)

(In the formula, $R^{i1}$ represents an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—; $m^{i1}$ represents 1 or 2; $A^{i1}$ represents a 1,4-cyclohexylene group or a 1,4-phenylene group which may have a fluorine atom or a chlorine atom substituted for a hydrogen atom, when $m^{i1}$ represents 1, $A^{i1}$ represents a 1,4-phenylene group which may have a fluorine atom or a chlorine atom substituted for a hydrogen atom, and when $m^{i1}$ represents 2 and a plurality of $A^{i1}$ are present, $A^{i1}$ may be the same or different, and $X^{i1}$ represents a hydrogen atom, a fluorine atom, or a chlorine atom.)

In the general formula (i), $A^{i1}$ represents a 1,4-cyclohexylene group or a 1,4-phenylene group which may have a fluorine atom or a chlorine atom substituted for a hydrogen atom, a 1,4-cyclohexylene group or a 1,4-phenylene group is preferred, and when solubility is regarded as important, a 1,4-cyclohexylene group is more preferred. In the specification, a 1,4-cyclohexylene group is preferably a trans-1,4-cyclohexylene group.

When $m^{i1}$ represents 1, $A^{i1}$ represents a 1,4-phenylene group which may have a fluorine atom or a chlorine atom substituted for a hydrogen atom.

When $m^{i1}$ represents 2 and a plurality of $A^{i1}$ are present, $A^{i1}$ may be the same or different and are preferably the same. Also, when $m^{i1}$ represents 2, $A^{i1}$ are preferably 1,4-cyclohexylene groups.

That is, the composition of the present invention more preferably contains at least one compound represented by general formula (i-2) below and at least one compound represented by general formula (i-1) below as compounds represented by the general formula (i).

[Chem. 5]

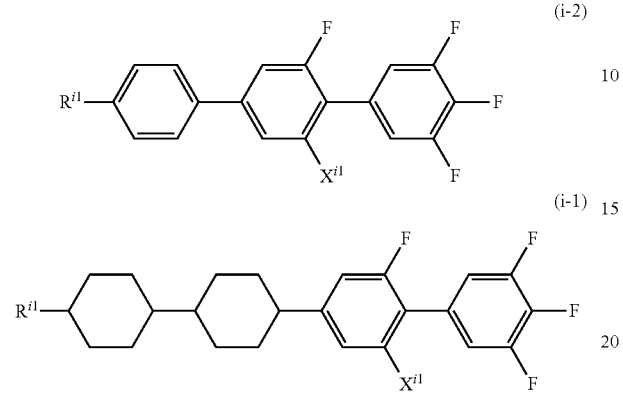

(In the formulae, $R^{i1}$ represents the same meaning as $R^{i1}$ in the general formula (i), and $X^{i1}$ represents the same meaning as $X^{i1}$ in the general formula (i).)

In the general formula (i-2), $R^{i1}$ represents an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—.

An alkyl group having 1 to 8 carbon atoms is preferably a linear alkyl group or a linear alkenyl group having 1 to 8 carbon atoms, more preferably a linear alkyl group having 1 to 5 carbon atoms or a linear alkenyl group having 1 to 5 carbon atoms, and particularly preferably a methyl group, an ethyl group, a propyl group, a butyl group, a pentyl group, or a structure below.

[Chem. 6]

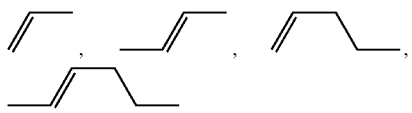

(In the formulae, the right end is bonded to a ring structure.)

When improvement in response speed is regarded as important, an alkenyl group is preferred, and when reliability of a voltage holding ratio and the like of a liquid crystal composition is regarded as important, an alkyl group is preferred. $X^{i1}$ is preferably a hydrogen atom or a fluorine atom, and when compatibility with other compounds (precipitation or separation of crystals of a liquid crystal composition does not occur at a low temperature) is regarded as important, $X^{i1}$ is preferably a hydrogen atom, while when it is regarded as important to decrease a value of Δ∈, $X^{i1}$ is preferably a fluorine atom.

In the general formula (i-2), $X^{i1}$ represents a hydrogen atom, a fluorine atom, or a chlorine atom, and is preferably a hydrogen atom or a fluorine atom.

Examples of a compound represented by the general formula (i-2) include the following compounds.

[Chem. 7]

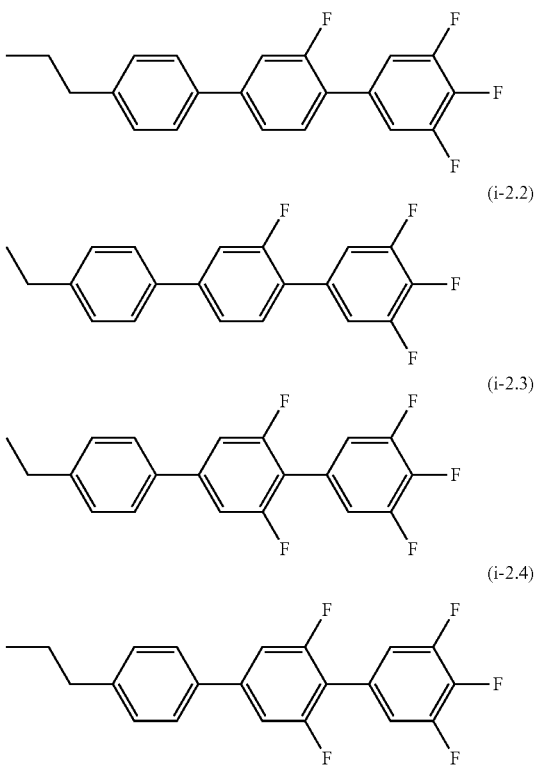

The types of compounds which can be combined are not particularly limited, but at least three compounds are preferably contained, three or four compounds are preferably contained, and three compounds are more preferably contained. It is necessary to adjust the content of each of the compounds having these structures with attention to solubility, and the lower limit value of the content of a compound represented by formula (i-2.2) relative to the total amount of the composition of the present invention is preferably 1% by mass and preferably 2% by mass, and the upper limit value is preferably 20% by mass, preferably 15% by mass, preferably 10% by mass, and preferably 8% by mass. The lower limit value of the content of a compound represented by formula (i-2.1) relative to the total amount of the composition of the present invention is preferably 1% by mass, preferably 2% by mass, preferably 3% by mass, preferably 5% by mass, and preferably 6% by mass, and the upper limit value is preferably 20% by mass, preferably 15% by mass, preferably 13% by mass, preferably 12% by mass, and preferably 10% by mass. The lower limit value of the content of a compound represented by formula (i-2.3) relative to the total amount of the composition of the present invention is preferably 1% by mass, preferably 2% by mass, preferably 3% by mass, preferably 5% by mass, and preferably 6% by mass, and the upper limit value is preferably 20% by mass, preferably 15% by mass, preferably 13% by mass, preferably 12% by mass, preferably 10% by mass, and preferably 8% by mass. The lower limit value of the content of a compound represented by formula (i-2.4) relative to the total amount of the composition of the present invention is preferably 1% by mass, preferably 2% by mass, and preferably 3% by mass, and the upper limit value is preferably 20% by mass, preferably 15% by mass, preferably 10% by mass, preferably 8% by mass, preferably 6% by mass, and preferably 5% by mass.

In the general formula (i-1), $R^{i1}$ and $X^{i1}$ each represent the same as in the general formula (i-2).
Examples of a compound represented by the general formula (i-1) include the following compounds.
[Chem. 8]
(i-1.1)
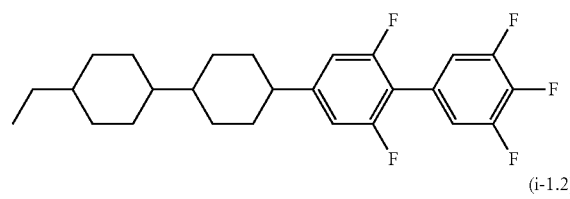
(i-1.2)
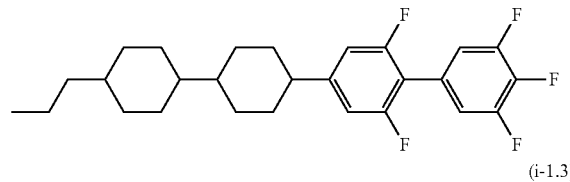
(i-1.3)
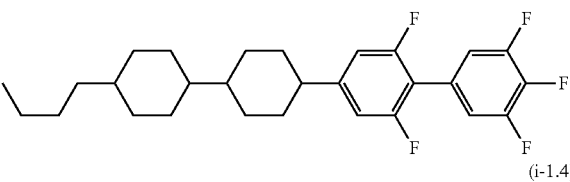
(i-1.4)
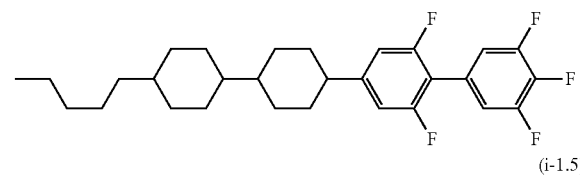
(i-1.5)
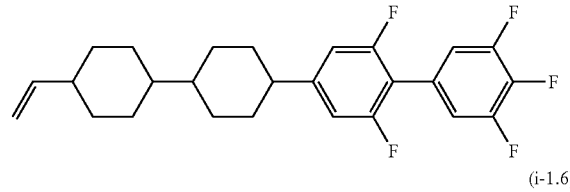
(i-1.6)
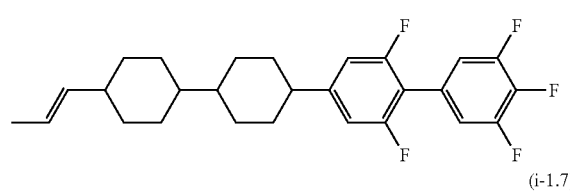
(i-1.7)
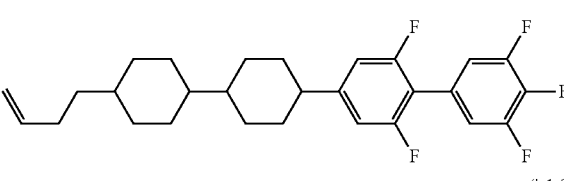
(i-1.8)
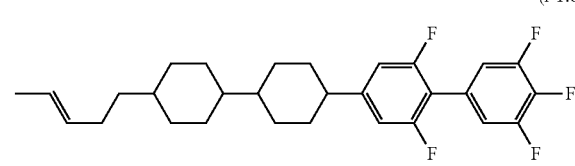
-continued
[Chem.9]
(i-1.9)
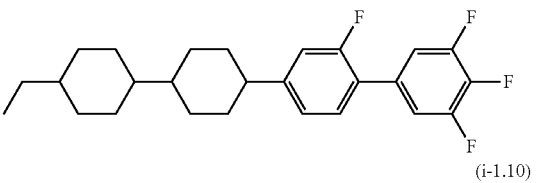
(i-1.10)
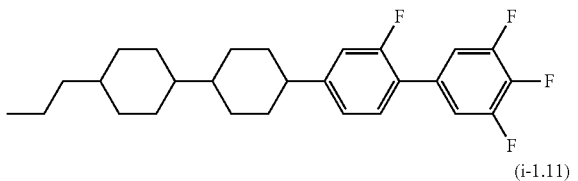
(i-1.11)
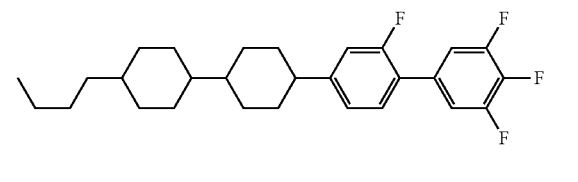
(i-1.12)
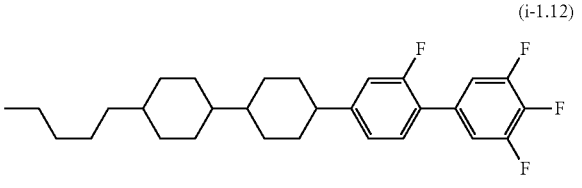
(i-1.13)
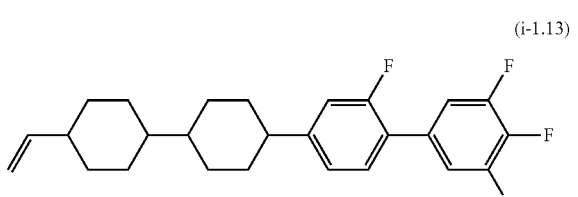
(i-1.14)
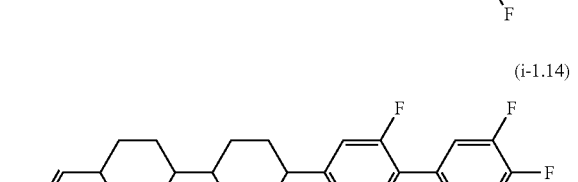
(i-1.15)
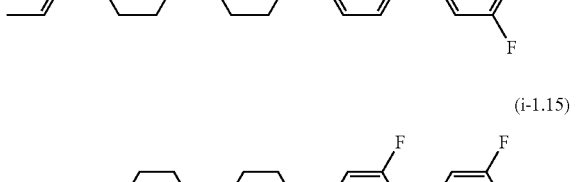
(i-1.16)
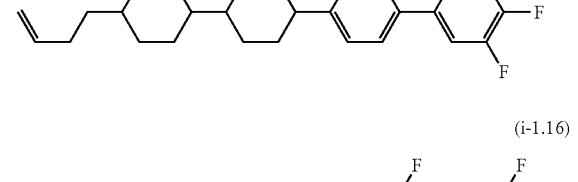
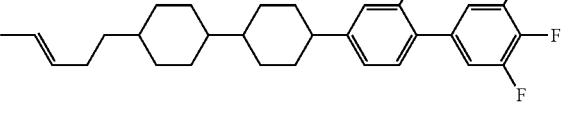

Also, examples of a compound represented by the general formula (i) include the following compounds.
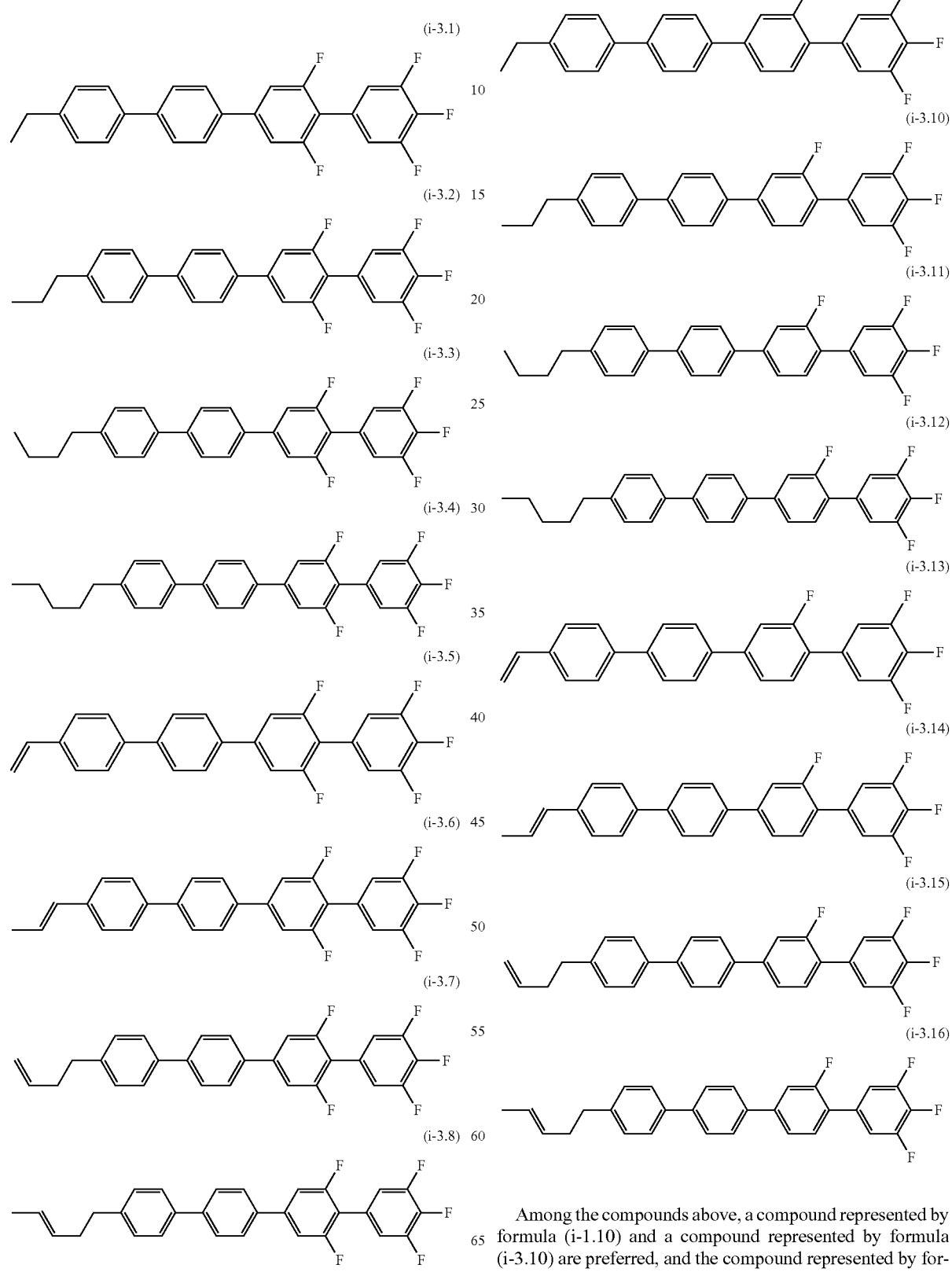
Among the compounds above, a compound represented by formula (i-1.10) and a compound represented by formula (i-3.10) are preferred, and the compound represented by formula (i-1.10) is particularly preferred.

In the composition of the present invention, compounds represented by the general formula (i) may be used lone but are preferably used in combination of two or more when compatibility with other compounds is regarded as important. It is preferred to use two or more and five or less compounds represented by the general formula (i-1), it is preferred to use two or more and five or less compounds represented by the general formula (i-2), and it is also preferred to combine a compound represented by the general formula (i-1) a compound represented by the general formula (i-2).

Preferred combinations include a combination of a compound represented by the formula (i-2.1), a compound represented by the formula (i-2.2), and a compound represented by the formula (i-1.7), a combination of a compound represented by the formula (i-2.1), a compound represented by the formula (i-2.2), and a compound represented by the formula (i-2.4), and a combination of a compound represented by the formula (i-2.1), a compound represented by the formula (i-2.3), and a compound represented by the formula (i-1.10).

The lower limit value of the content of a compound represented by the general formula (i) relative to the total amount of the composition of the present invention is preferably 2% by mass, preferably 5% by mass, more preferably 7% by mass, more preferably 8% by mass, and more preferably 10% by mass, and the upper limit value is preferably 30% by mass, more preferably 25% by mass, more preferably 23% by mass, and more preferably 20% by mass.

The lower limit value of the content of the compound represented by the formula (i-2.1) relative to the total amount of the composition of the present invention is preferably 1% by mass and preferably 2% by mass, and the upper limit value is preferably 13% by mass and preferably 10% by mass.

The lower limit value of the content of the compound represented by the formula (i-2.2) relative to the total amount of the composition of the present invention is preferably 1% by mass and preferably 2% by mass, and the upper limit value is preferably 12% by mass and preferably 10% by mass.

The lower limit value of the content of the compound represented by the formula (i-2.3) relative to the total amount of the composition of the present invention is preferably 1% by mass, preferably 2% by mass, preferably 3% by mass, and preferably 5% by mass, and the upper limit value is preferably 10% by mass and preferably 8% by mass.

The lower limit value of the content of the compound represented by the formula (i-2.4) relative to the total amount of the composition of the present invention is preferably 1% by mass, preferably 2% by mass, and preferably 3% by mass, and the upper limit value is preferably 7% by mass and preferably 5% by mass.

The lower limit value of the content of a compound represented by the general formula (i) relative to the total amount of the composition of the present invention is preferably 8% by mass, preferably 10% by mass, preferably 12% by mass, and preferably 13% by mass, and the upper limit value is preferably 30% by mass, preferably 27% by mass, and preferably 25% by mass.

Preferred combinations of compounds represented by the general formula (i) include a combination of a compound represented by the formula (i-1.10), a compound represented by the formula (i-2.1), and a compound represented by the formula (i-2.2), a combination of a compound represented by the formula (i-2.4), a compound represented by the formula (i-2.1), and a compound represented by the formula (i-2.2), and a combination of a compound represented by the formula (i-1.10), a compound represented by the formula (i-2.1), and a compound represented by the formula (i-2.3).

In the case of a combination of a compound represented by the formula (i-1.10), a compound represented by the formula (i-2.1), and a compound represented by the formula (i-2.2), the lower limit value of the total content of these compounds relative to the total amount of the composition of the present invention is preferably 8% by mass, preferably 10% by mass, preferably 12% by mass, and preferably 15% by mass, and the upper limit value is preferably 30% by mass, preferably 27% by mass, and preferably 25% by mass. In the case of a combination of a compound represented by the formula (i-2.4), a compound represented by the formula (i-2.1), and a compound represented by the formula (i-2.2), the lower limit value of the total content of these compounds relative to the total amount of the composition of the present invention is preferably 5% by mass, preferably 7% by mass, preferably 10% by mass, and preferably 13% by mass, and the upper limit value is preferably 25% by mass, preferably 20% by mass, preferably 18% by mass, and preferably 16% by mass. In the case of a combination of a compound represented by the formula (i-1.10), a compound represented by the formula (i-2.1), and a compound represented by the formula (i-2.3), the lower limit value of the total content of these compounds relative to the total amount of the composition of the present invention is preferably 5% by mass, preferably 7% by mass, preferably 10% by mass, preferably 13% by mass, and preferably 15% by mass, and the upper limit value is preferably 30% by mass, preferably 25% by mass, preferably 23% by mass, preferably 21% by mass, and preferably 19% by mass.

The liquid crystal composition of the present invention can also contain one or two or more compounds represented by general formula (L).

[Chem. 12]

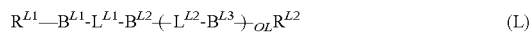
$$R^{L1}-B^{L1}-L^{L1}-B^{L2}-(-L^{L2}-B^{L3}-)_{OL}R^{L2} \qquad (L)$$

(In the formula, $R^{L1}$ and $R^{L2}$ each independently represent an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$ and $B^{L3}$ each independently represent a group selected from the group consisting of:

(a) a 1,4-cyclohexylene group (one —$CH_2$— or nonadjacent two or more —$CH_2$— present in the group may be substituted by —O—); and (b) a 1,4-phenylene group (one —CH= or nonadjacent two or more —CH= present in the group may be substituted by —N=), and the group (a) and the group (b) may be each independently substituted by a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—; and when OL is 2 or 3 and a plurality of $L^{L2}$ are present, $L^{L2}$ may be the same or different, and when OL is 2 or 3 and a plurality of $B^{L3}$ are present, $B^{L3}$ may be the same or different, the compounds represented by the general formula (i) being excluded.)

The types of compounds which can be combined are not particularly limited, but compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6. According to a further embodiment of the present invention, the number of the types is 7. According to a further embodiment of the present invention, the number of the types is 8. According to a further embodiment of the present invention, the number of the types is 9. According to a further embodiment of the present invention, the number of the types is 10 or more.

In the liquid crystal composition of the present invention, it is necessary to properly adjust the content of the compound represented by the general formula (L) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 1%. According to another embodiment of the present invention, the lower limit value is 10%. According to still another embodiment of the present invention, the lower limit value is 20%. According to a further embodiment of the present invention, the lower limit value is 30%. According to a further embodiment of the present invention, the lower limit value is 40%. According to a further embodiment of the present invention, the lower limit value is 50%. According to a further embodiment of the present invention, the lower limit value is 55%. According to a further embodiment of the present invention, the lower limit value is 60%. According to a further embodiment of the present invention, the lower limit value is 65%. According to a further embodiment of the present invention, the lower limit value is 70%. According to a further embodiment of the present invention, the lower limit value is 75%. According to a further embodiment of the present invention, the lower limit value is 80%.

Further, for example, according to an embodiment of the present invention, the upper limit value of the preferred content relative to the total amount of the liquid crystal composition of the present invention is 95%. According to another embodiment of the present invention, the upper limit value is 85%. According to still another embodiment of the present invention, the upper limit value is 75%. According to a further embodiment of the present invention, the upper limit value is 65%. According to a further embodiment of the present invention, the upper limit value is 55%. According to a further embodiment of the present invention, the upper limit value is 45%. According to a further embodiment of the present invention, the upper limit value is 35%. According to a further embodiment of the present invention, the upper limit value is 25%.

When the viscosity of the liquid crystal composition of the present invention is kept low and the liquid crystal composition having fast response is required, both the lower limit value and the upper limit value are preferably high. Further, when Tni of the liquid crystal composition of the present invention is kept high, and the liquid crystal composition having good temperature stability is required, both the lower limit value and the upper limit value are preferably high. In addition, when it is desired to increase dielectric anisotropy for keeping the drive voltage low, both the lower limit value and the upper limit value are preferably low.

When a ring structure to which each of $R^{L1}$ and $R^{L2}$ is bonded is a phenyl group (aromatic), $R^{L1}$ and $R^{L2}$ are each preferably a linear alkyl group having 1 to 5 carbon atoms, a linear alkoxy group having 1 to 4 (or more) carbon atoms, or an alkenyl group having 4 to 5 carbon atoms, while when a ring structure to which each of $R^{L1}$ and $R^{L2}$ is bonded is a saturated ring structure, such as cyclohexane, pyran, or dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

When the liquid crystal composition is required to have chemical stability, the compound represented by the general formula (L) preferably does not contain a chlorine atom in its molecule.

The compound represented by the general formula (L) is preferably, for example, a compound selected from a compound group represented by general formula (I).

[Chem. 13]

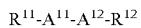

$$R^{11}\text{-}A^{11}\text{-}A^{12}\text{-}R^{12} \qquad (I)$$

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms, and $A^{11}$ and $A^{12}$ each independently represent a 1,4-cyclohexylene group, a 1,4-phenylene group, a 2-fluoro-1,4-phenylene group, or a 3-fluoro-1,4-phenylene group.)

The types of compounds which can be combined are not particularly limited, but compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In the liquid crystal composition of the present invention, it is necessary to properly adjust the content of the compound represented by the general formula (I) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 3%. According to another embodiment of the present invention, the lower limit value is 15%. According to still another embodiment of the present invention, the lower limit value is 18%. According to a further embodiment of the present invention, the lower limit value is 20%. According to a further embodiment of the present invention, the lower limit value is 29%. According to a further embodiment of the present invention, the lower limit value is 35%. According to a further embodiment of the present invention, the lower limit value is 42%. According to a further embodiment of the present invention, the lower limit value is 47%. According to a further embodiment of the present invention, the lower limit value is 53%. According to a further embodiment of the present invention, the lower limit value is 56%. According to a further embodiment of the present invention, the lower limit value is 60%. According to a further embodiment of the present invention, the lower limit value is 65%.

Further, for example, according to an embodiment of the present invention, the upper limit value of the preferred content relative to the total amount of the liquid crystal composition of the present invention is 75%. According to another embodiment of the present invention, the upper limit value is 65%. According to still another embodiment of the present invention, the upper limit value is 55%. According to a further embodiment of the present invention, the upper limit value is 50%. According to a further embodiment of the present invention, the upper limit value is 45%. According to a further embodiment of the present invention, the upper limit value 40%. According to a further embodiment of the present invention, the upper limit value is 35%. According to a further embodiment of the present invention, the upper limit value is 30%.

When the viscosity of the liquid crystal composition is kept low and the liquid crystal composition having fast response is required, both the lower limit value and the upper limit value are preferably high. Further, when Tni of the liquid crystal composition of the present invention is kept high, and the liquid crystal composition having good temperature stability is required, both the lower limit value and the upper limit value are preferably medium. In addition, when it is desired to increase dielectric anisotropy for keeping the drive voltage low, both the lower limit value and the upper limit value are preferably low.

Further the compound represented by the general formula (I) is preferably a compound selected from a compound group represented by general formula (I-1).

[Chem. 14]

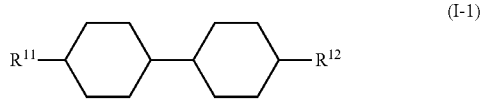

(I-1)

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms.)

The types of compounds which can be combined are not particularly limited, but compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

In the liquid crystal composition of the present invention, it is necessary to properly adjust the content of the compound represented by the general formula (I-1) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 3%. According to another embodiment of the present invention, the lower limit value is 15%. According to still another embodiment of the present invention, the lower limit value is 18%. According to a further embodiment of the present invention, the lower limit value is 25%. According to a further embodiment of the present invention, the lower limit value is 29%. According to a further embodiment of the present invention, the lower limit value is 31%. According to a further embodiment of the present invention, the lower limit value is 35%. According to a further embodiment of the present invention, the lower limit value is 43%. According to a further embodiment of the present invention, the lower limit value is 47%. According to a further embodiment of the present invention, the lower limit value is 50%. According to a further embodiment of the present invention, the lower limit value is 53%. According to a further embodiment of the present invention, the lower limit value is 56%.

Further, for example, according to an embodiment of the present invention, the upper limit value of the preferred content relative to the total amount of the liquid crystal composition of the present invention is 70%. According to another embodiment of the present invention, the upper limit value is 60%. According to still another embodiment of the present invention, the upper limit value is 50%. According to a further embodiment of the present invention, the upper limit value is 45%. According to a further embodiment of the present invention, the upper limit value is 40%. According to a further embodiment of the present invention, the upper limit value 35%. According to a further embodiment of the present invention, the upper limit value is 30%. According to a further embodiment of the present invention, the upper limit value is 26%.

When the viscosity of the liquid crystal composition of the present invention is kept low and the liquid crystal composition having fast response is required, both the lower limit value and the upper limit value are preferably high. Further, when Tni of the liquid crystal composition of the present invention is kept high and the liquid crystal composition having good temperature stability is required, both the lower limit value and the upper limit value are preferably medium. In addition, when it is desired to increase dielectric anisotropy for keeping the drive voltage low, both the lower limit value and the upper limit value are preferably low.

The compound represented by the general formula (I-1) is preferably a compound selected from a compound group represented by general formula (I-1-1).

[Chem. 15]

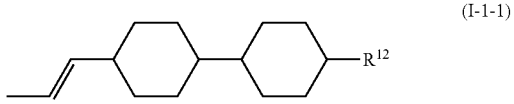

(I-1-1)

(In the formula, $R^{12}$ represents an alkyl group having 1 to 5 carbon atoms, an alkenyl group having 2 to 5 carbon atoms, or an alkoxy group having 1 to 5 carbon atoms.)

In the liquid crystal composition of the present invention, it is necessary to properly adjust the content of a compound represented by the general formula (I-1-1) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 2%. According to another embodiment of the present invention, the lower limit value is 4%. According to still another embodiment of the present invention, the lower limit value is 7%. According to a further embodiment of the present invention, the lower limit value is 11%. According to a further embodiment of the present invention, the lower limit value is 13%. According to a further embodiment of the present invention, the lower limit value is 15%. According to a further embodiment of the present invention, the lower limit value is 17%. According to a further embodiment of the present invention, the lower limit value is 20%. According to a further embodiment of the present invention, the lower limit value is 25%. According to a further embodiment of the present invention, the lower limit value is 30%. According to a further embodiment of the present invention, the lower limit value is 32%. According to a further embodiment of the present invention, the lower limit value is 35%.

For example, according to an embodiment of the present invention, the upper limit value of the preferred content relative to the total amount of the liquid crystal composition of the present invention is 60%. According to another embodiment of the present invention, the upper limit value is 50%. According to still another embodiment of the present invention, the upper limit value of is 40%. According to a further embodiment of the present invention, the upper limit value is 35%. According to a further embodiment of the present invention, the upper limit value is 30%. According to a further embodiment of the present invention, the upper limit value is 25%. According to a further embodiment of the present invention, the upper limit value is 20%. According to a further embodiment of the present invention, the upper limit value is 15%.

Further, the compound represented by the general formula (I-1-1) is preferably a compound selected from a compound group represented by formula (1.1) to formula (1.3), a compound represented by the formula (1.2) or the formula (1.3) is preferred, and in particular, the compound represented by the formula (1.3) is more preferred.

[Chem. 16]

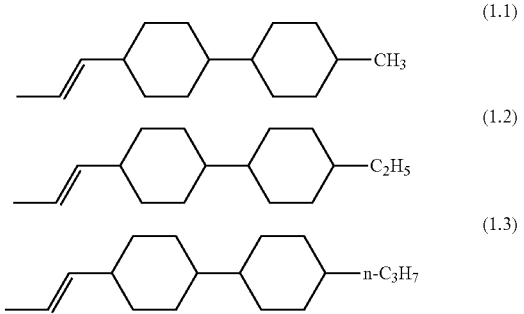

When the compounds represented by the formula (1.2) and the formula (1.3) are used singly, the compound represented by the formula (1.2) preferably has a slightly high content because it has the effect of improving the response speed, and the compound represented by the formula (1.3) preferably has a content within a range described below because a liquid crystal composition having fast response and high electric and optical reliability can be produced.

The content of the compound represented by the formula (1.3) relative to the total amount of the liquid crystal composition of the present invention is preferably 5% by mass or more, more preferably 7% by mass or more, even more preferably 9% by mass or more, still more preferably 11% by mass or more, and particularly preferably 15% by mass or more. The maximum allowable content is preferably 35% by mass or less, more preferably 25% by mass or less, and still more preferably 20% by mass or less.

Further, the compound represented by the general formula (I-1) is preferably a compound selected from a compound group represented by general formula (I-1-2).

[Chem. 17]

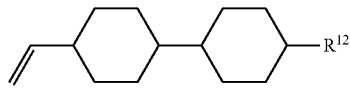

(In the formula, $R^{12}$ represents an alkyl group having 1 to 5 carbon atoms, an alkoxy group having 1 to 5 carbon atoms, or an alkenyl group having 2 to 5 carbon atoms.)

The types of compounds which can be combined are not particularly limited, but compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3.

In the liquid crystal composition of the present invention, it is necessary to properly adjust the content of a compound represented by the general formula (I-1-2) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 7%. According to another embodiment of the present invention, the lower limit value is 15%. According to still another embodiment of the present invention, the lower limit value is 18%. According to a further embodiment of the present invention, the lower limit value is 21%. According to a further embodiment of the present invention, the lower limit value is 24%. According to a further embodiment of the present invention, the lower limit value is 27%. According to a further embodiment of the present invention, the lower limit value is 30%. According to a further embodiment of the present invention, the lower limit value is 34%. According to a further embodiment of the present invention, the lower limit value is 37%. According to a further embodiment of the present invention, the lower limit value is 41%. According to a further embodiment of the present invention, the lower limit value is 47%. According to a further embodiment of the present invention, the lower limit value is 50%.

Further, for example, according to an embodiment of the present invention, the upper limit value of the preferred content relative to the total amount of the liquid crystal composition of the present invention is 60%. According to another embodiment of the present invention, the upper limit value is 55%. According to still another embodiment of the present invention, the upper limit value is 45%. According to a further embodiment of the present invention, the upper limit value is 40%. According to a further embodiment of the present invention, the upper limit value is 35%. According to a further embodiment of the present invention, the upper limit value is 30%. According to a further embodiment of the present invention, the upper limit value is 25%. According to a further embodiment of the present invention, the upper limit value is 20%.

Further, the compound represented by the general formula (I-1-2) is preferably a compound selected from a compound group represented by formula (2.1) to formula (2.4), and compounds represented by the formula (2.2) to the formula (2.4) are more preferred. In particular, the compound represented by the formula (2.2) is preferred particularly for improving the response speed of the liquid crystal composition of the present invention. In addition, when high Tni rather than the response speed is required, the compound represented by the formula (2.3) or the formula (2.4) is preferably used. It is undesired for improving solubility at a low temperature that the content of each of the compounds represented by the formula (2.3) and the formula (2.4) is 30% or more.

[Chem. 18]

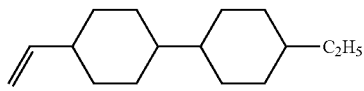

(2.1)

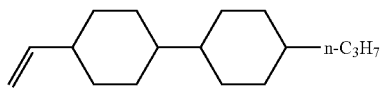

(2.2)

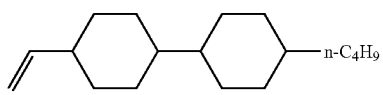

(2.3)

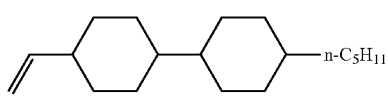

(2.4)

In the liquid crystal composition of the present invention, the content of the compound represented by the formula (2.2) relative to the total amount of the liquid crystal composition of the present invention is preferably 5% by mass or more, more preferably 10% by mass or more, more preferably 14% by mass or more, more preferably 17% by mass or more, more preferably 19% by mass or more, more preferably 22% by mass or more, more preferably 25% by mass or more, more preferably 27% by mass or more, and particularly preferably 30% by mass or more. The maximum allowable content is preferably 55% by mass or less, more preferably 50% by mass or less, more preferably 45% by mass or less, and particularly preferably 40% by mass or less.

The liquid crystal composition of the present invention can further contain a compound represented by formula (2.5) having a structure similar to the compound represented by the general formula (I-1-2).

[Chem. 19]

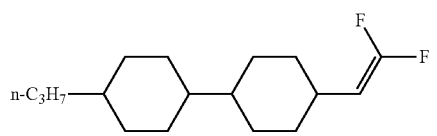

(2.5)

The content of the compound represented by the formula (2.5) is preferably adjusted according to the desired performance such as solubility at a low temperature, transition temperature, electric reliability, birefringence, etc., and the content of the compound relative to the total amount of the liquid crystal composition of the present invention is preferably 11% by mass or more, more preferably 15% by mass, even more preferably 23% by mass, still more preferably 26% by mass or more, and particularly preferably 28% by mass or more.

Further, the compound represented by the general formula (I) is preferably a compound selected from a compound group represented by general formula (I-2).

[Chem. 20]

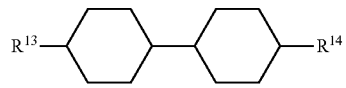

(I-2)

(In the formula, $R^{13}$ and $R^{14}$ each independently represent an alkyl group having 1 to 5 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3.

In the liquid crystal composition of the present invention, it is necessary to properly adjust the content of a compound represented by the general formula (I-2) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 3%. According to another embodiment of the present invention, the lower limit value is 4%. According to still another embodiment of the present invention, the lower limit value is 15%. According to a further embodiment of the present invention, the lower limit value is 25%. According to a further embodiment of the present invention, the lower limit value is 30%. According to a further embodiment of the present invention, the lower limit value is 35%. According to a further embodiment of the present invention, the lower limit value is 38%. According to a further embodiment of the present invention, the lower limit value is 40%. According to a further embodiment of the present invention, the lower limit value is 42%. According to a further embodiment of the present invention, the lower limit value is 45%. According to a further embodiment of the present invention, the lower limit value is 47%. According to a further embodiment of the present invention, the lower limit value is 50%.

Further, for example, according to an embodiment of the present invention, the upper limit value of the preferred content relative to the total amount of the liquid crystal composition of the present invention is 60%. According to another embodiment of the present invention, the upper limit value is 55%. According to still another embodiment of the present invention, the upper limit value is 45%. According to a further embodiment of the present invention, the upper limit value is 40%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 5%. The compound represented by the general formula (I-2) is preferably a compound selected from a compound group represented by formula (3.1) to formula (3.4), and a compound represented by the formula (3.1), the formula (3.3), or the formula (3.4) is preferred. In particular, a compound represented by the formula (3.2) is particularly preferred for improving the response speed of the liquid crystal composition of the present invention. In addition, when high Tni rather than the response speed is required, the compound represented by the formula (3.3) or the formula (3.4) is preferably used. Further, it is undesired for improving solubility at a low temperature that the content of each of the compounds represented by the formula (3.3) and the formula (3.4) is 20% or more.

The compound represented by the general formula (I-2) is preferably a compound selected from a compound group represented by the formula (3.1) to the formula (3.4), and a compound represented by the formula (3.1), the formula (3.3) and/or the formula (3.4) is preferred.

[Chem. 21]

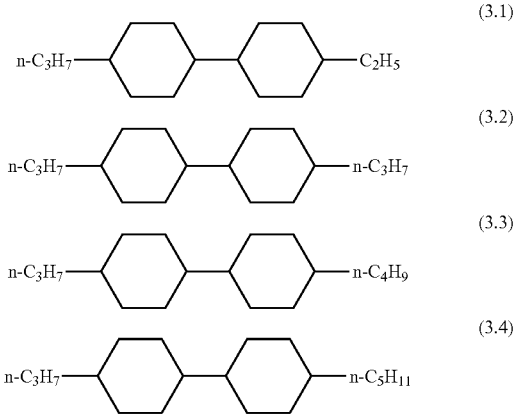

In the liquid crystal composition of the present invention, the content of the compound represented by the formula (3.3) relative to the total amount of the liquid crystal composition of the present invention is preferably 2% by mass or more, more preferably 3% by mass or more, more preferably 4% by mass or more, more preferably 10% by mass or more, more preferably 12% by mass or more, more preferably 14% by mass or more, more preferably 16% by mass or more, more preferably 20% by mass or more, more preferably 23% by mass or more, more preferably 26% by mass or more, and particularly preferably 30% by mass or more. The maximum allowable content is preferably 40% by mass or less, more preferably 37% by mass or less, still more preferably 34% by mass or less, and particularly preferably 32% by mass or less.

Further, the compound represented by the general formula (I) is preferably a compound selected from a compound group represented by general formula (I-3).

[Chem. 22]

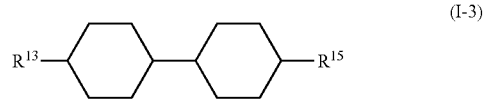

(In the formula, $R^{13}$ represents an alkyl group having 1 to 5 carbon atoms, and $R^{15}$ represents an alkoxy group having 1 to 4 carbon atoms.)

The types of compounds which can be combined are not particularly limited, but the compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3.

In the liquid crystal composition of the present invention, it is necessary to properly adjust the content of a compound represented by the general formula (I-3) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 3%. According to another embodiment of the present invention, the lower limit value is 4%. According to still another embodiment of the present invention, the lower limit value is 15%. According to a further embodiment of the present invention, the lower limit value is 25%. According to a further embodiment of the present invention, the lower limit value is 30%. According to a further embodiment of the present invention, the lower limit value is 35%. According to a further embodiment of the present invention, the lower limit value is 38%. According to a further embodiment of the present invention, the lower limit value is 40%. According to a further embodiment of the present invention, the lower limit value is 42%. According to a further embodiment of the present invention, the lower limit value is 45%. According to a further embodiment of the present invention, the lower limit value is 47%. According to a further embodiment of the present invention, the lower limit value is 50%.

Further, for example, according to an embodiment of the present invention, the upper limit value of the preferred content relative to the total amount of the liquid crystal composition of the present invention is 60%. According to another embodiment of the present invention, the upper limit value is 55%. According to still another embodiment of the present invention, the upper limit value is 45%. According to a further embodiment of the present invention, the upper limit value is 40%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 5%.

When solubility at a low temperature is regarded as important, a slightly high content has a high effect, while when the response speed is regarded as important, a slightly low content has a high effect. Further, when dropping marks and image sticking are improved, the content range is preferably determined to a medium range.

The compound represented by the general formula (I-3) is preferably a compound selected from a compound group represented by formula (4.1) to formula (4.3), and a compound represented by the formula (4.3) is more preferred.

[Chem. 23]

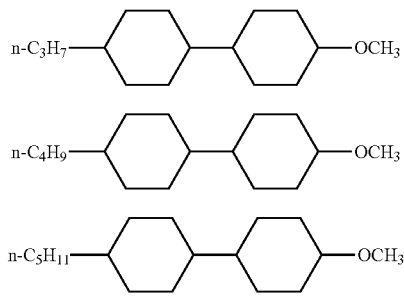

(4.1)
(4.2)
(4.3)

The content of the compound represented by the formula (4.3) relative to the total amount of the liquid crystal composition of the present invention is preferably 2% by mass or more, more preferably 4% by mass or more, more preferably 6% by mass or more, more preferably 8% by mass or more, more preferably 10% by mass or more, more preferably 12% by mass or more, more preferably 14% by mass or more, more preferably 16% by mass or more, more preferably 18% by mass or more, more preferably 20% by mass or more, and particularly preferably 22% by mass or more. In addition, the maximum allowable content is preferably 30% by mass or less, more preferably 25% by mass or less, still more preferably 24% by mass or less, and particularly preferably 23% by mass.

Further, the compound represented by the general formula (I) is preferably a compound selected from a compound group represented by general formula (I-4).

[Chem. 24]

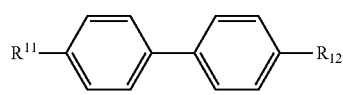

(I-4)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

In the liquid crystal composition of the present invention, it is necessary to properly adjust the content of a compound represented by the general formula (I-4) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 3%. According to another embodiment of the present invention, the lower limit value is 5%. According to still another embodiment of the present invention, the lower limit value is 6%. According to a further embodiment of the present invention, the lower limit value is 8%. According to a further embodiment of the present invention, the lower limit value is 10%. According to a further embodiment of the present invention, the lower limit value is 12%. According to a further embodiment of the present invention, the lower limit value is 15%. According to a further embodiment of the present invention, the lower limit value is 20%. According to a further embodiment of the present invention, the lower limit value is 25%. According to a further embodiment of the present invention, the lower limit value is 30%. According to a further embodiment of the present invention, the lower limit value is 35%. According to a further embodiment of the present invention, the lower limit value is 40%.

Further, for example, according to an embodiment of the present invention, the upper limit value of the preferred content relative to the total amount of the liquid crystal composition of the present invention is 50%. According to another embodiment of the present invention, the upper limit value is 40%. According to still another embodiment of the present invention, the upper limit value is 35%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%.

When high birefringence is required, a slightly high content has a high effect, while when high Tni is regarded as important, a slightly low content has a high effect. When dropping marks and image sticking are improved, the content range is preferably determined to a medium range.

Further, the compound represented by the general formula (I-4) is preferably a compound selected from a compound group represented by formula (5.1) to formula (5.4), and compounds represented by the formula (5.2) to formula (5.4) are more preferred.

[Chem. 25]

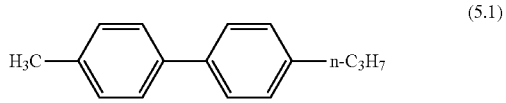

(5.1)

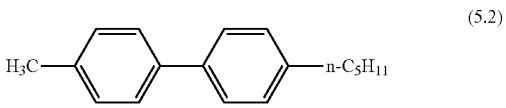

(5.2)

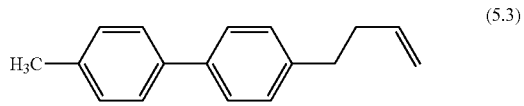

(5.3)

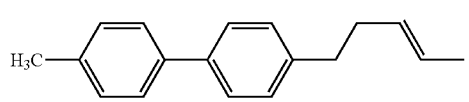

The content of the compound represented by the formula (5.4) relative to the total amount of the liquid crystal composition of the present invention is preferably 2% by mass or more, more preferably 4% by mass, more preferably 6% by mass or more, more preferably 8% by mass or more, and particularly preferably 10% by mass or more. In addition, the maximum allowable content is preferably 30% by mass or less, more preferably 25% by mass or less, still more preferably 20% by mass or less, and particularly preferably 18% by mass or less.

Further, the compound represented by the general formula (I) is preferably a compound selected from a compound group represented by general formula (I-5).

[Chem. 26]

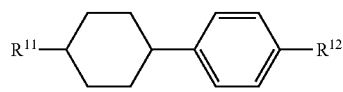

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms.)

The types of compounds which can be combined are not particularly limited, but compounds are properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

In the liquid crystal composition of the present invention, it is necessary to properly adjust the content of the compound represented by the general formula (I-5) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 1%. According to another embodiment of the present invention, the lower limit value is 5%. According to still another embodiment of the present invention, the lower limit value is 8%. According to a further embodiment of the present invention, the lower limit value is 11%. According to a further embodiment of the present invention, the lower limit value is 13%. According to a further embodiment of the present invention, the lower limit value is 15%. According to a further embodiment of the present invention, the lower limit value is 17%. According to a further embodiment of the present invention, the lower limit value is 20%. According to a further embodiment of the present invention, the lower limit value is 25%. According to a further embodiment of the present invention, the lower limit value is 30%. According to a further embodiment of the present invention, the lower limit value is 35%. According to a further embodiment of the present invention, the lower limit value is 40%.

Further, for example, according to an embodiment of the present invention, the upper limit of the preferred content relative to the total amount of the liquid crystal composition of the present invention is 50%. According to another embodiment of the present invention, the upper limit value is 40%. According to still another embodiment of the present invention, the upper limit value is 35%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%.

When solubility at a low temperature is regarded as important, a slightly high content has a high effect, while when the response speed is regarded as important, a slightly low content has a high effect. When dropping marks and image sticking are improved, the content range is preferably determined to a medium range.

Further, the compound represented by the general formula (I-5) is preferably a compound selected from a compound group represented by formula (6.1) to formula (6.6), and compounds represented by the formula (6.3), the formula (6.4), and the formula (6.6) are more preferred.

[Chem. 27]

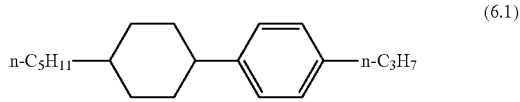

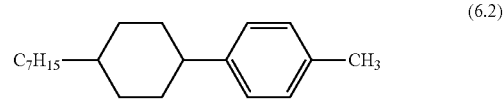

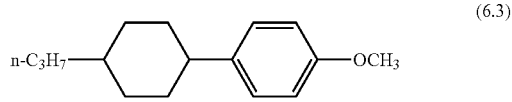

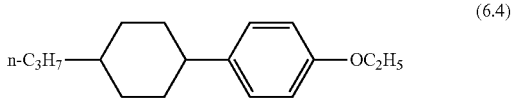

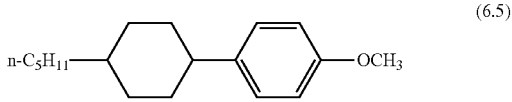

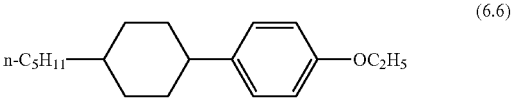

For example, the content of the compound represented by the formula (6.6) relative to the total amount of the liquid crystal composition of the present invention is preferably 2% by mass or more, more preferably 4% by mass, more preferably 5% by mass or more, more preferably 6% by mass or more, more preferably 9% by mass or more, more preferably 12% by mass or more, more preferably 14% by mass or more, more preferably 16% by mass or more, more preferably 18% by mass or more, more preferably 20% by mass or more, and particularly preferably 22% by mass or more. In addition, the maximum allowable content is preferably 30% by mass or less, more preferably 25% by mass or less, still more preferably 24% by mass or less, and particularly preferably 23% by mass or less.

The liquid crystal composition of the present invention can further contain compounds represented by formula (6.7) to formula (6.9).

[Chem. 28]

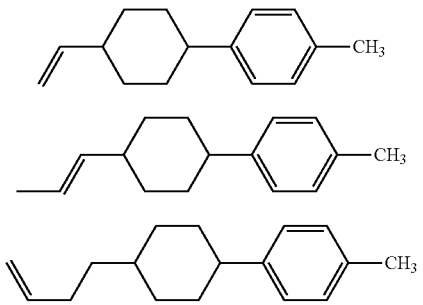

(6.7)
(6.8)
(6.9)

The content of each of the compounds represented by the formula (6.7) to formula (6.9) is preferably adjusted according to desired performance such as solubility at a low temperature, transition temperature, electric reliability, birefringence, etc. The content of the compound relative to the total amount of the liquid crystal composition of the present invention is preferably 2% by mass or more, more preferably 3% by mass, even more preferably 4% by mass or more, still more preferably 5% by mass, and particularly preferably 7% by mass or more.

Further, the compound represented by the general formula (I) is preferably a compound selected from a compound group represented by general formula (I-6).

[Chem. 29]

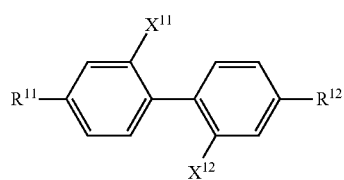

(I-6)

(In the formula, $R^{11}$ and $R^{12}$ each independently represent an alkyl group having 1 to 5 carbon atoms, an alkenyl group having 4 to 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ is a fluorine atom.)

The content of a compound represented by the general formula (I-6) relative to the total amount of the liquid crystal composition of the present invention is preferably 2% by mass or more, more preferably 4% by mass or more, more preferably 5% by mass or more, more preferably 6% by mass or more, more preferably 9% by mass or more, more preferably 12% by mass or more, more preferably 14% by mass or more, more preferably 16% by mass or more, more preferably 18% by mass or more, more preferably 20% by mass or more, and particularly preferably 22% by mass or more. In addition, the maximum allowable content is preferably 30% by mass or less, more preferably 25% by mass or less, still more preferably 24% by mass or less, and particularly preferably 23% by mass or less.

Further, the compound represented by the general formula (I-6) is preferably a compound represented by formula (7.1).

[Chem. 30]

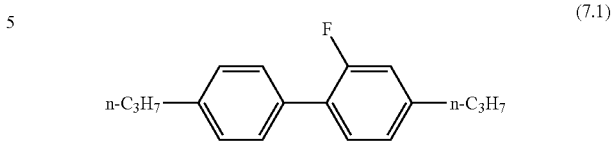

(7.1)

Further, the compound represented by the general formula (I) is preferably a compound selected from a compound group represented by general formula (I-7).

[Chem. 31]

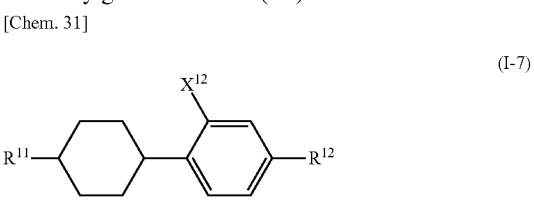

(I-7)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms, and $X^{12}$ each independently represent a fluorine atom or a chlorine atom.)

The content of a compound represented by the general formula (I-7) relative to the total amount of the liquid crystal composition of the present invention is preferably 1% by mass or more, more preferably 2% by mass, more preferably 3% by mass or more, more preferably 4% by mass or more, more preferably 6% by mass or more, more preferably 8% by mass or more, more preferably 10% by mass or more, more preferably 12% by mass or more, more preferably 15% by mass or more, more preferably 18% by mass or more, and particularly preferably 21% by mass or more. In addition, the maximum allowable content is preferably 30% by mass or less, more preferably 25% by mass or less, still more preferably 24% by mass or less, and particularly preferably 22% by mass or less.

Further, the compound represented by the general formula (I-7) is preferably a compound represented by formula (8.1).

[Chem. 32]

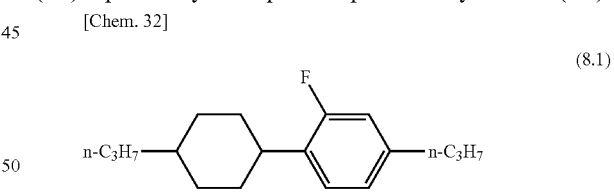

(8.1)

Further, the compound represented by the general formula (I) is preferably a compound selected from a compound group represented by general formula (I-8).

[Chem. 33]

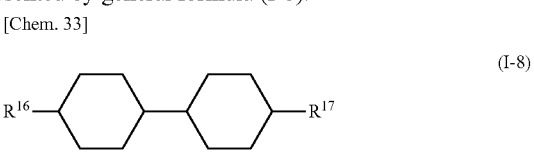

(I-8)

(In the formula, $R^{16}$ and $R^{17}$ each independently represent an alkenyl group having 2 to 5 carbon atoms.)

The types of compounds which can be combined are not particularly limited, but the compounds are preferably used alone or in combination of two or three according to desired performance such as solubility at a low temperature, transition temperature, electric reliability, birefringence, etc.

According to desired performance such as solubility at a low temperature, transition temperature, electric reliability, birefringence, process adaptability, dropping marks, image sticking, dielectric anisotropy, etc., the content of a compound represented by the general formula (I-8) relative to the total amount of the liquid crystal composition of the present invention is preferably 5% by mass or more, more preferably 10% by mass or more, more preferably 15% by mass or more, more preferably 20% by mass or more, more preferably 25% by mass or more, more preferably 30% by mass or more, more preferably 35% by mass or more, more preferably 40% by mass or more, more preferably 45% by mass or more, more preferably 50% by mass or more, and particularly preferably 55% by mass or more. In addition, the maximum allowable content is preferably 65% by mass or less, more preferably 60% by mass or less, still more preferably 58% by mass or less, and particularly preferably 56% by mass or less.

Further, the compound represented by the general formula (I-8) is preferably a compound selected from a compound group represented by formula (9.1) to formula (9.10), and compounds represented by the formula (9.2), the formula (9.4), and the formula (9.7) are more preferred.

[Chem. 34]

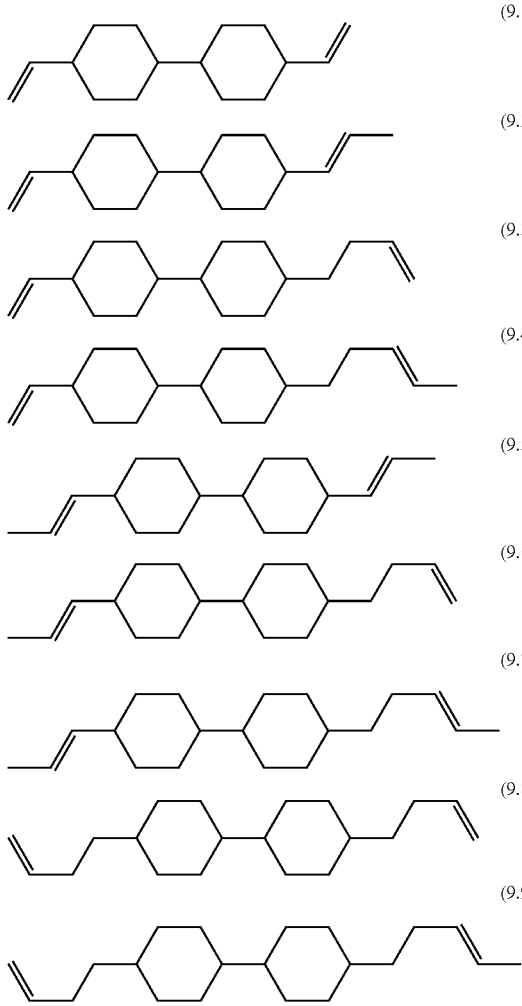

Further, the compound represented by the general formula (L) is preferably, for example, a compound selected from compounds represented by general formula (II).

[Chem. 35]

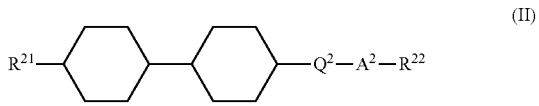

($R^{21}$ and $R^{22}$ each independently represent an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —$CH_2$—$CH_2$—, or —$CF_2O$—.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4 or more.

In the liquid crystal composition of the present invention, it is necessary to properly adjust the content of a compound represented by the general formula (II) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 3%. According to another embodiment of the present invention, the lower limit value is 5%. According to still another embodiment of the present invention, the lower limit value is 7%. According to a further embodiment of the present invention, the lower limit value is 10%. According to a further embodiment of the present invention, the lower limit value is 14%. According to a further embodiment of the present invention, the lower limit value is 16%. According to a further embodiment of the present invention, the lower limit value is 20%. According to a further embodiment of the present invention, the lower limit value is 23%. According to a further embodiment of the present invention, the lower limit value is 26%. According to a further embodiment of the present invention, the lower limit value is 30%. According to a further embodiment of the present invention, the lower limit value is 35%. According to a further embodiment of the present invention, the lower limit value is 40%.

Further, according to an embodiment of the present invention, the upper limit value of the preferred content relative to the total amount of the liquid crystal composition of the present invention is 50%. According to another embodiment of the present invention, the upper limit value is 40%. According to still another embodiment of the present invention, the upper limit value is 35%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%.

Further, the compound represented by the general formula (II) is preferably, for example, a compound selected from a compound group represented by general formula (II-1).

[Chem. 36]

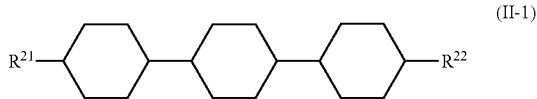

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of a compound represented by the general formula (II-1) is preferably adjusted according to desired performance such as solubility at a low temperature, transition temperature, electric reliability, birefringence, etc., and is preferably 4% by mass or more, more preferably 8% by mass or more, and still more preferably 12% by mass or more. In addition, the maximum allowable content is preferably 24% by mass or less, more preferably 18% by mass or less, and still more preferably 14% by mass or less.

Further, preferred examples of the compound represented by the general formula (II-1) include compounds represented by formula (10.1) and formula (10.2).

[Chem. 37]

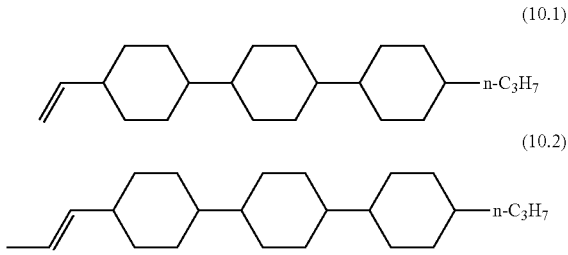

Further, the compound represented by the general formula (II) is preferably, for example, a compound selected from a compound group represented by general formula (II-2).

[Chem. 38]

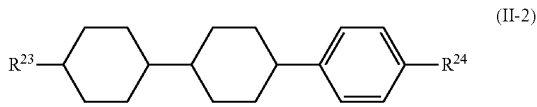

(II-2)

($R^{23}$ represents an alkenyl group having 2 to 5 carbon atoms, and $R^{24}$ represents an alkyl group having 1 to 5 carbon atoms or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2 or more.

In the liquid crystal composition of the present invention, it is necessary to properly adjust the content of a compound represented by the general formula (II-2) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 3%. According to another embodiment of the present invention, the lower limit value is 5%. According to still another embodiment of the present invention, the lower limit value is 7%. According to a further embodiment of the present invention, the lower limit value is 10%. According to a further embodiment of the present invention, the lower limit value is 14%. According to a further embodiment of the present invention, the lower limit value is 16%. According to a further embodiment of the present invention, the lower limit value is 20%. According to a further embodiment of the present invention, the lower limit value is 23%. According to a further embodiment of the present invention, the lower limit value is 26%. According to a further embodiment of the present invention, the lower limit value is 30%. According to a further embodiment of the present invention, the lower limit value is 35%. According to a further embodiment of the present invention, the lower limit value is 40%.

Further, according to an embodiment of the present invention, the upper limit value of the preferred content relative to the total amount of the liquid crystal composition of the present invention is 50%. According to another embodiment of the present invention, the upper limit value is 40%. According to still another embodiment of the present invention, the upper limit value is 35%. According to a further embodiment of the present invention, the upper limit value is 30%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%.

Further, preferred examples of the compound represented by the general formula (II-2) include compounds represented by formula (11.1) to formula (11.3).

[Chem. 39]

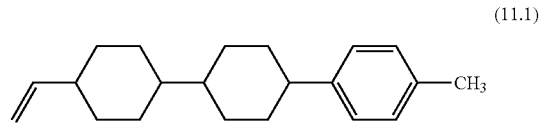

(11.1)

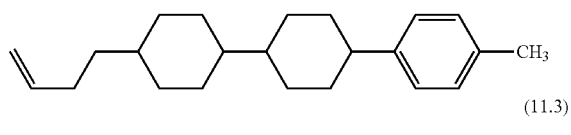

(11.2)

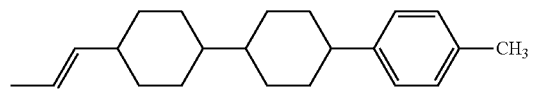

(11.3)

According to desired performance such as solubility at a low temperature, transition temperature, electric reliability, birefringence, etc., the liquid crystal composition of the present invention may contain a compound represented by the formula (11.1), a compound represented by the formula (11.2), both the compound represented by the formula (11.1) and the compound represented by the formula (11.2), or all compounds represented by the formula (11.1) to the formula (11.3). The content of the compound represented by the formula (11.1) or the formula (11.2) relative to the total amount of the liquid crystal composition of the present invention is preferably 3% by mass, more preferably 5% by mass or more, more preferably 7% by mass or more, more preferably 9% by mass or more, more preferably 11% by mass, more preferably 12% by mass, even more preferably 13% by mass, still more preferably 18% by mass, and particularly preferably 21% by mass. The maximum allowable content is preferably 40% by mass or less, more preferably 30% by mass or less, and still more preferably 25% by mass or less. The content of the compound represented by the formula (11.2) relative to the total amount of the liquid crystal composition of the present invention is preferably 3% by mass or more, more preferably 5% by mass or more, even more preferably 8% by mass or more, still more preferably 10% by mass or more, still more preferably 12% by mass or more, still more preferably 15% by mass or more, still more preferably 17% by mass or more, and particularly preferably 19% by mass or more. The maximum allowable content is preferably 40% by mass or less, more preferably 30% by mass or less, and still more preferably 25% by mass or less. When both the compound represented by the formula (11.1) and the compound represented by the formula (11.2) are contained, the total of both compounds relative to the total amount of the liquid crystal composition of the present invention is preferably 15% by mass or more, more preferably 19% by mass or more, and still more preferably 24% by mass or more, and particularly preferably 30% by mass or more. The maximum allowable content is preferably 45% by mass or less, more preferably 40% by mass or less, and still more preferably 35% by mass or less.

Further, the compound represented by the general formula (II) is preferably, for example, a compound selected from a compound group represented by general formula (II-3).

[Chem. 40]

(II-3)

($R^{25}$ represents an alkyl group having 1 to 5 carbon atoms, and $R^{24}$ represents an alkyl group having 1 to 5 carbon atoms or an alkoxy group having 1 to 4 carbon atoms.)

The types of compounds which can be combined are not particularly limited, but compounds are preferably used alone or in combination of two or three according to desired performance such as solubility at a low temperature, transition temperature, electric reliability, birefringence, etc.

It is necessary to properly adjust the content of a compound represented by the general formula (II-3) according to desired performance such as solubility at a low temperature, transition temperature, electric reliability, birefringence, process adaptability, dropping marks, image sticking, dielectric anisotropy, etc. The lower limit value of the preferred content relative to the total amount of the liquid crystal composition of the present invention is 2%, more preferably 5%, more preferably 8%, more preferably 11%, more preferably 14%, more preferably 17%, more preferably 20%, more preferably 23%, more preferably 26%, and particularly preferably 29%. The upper limit value of the preferred content relative to the total amount of the liquid crystal composition of the present invention is preferably, for example, 45%, more preferably 40%, more preferably 35%, more preferably 30%, more preferably 25%, more preferably 20%, more preferably 15%, and particularly preferably 10%.

Further, preferred examples of the compound represented by the general formula (II-3) include compounds represented by formula (12.1) to formula (12.3).

[Chem. 41]

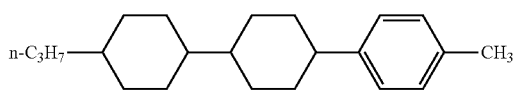

(12.1)

(12.2)

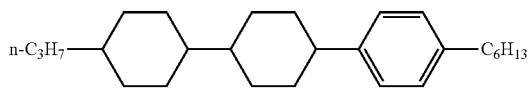

(12.3)

According to desired performance such as solubility at a low temperature, transition temperature, electric reliability, birefringence, etc., the liquid crystal composition of the present invention may contain a compound represented by the formula (12.1), a compound represented by the formula (12.2), or both the compound represented by the formula (12.1) and the compound represented by the formula (12.2). The content of the compound represented by the formula (12.1) or the formula (11.2) relative to the total amount of the liquid crystal composition of the present invention is preferably 3% by mass, more preferably 5% by mass or more, even more preferably 7% by mass or more, even more preferably 9% by mass or more, still more preferably 11% by mass or more, still more preferably 12% by mass or more, still more preferably 13% by mass or more, still more preferably 18% by mass or more, and particularly preferably 21% by mass or more. The maximum allowable content is preferably 40% by mass or less, more preferably 30% by mass or less, and still more preferably 25% by mass or less. Also, the content of the compound represented by the formula (12.2) relative to the total amount of the liquid crystal composition of the present invention is preferably 3% by mass, more preferably 5% by mass or more, even more preferably 8% by mass or more, even more preferably 10% by mass or more, still more preferably 12% by mass or more, still more preferably 15% by mass or more, still more preferably 17% by mass or more, and particularly preferably 19% by mass or more. The maximum allowable content is preferably 40% by mass or less, more preferably 30% by mass or less, and still more preferably 25% by mass or less. When both the compound represented by the formula (12.1) and the compound represented by the formula (12.2) are contained, the total of both compounds relative to the total amount of the liquid crystal composition of the present invention is preferably 15% by mass or more, more preferably 19% by mass or more, still more preferably 24% by mass or more, and particularly preferably 30% by mass or more. The maximum allowable content is preferably 45% by mass or less, more preferably 40% by mass or less, and still more preferably 35% by mass or less.

The content of the compound represented by the formula (12.3) relative to the total amount of the liquid crystal composition of the present invention is preferably 0.05% by mass or more, more preferably 0.1% by mass or more, and still more preferably 0.2% by mass or more. The maximum allowable content is preferably 2% by mass or less, more preferably 1% by mass or less, and still more preferably 0.5% by mass or less. The compound represented by the formula (12.3) may be an optically active compound.

Further, the compound represented by the general formula (II-3) is preferably, for example, a compound selected from a compound group represented by general formula (II-3-1).

[Chem. 42]

(II-3-1)

($R^{25}$ represents an alkyl group having 1 to 5 carbon atoms, and $R^{26}$ represents an alkoxy group having 1 to 4 carbon atoms.)

The types of compounds which can be combined are not particularly limited, but one to three of the compounds are preferably contained according to desired performance such as solubility at a low temperature, transition temperature, electric reliability, birefringence, etc.

It is preferred to adjust the content of the compound represented by the general formula (II-3-1) according to desired performance such as solubility at a low temperature, transition temperature, electric reliability, birefringence, etc., and the content of the compound is preferably 1% by mass or more, more preferably 4% by mass or more, and still more preferably 8% by mass or more. The maximum allowable content is preferably 24% by mass or less, more preferably 18% by mass or less, and still more preferably 14% by mass or less.

Further, preferred examples of the compound represented by the general formula (II-3-1) include compounds represented by formula (13.1) to formula (13.4), and a compound represented by formula (13.3) is particularly preferred.

[Chem. 43]

(13.1)

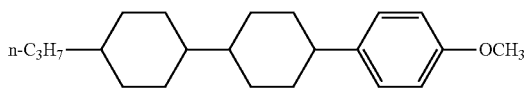

(13.2)

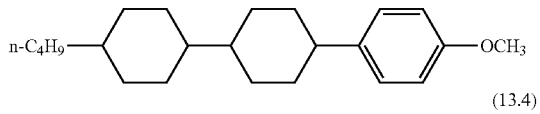

(13.3)

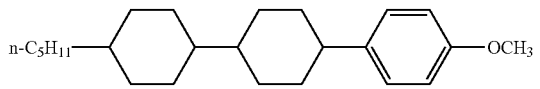

(13.4)

Further, the compound represented by the general formula (II) is preferably, for example, a compound selected from a compound group represented by general formula (II-4).

[Chem. 44]

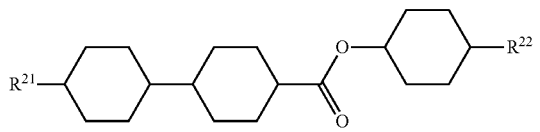

(II-4)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

These compounds may be contained alone or in combination of two or more and are preferably properly combined according to desired performance. The types of compounds which can be combined are not particularly limited, but one or two, particularly preferably one to three, of the compounds are preferably contained according to desired performance such as solubility at a low temperature, transition temperature, electric reliability, birefringence, etc.

The content of a compound represented by the general formula (II-4) relative to the total amount of the liquid crystal composition of the present invention is preferably 1% by mass or more, more preferably 2% by mass or more, even more preferably 3% by mass or more, still more preferably 4% by mass or more, and particularly preferably 5% by mass or more. The maximum allowable content is preferably 15% by mass or less, more preferably 12% by mass or less, and still more preferably 7% by mass or less.

Further, preferred examples of the compound represented by the general formula (II-4) include compounds represented by formula (14.1) to formula (14.5), and a compound represented by formula (14.2) and/or formula (14.5) is particularly preferred.

[Chem. 45]

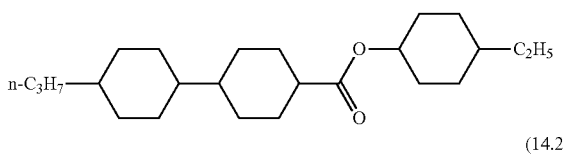

(14.1)

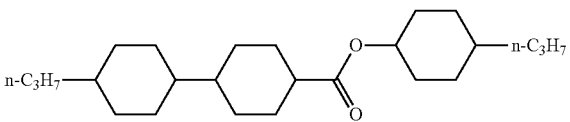

(14.2)

-continued (14.3)
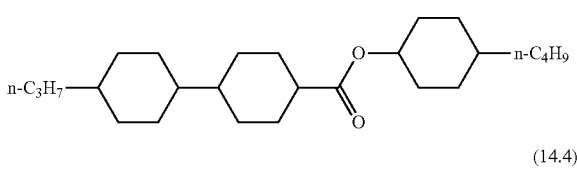

(14.4)
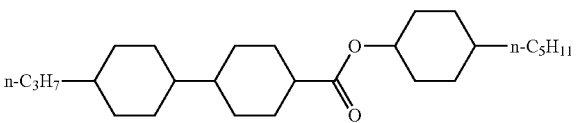

(14.5)
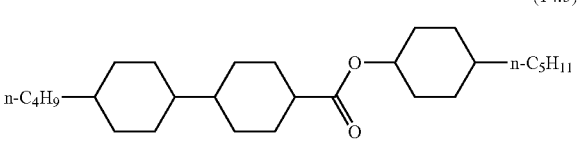

Further, the compound represented by the general formula (L) is preferably a compound selected from a compound group represented by general formula (III).

[Chem. 46]

(III)

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

In view of desired solubility, birefringence, etc., the content of the compound represented by the general formula (III) relative to the total amount of the liquid crystal composition of the present invention is preferably 3% by mass or more, more preferably 5% by mass or more, and still more preferably 7% by mass or more. The maximum allowable content is preferably 25% by mass or less, more preferably 20% by mass or less, and still more preferably 15% by mass or less.

Further, preferred examples of the compound represented by the general formula (III) compounds represented by formula (15.1) to formula (15.3), and the compound represented by the formula (15.3) is particularly preferred.

[Chem. 47]

(15.1)

(15.2)
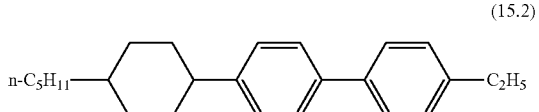

(15.3)
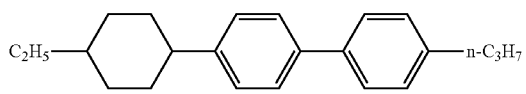

Further, the compound represented by the general formula (III) is preferably a compound selected from a compound group represented by general formula (III-1).

[Chem. 48]

(III-1)

($R^{33}$ represents an alkenyl group having 2 to 5 carbon atoms, and $R^{32}$ represents an alkyl group having 1 to 5 carbon atoms or an alkoxy group having 1 to 4 carbon atoms.)

The content of a compound represented by the general formula (III-1) is preferably adjusted according to desired performance such as solubility at a low temperature, transition temperature, electric reliability, birefringence, etc., and the content of the compound is preferably 4% by mass or more, more preferably 6% by mass or more, and still more preferably 10% by mass or more. The maximum allowable content is preferably 23% by mass or less, more preferably 18% by mass or less, and still more preferably 13% by mass or less.

Further, the compound represented by the general formula (III-1) is preferably, for example, a compound represented by formula (16.1) or formula (16.2).

[Chem. 49]

(16.1)
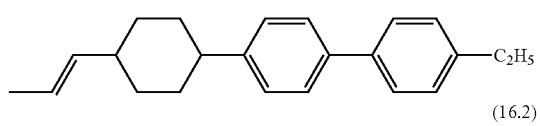

(16.2)
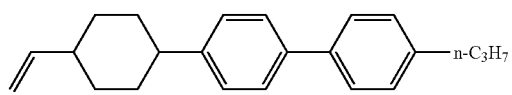

Further, the compound represented by the general formula (III) is preferably a compound selected from a compound group represented by general formula (III-2).

[Chem. 50]

(III-2)

($R^{31}$ represents an alkyl group having 1 to 5 carbon atoms, and $R^{34}$ represents an alkoxy group having 1 to 4 carbon atoms.)

The content of a compound represented by the general formula (III-2) is preferably adjusted according to desired performance such as solubility at a low temperature, transition temperature, electric reliability, birefringence, etc., and the content of the compound is preferably 4% by mass or more, more preferably 6% by mass or more, and still more preferably 10% by mass or more. The maximum allowable content is preferably 23% by mass or less, more preferably 18% by mass or less, and still more preferably 13% by mass or less.

Further, the compound represented by the general formula (III-2) is preferably, for example, a compound selected from a compound group represented by formula (17.1) to formula (17.3), and a compound represented by the formula (17.3) is particularly preferred.

[Chem. 51]

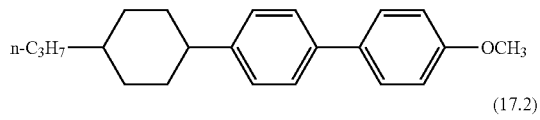

(17.1)

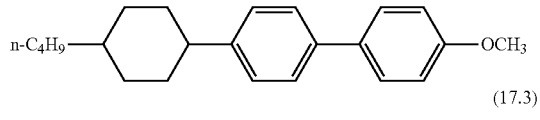

(17.2)

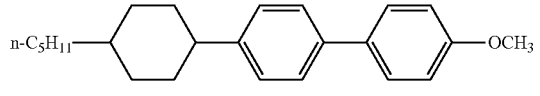

(17.3)

Further, the compound represented by the general formula (L) is preferably a compound selected from a compound group represented by general formula (IV).

[Chem. 52]

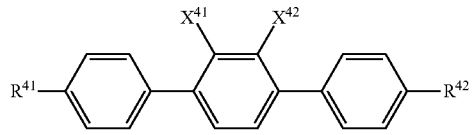

(IV)

(In the formula, $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

Further, the compound represented by the general formula (IV) is preferably, for example, a compound selected from a compound group represented by general formula (IV-1).

[Chem. 53]

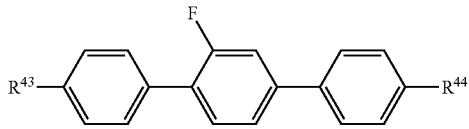

(IV-1)

(In the formula, $R^{43}$ and $R^{44}$ each independently represent an alkyl group having 1 to 5 carbon atoms.)

It is necessary to properly adjust the content of a compound represented by the general formula (IV-1) according to desired performance such as solubility at a low temperature, transition temperature, electric reliability, birefringence, process adaptability, dropping marks, image sticking, dielectric anisotropy, etc. For example, according to an embodiment of the present invention, the lower limit value of the preferred content relative to the total amount of the liquid crystal composition of the present invention is 1%. According to another embodiment of the present invention, the lower limit value is 2%. According to still another embodiment of the present invention, the lower limit value is 4%. According to a further embodiment of the present invention, the lower limit value is 6%. According to a further embodiment of the present invention, the lower limit value is 8%. According to a further embodiment of the present invention, the lower limit value is 10%. According to a further embodiment of the present invention, the lower limit value is 12%. According to a further embodiment of the present invention, the lower limit value is 15%. According to a further embodiment of the present invention, the lower limit value is 18%. According to a further embodiment of the present invention, the lower limit value is 21%.

Further, for example, according to an embodiment of the present invention, the upper limit value of the preferred content relative to the total amount of the liquid crystal composition of the present invention is 40%. According to another embodiment of the present invention, the upper limit value is 30%. According to still another embodiment of the present invention, the upper limit value is 25%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%. According to a further embodiment of the present invention, the upper limit value is 4%.

Further, preferred examples of the compound represented by the general formula (IV-1) include compounds represented by formula (18.1) to formula (18.9).

[Chem. 54]

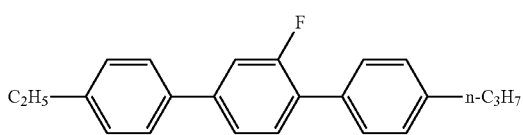

(18.1)

-continued

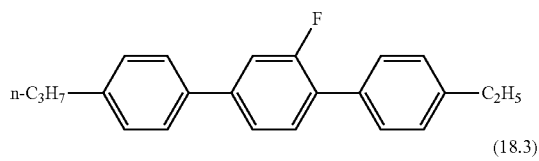
(18.2)

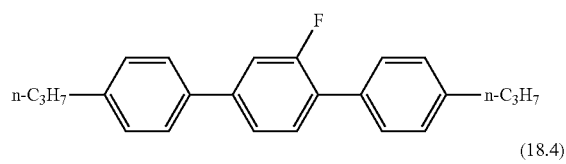
(18.3)

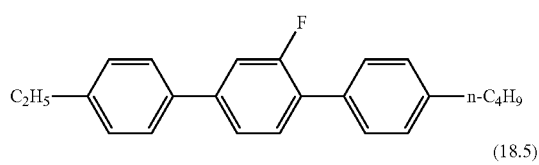
(18.4)

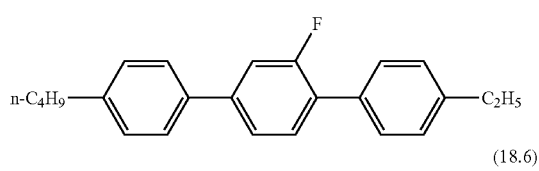
(18.5)

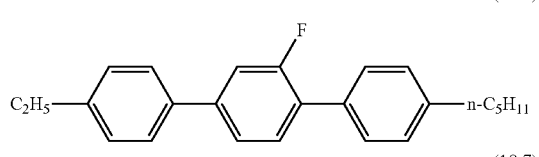
(18.6)

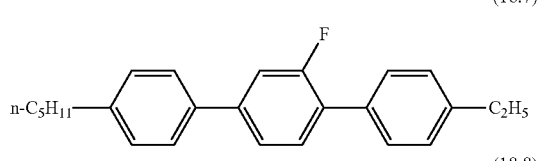
(18.7)

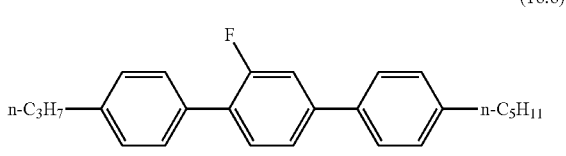
(18.8)

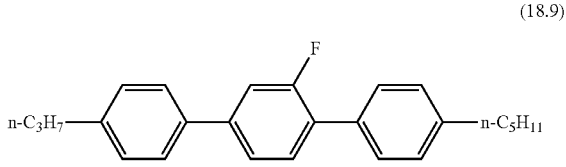
(18.9)

The types of compounds which can be combined are not particularly limited, but one to three, more preferably one to four, of these compounds are preferably contained. Also, since it is effective for solubility that the compound selected has a wide molecular weight distribution, for example, one compound represented by the formula (18.1) or (18.2), one compound represented by the formula (18.4) or (18.5), one compound represented by the formula (18.6) or (18.7), and one compound represented by the formula (18.8) or (18.9) are preferably selected and appropriately combined. In particular, the compounds represented by the formula (18.1), the formula (18.3), the formula (18.4), the formula (18.6), and the formula (18.9) are preferably contained.

Further, the compound represented by the general formula (IV) is preferably, for example, a compound selected from a compound group represented by general formula (IV-2).

[Chem. 55]

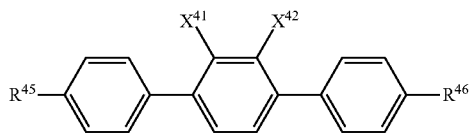
(IV-2)

(In the formula, $R^{45}$ and $R^{46}$ each independently represent an alkyl group having 1 to 5 carbon atoms or an alkenyl group having 2 to 5 carbon atoms, at least one of $R^{45}$ and $R^{46}$ represents an alkenyl group having 2 to 5 carbon atoms, and $X^{41}$ and $X^{42}$ each independently represent a hydrogen atom or a fluorine atom.)

The types of compounds which can be combined are not particularly limited, but compounds are used in combination according to desired performance such as solubility at a low temperature, transition temperature, electric reliability, birefringence, etc.

It is necessary to properly adjust the content of a compound represented by the general formula (IV-2) according to desired performance such as solubility at a low temperature, transition temperature, electric reliability, birefringence, process adaptability, dropping marks, image sticking, dielectric anisotropy, etc. For example, the lower limit value of the preferred content relative to the total amount of the liquid crystal composition of the present invention is preferably 0.5%, more preferably 1%, more preferably 2%, more preferably 3%, more preferably 5%, more preferably 7%, more preferably 9%, more preferably 12%, more preferably 15%, and particularly preferably 20%. In addition, the upper limit value of the preferred content relative to the total amount of the liquid crystal composition of the present invention is for example, preferably 40%, more preferably 30%, more preferably 25%, more preferably 20%, more preferably 15%, more preferably 10%, more preferably 5%, and particularly preferably 4%.

Further, preferred examples of the compound represented by the general formula (IV-2) include compounds represented by formula (19.1) to formula (19.8), and a compound represented by formula (19.2) is particularly preferred.

[Chem. 56]

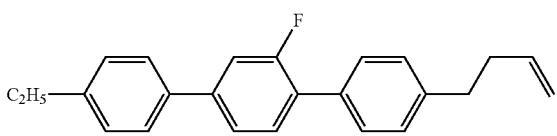
(19.1)

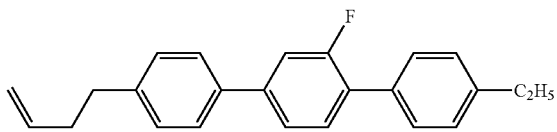
(19.2)

-continued

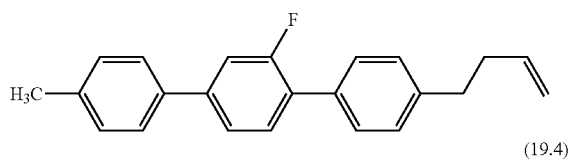
(19.3)

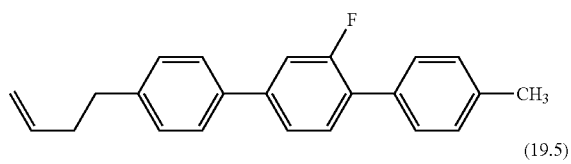
(19.4)

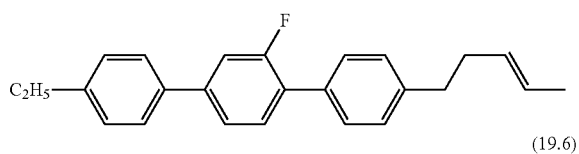
(19.5)

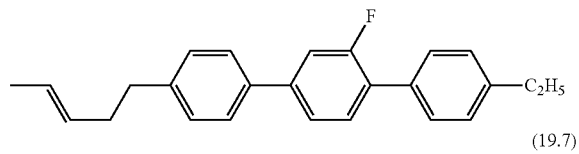
(19.6)

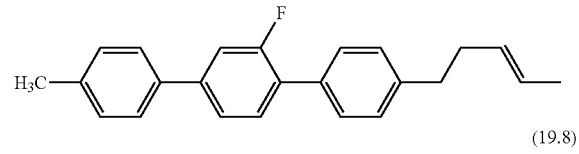
(19.7)

(19.8)

Since it is effective for solubility that the compound selected as a component of the liquid crystal composition has a wide molecular weight distribution, for example, one compound represented by the formula (19.1) or (19.2), one compound represented by the formula (19.3) or (19.4), one compound represented by the formula (19.5) or (19.6), and one compound represented by the formula (19.7) or (19.8) are preferably selected, and these compounds are preferably appropriately combined.

Further, the compound represented by the general formula (L) is preferably a compound selected from a group represented by general formula (V).

[Chem. 57]

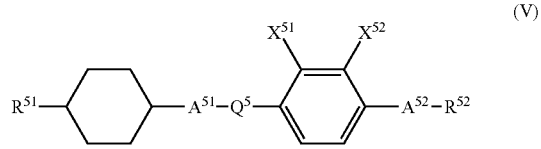
(V)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $A^{51}$ and $A^{52}$ each independently represent a 1,4-cyclohexylene group or a 1,4-phenylene group, $Q^5$ represents a single bond or —COO—, and $X^{51}$ and $X^{52}$ each independently represent a fluorine atom or a hydrogen atom.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4.

For example, according to an embodiment, the lower limit value of the preferred content relative to the total amount of the liquid crystal composition of the present invention is 2%. According to another embodiment of the present invention, the lower limit value is 4%. According to still another embodiment of the present invention, the lower limit value is 7%. According to a further embodiment of the present invention, the lower limit value is 10%. According to a further embodiment of the present invention, the lower limit value is 12%. According to a further embodiment of the present invention, the lower limit value is 15%. According to a further embodiment of the present invention, the lower limit value is 17%. According to a further embodiment of the present invention, the lower limit value is 18%. According to a further embodiment of the present invention, the lower limit value is 20%. According to a further embodiment of the present invention, the lower limit value is 22%.

Also, for example, according to an embodiment of the present invention, the upper limit value of the preferred content relative to the total amount of the liquid crystal composition of the present invention is 40%. According to another embodiment of the present invention, the upper limit value is 30%. According to still another embodiment of the present invention, the upper limit value is 25%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%. According to a further embodiment of the present invention, the upper limit value is 4%.

Further, the compound represented by the general formula (V) is preferably a compound represented by general formula (V-1).

[Chem. 58]

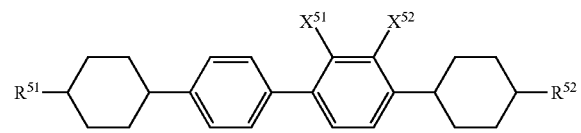
(V-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, and $X^{51}$ and $X^{52}$ each independently represent a fluorine atom or a hydrogen atom.)

Further, the compound represented by the general formula (V-1) is preferably a compound represented by general formula (V-1-1).

[Chem. 59]

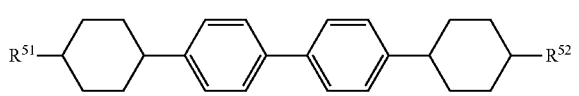
(V-1-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by the general formula (V-1-1) relative to the total amount of the liquid crystal composition of the present invention is preferably 1% by mass or more, more preferably 2% by mass or more, still more preferably 3% by mass or more, and particularly preferably 4% by mass or more. In addition, the maximum allowable content is preferably 15% by mass or less, more preferably 10% by mass or less, and still more preferably 8% by mass or less.

Further, preferred examples of the compound represented by the general formula (V-1-1) include compounds represented by formula (20.1) to formula (20.4), and a compound represented by formula (20.2) is more preferred.

[Chem. 60]

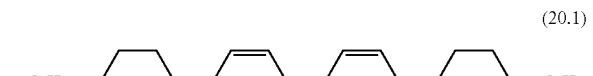
(20.1)

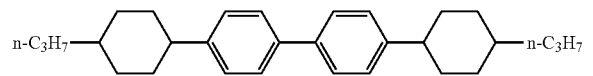
(20.2)

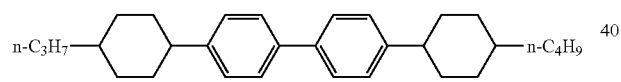
(20.3)

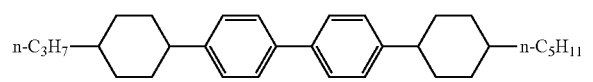
(20.4)

Further, the compound represented by the general formula (V-1) is preferably a compound represented by general formula (V-1-2).

[Chem. 61]

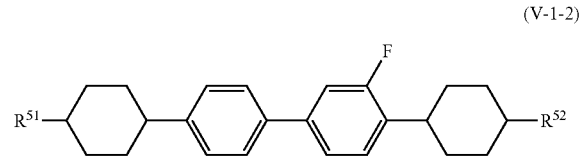
(V-1-2)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of a compound represented by the general formula (V-1-2) relative to the total amount of the liquid crystal composition of the present invention is preferably 1% by mass or more, more preferably 2% by mass or more, still more preferably 3% by mass or more, and particularly preferably 4% by mass or more. In addition, the maximum allowable content is preferably 15% by mass or less, more preferably 10% by mass or less, and still more preferably 8% by mass or less.

Further, preferred examples of the compound represented by the general formula (V-1-2) include compounds represented by formula (21.1) to formula (21.3), and a compound represented by formula (21.1) is more preferred.

[Chem. 62]

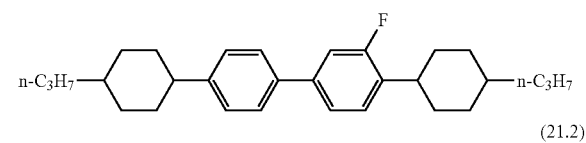
(21.1)

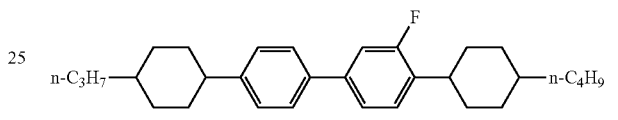
(21.2)

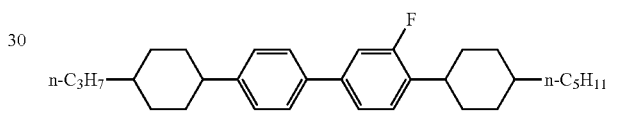
(21.3)

Further, the compound represented by the general formula (V-1) is preferably a compound represented by general formula (V-1-3).

[Chem. 63]

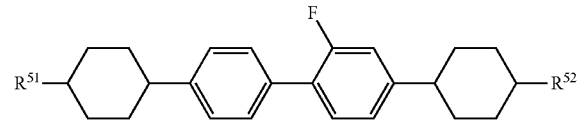
(V-1-3)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by the general formula (V-1-3) relative to the total amount of the liquid crystal composition of the present invention is preferably 1% by mass or more, more preferably 2% by mass or more, still more preferably 3% by mass or more, and particularly preferably 4% by mass or more. In addition, the maximum allowable content is preferably 15% by mass or less, more preferably 10% by mass or less, and still more preferably 8% by mass or less.

Further, examples of the compound represented by the general formula (V-1-3) include compounds represented by formula (22.1) to formula (22.3), and a compound represented by formula (22.1) is more preferred.

[Chem. 64]

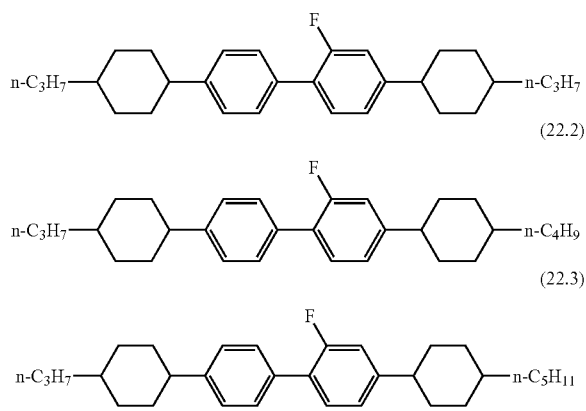

(22.1)

(22.2)

(22.3)

Further, the compound represented by the general formula (V) is preferably a compound represented by general formula (V-2).

[Chem. 65]

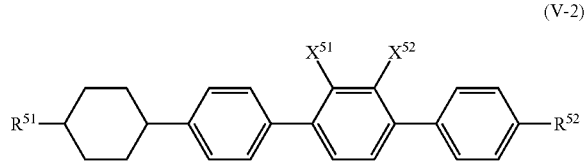

(V-2)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, and $X^{51}$ and $X^{52}$ each independently represent a fluorine atom or a hydrogen atom.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2 or more.

For example, according to an embodiment of the present invention, the lower limit value of the preferred content relative to the total amount of the liquid crystal composition of the present invention is 2%. According to another embodiment of the present invention, the lower limit value is 4%. According to still another embodiment of the present invention, the lower limit value is 7%. According to a further embodiment of the present invention, the lower limit value is 10%. According to a further embodiment of the present invention, the lower limit value is 12%. According to a further embodiment of the present invention, the lower limit value is 15%. According to a further embodiment of the present invention, the lower limit value is 17%. According to a further embodiment of the present invention, the lower limit value is 18%. According to a further embodiment of the present invention, the lower limit value is 20%. According to a further embodiment of the present invention, the lower limit value is 22%.

Also, for example, according to an embodiment of the present invention, the upper limit value of the preferred content relative to the total amount of the liquid crystal composition of the present invention is 40%. According to another embodiment of the present invention, the upper limit value is 30%. According to still another embodiment of the present invention, the upper limit value is 25%. According to a further embodiment of the present invention, the upper limit value is 20%. According to a further embodiment of the present invention, the upper limit value is 15%. According to a further embodiment of the present invention, the upper limit value is 10%. According to a further embodiment of the present invention, the upper limit value is 5%. According to a further embodiment of the present invention, the upper limit value is 4%.

When an embodiment in which the liquid crystal composition of the present invention has high Tni is desired, the content of the compound represented by the formula (V-2) is preferably slightly increased, while when an embodiment in which the liquid crystal composition of the present invention has low viscosity is desired, the content is preferably slightly decreased.

Further, the compound represented by the general formula (V-2) is preferably a compound represented by general formula (V-2-1).

[Chem. 66]

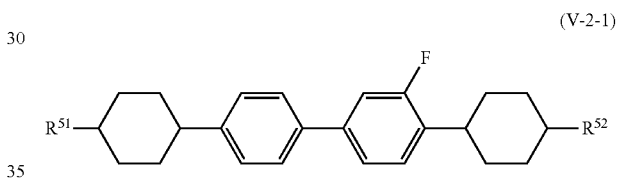

(V-2-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (V-2-1) include compounds represented by formula (23.1) to formula (23.4), and a compound represented by formula (23.1) and/or formula (23.2) is more preferred.

[Chem. 67]

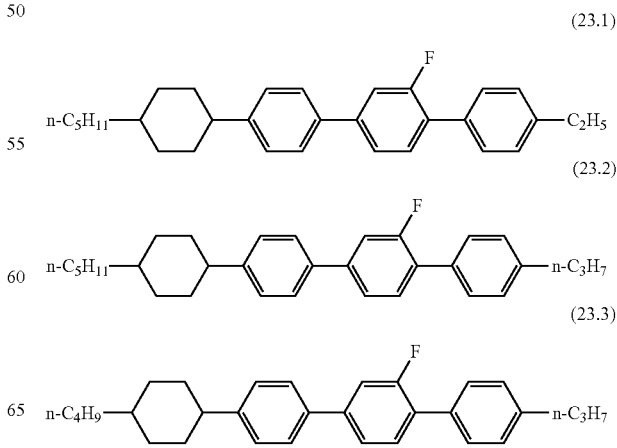

(23.1)

(23.2)

(23.3)

-continued (23.4)

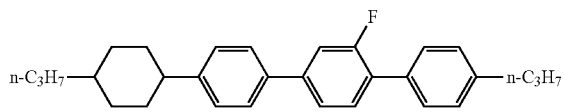

Further, the compound represented by the general formula (V-2) is preferably a compound represented by general formula (V-2-2).

[Chem. 68]

(V-2-2)

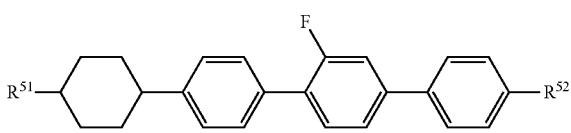

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (V-2-2) include compounds represented by formula (24.1) to formula (24.4), and a compound represented by formula (24.1) and/or formula (24.2) is more preferred.

[Chem. 69]

(24.1)

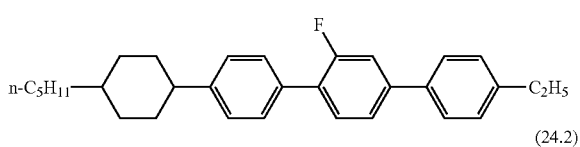

(24.2)

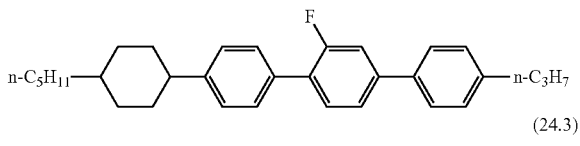

(24.3)

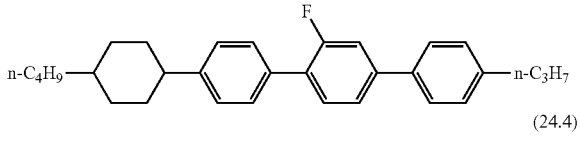

(24.4)

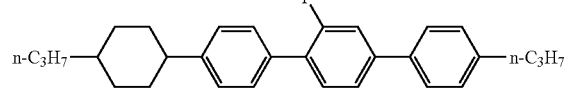

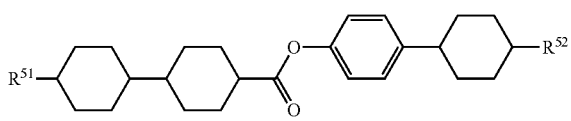

Further, the compound represented by the general formula (V) is preferably a compound represented by general formula (V-3).

[Chem. 70]

(V-3)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3 or more.

The content of a compound represented by the general formula (V-3) relative to the total amount of the liquid crystal composition of the present invention is preferably 2% by mass, more preferably 4% by mass or more, still more preferably 7% by mass or more, and particularly preferably 8% by mass or more. In addition, the maximum allowable content is preferably 16% by mass or less, more preferably 13% by mass or less, and still more preferably 11% by mass or less.

Further, preferred examples of the compound represented by the general formula (V-3) include compounds represented by formula (25.1) to formula (25.3).

[Chem. 71]

(25.1)

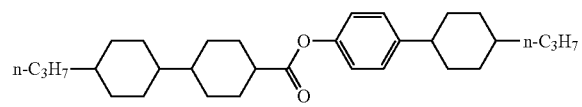

(25.2)

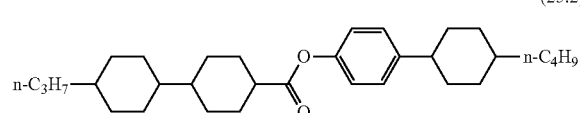

(25.3)

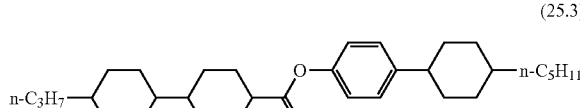

The liquid crystal composition of the present invention can further contain at least one compound represented by general formula (VI).

[Chem. 72]

(VI)

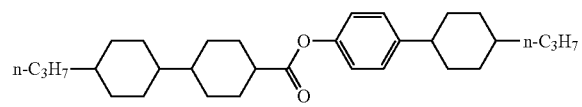

(In the formula, $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.)

The types of compounds which can be combined are not particularly limited, but preferably one to three, more preferably one to four, and particularly preferably one to five or more, of the compounds are contained according to desired performance such as solubility at a low temperature, transition temperature, electric reliability, birefringence, etc. In addition, the maximum allowable content is preferably 35% by mass or less, more preferably 25% by mass or less, and still more preferably 15% by mass or less.

Examples of a compound which can be preferably used as the compound represented by the general formula (VI) are given below.
[Chem. 73]
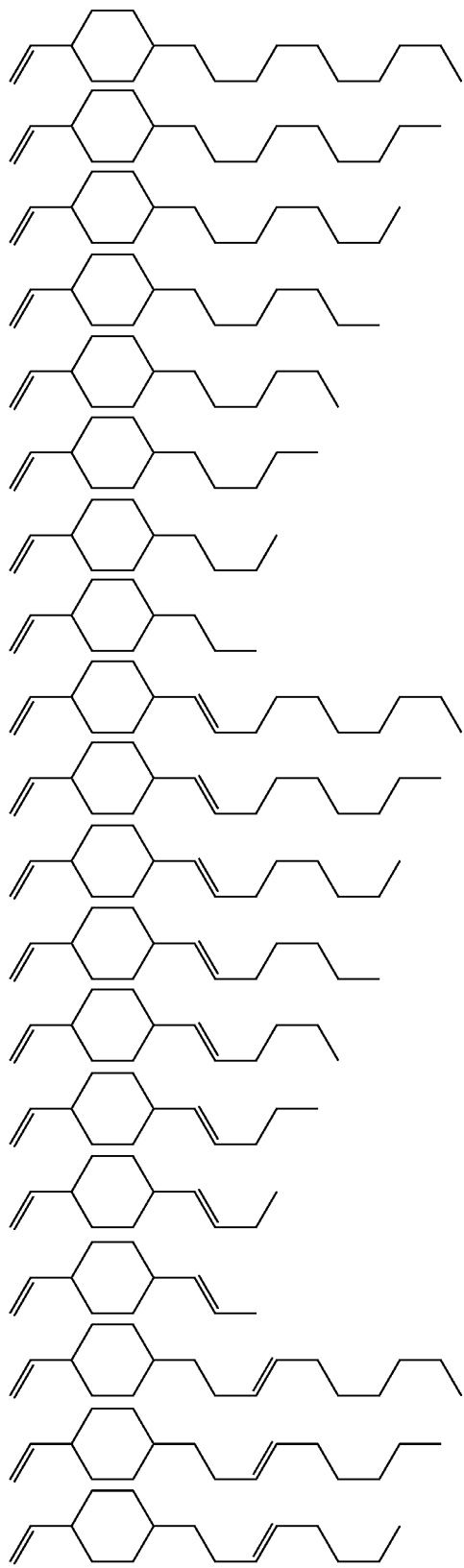
[Chem. 74]
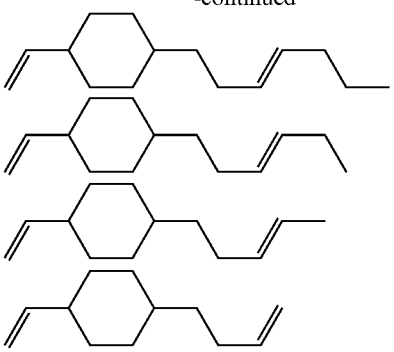
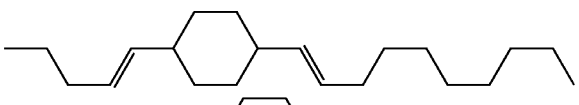
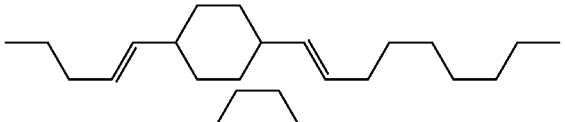
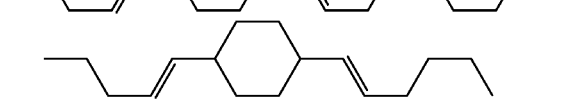
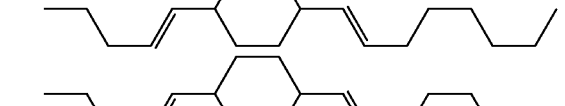
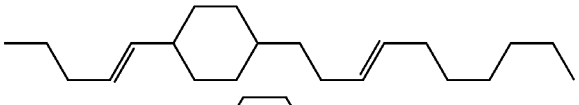
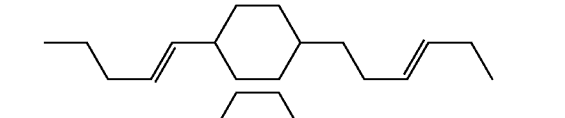
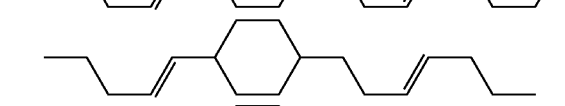
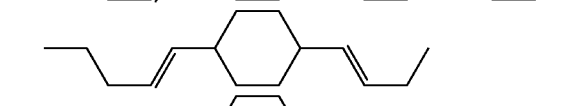
[Chem. 75]
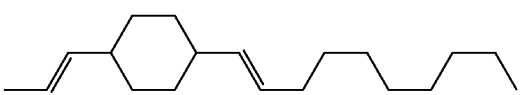

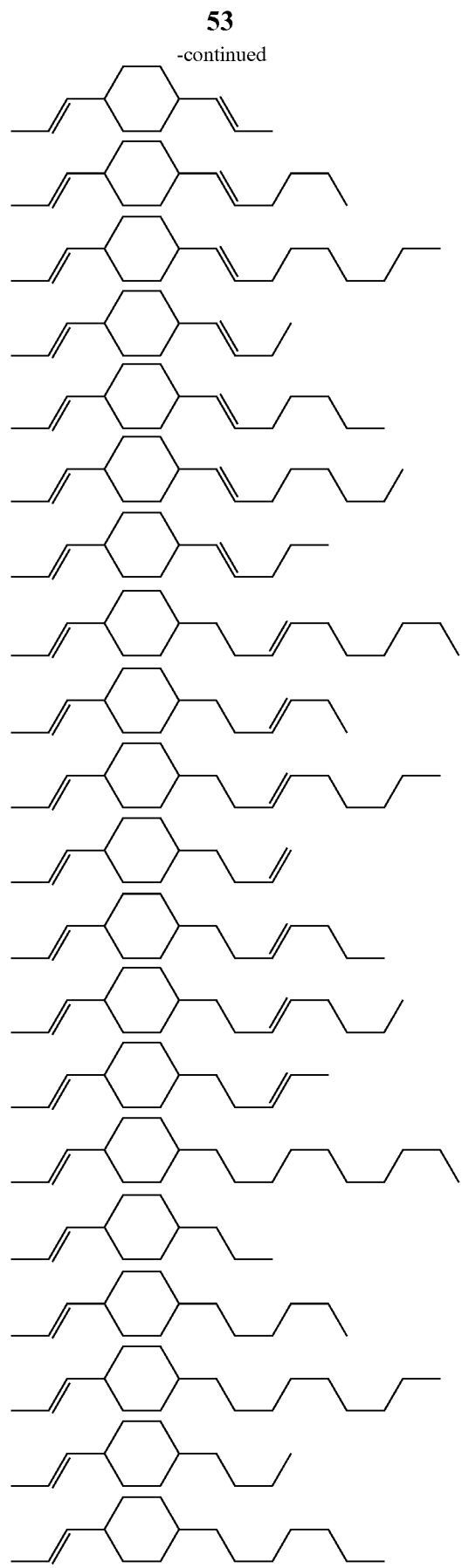
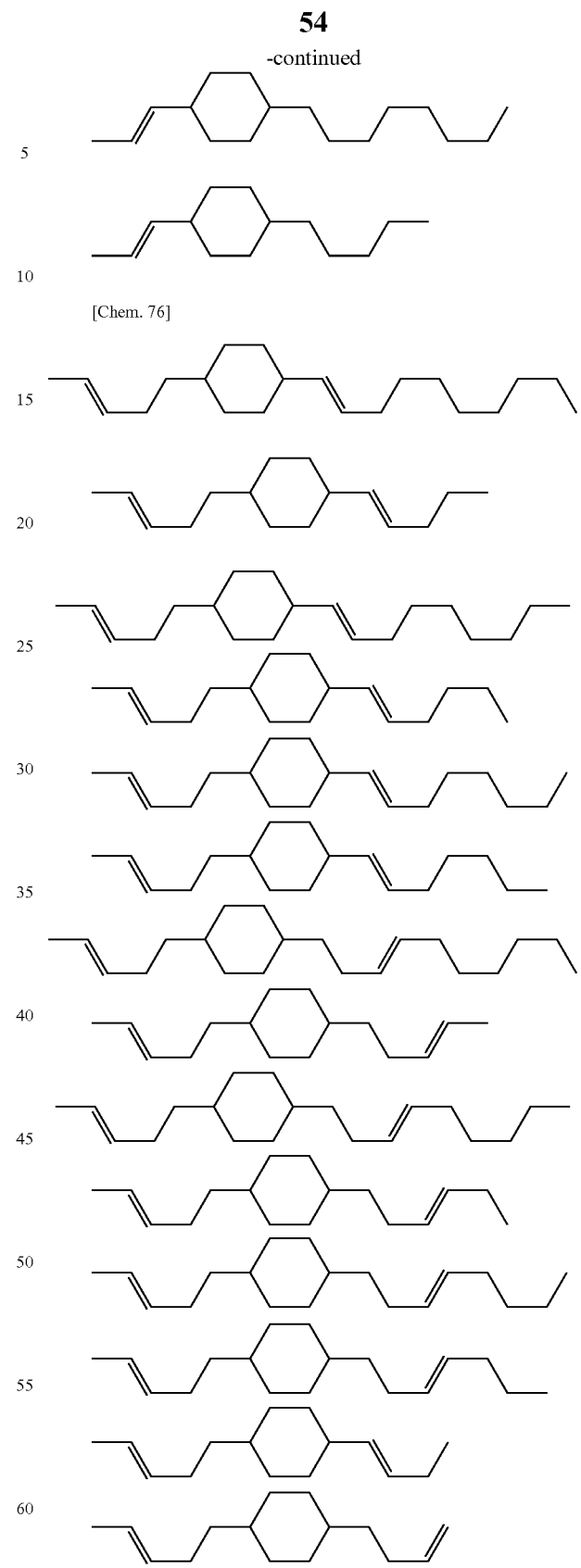
The liquid crystal composition of the present invention can further contain at least one compound represented by general formula (VII).

[Chem. 77]

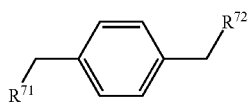
(VII)

(In the formula, $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.)

The types of compounds which can be combined are not particularly limited, but preferably one to three, more preferably one to four, and particularly preferably one to five or more, of the compounds are contained according to desired performance such as solubility at a low temperature, transition temperature, electric reliability, birefringence, etc. The maximum allowable content is preferably 35% by mass or less, more preferably 25% by mass or less, and still more preferably 15% by mass or less.

Examples of a compound which can be preferably used as the compound represented by the general formula (VII) are given below.

[Chem. 78]

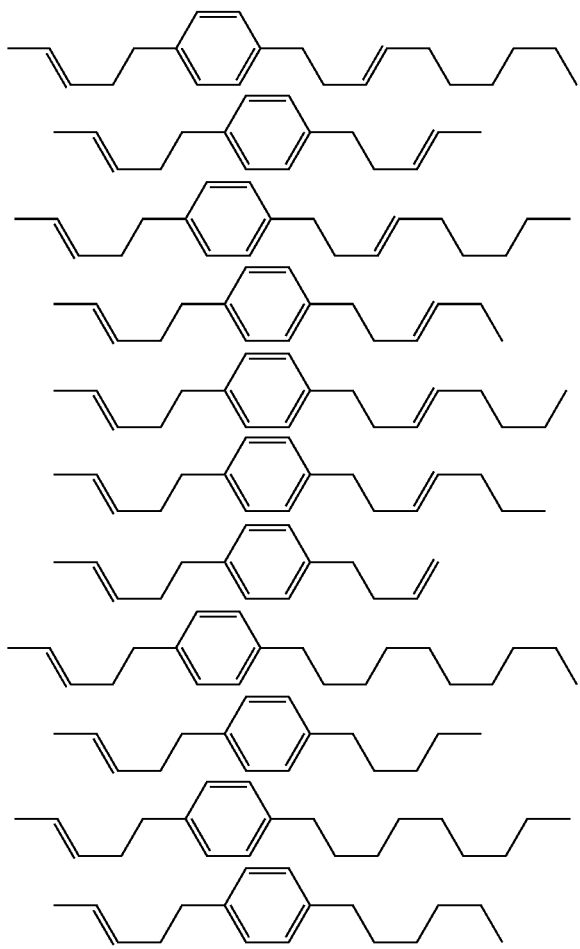

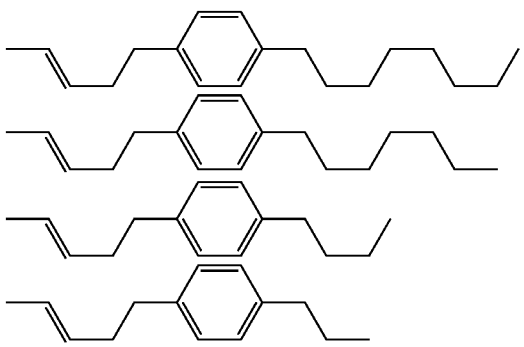

The liquid crystal composition of the present invention preferably further contains a compound represented by general formula (M).

[Chem. 79]

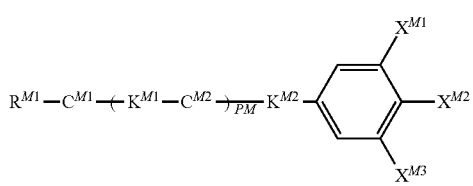
(M)

(In the formula, $R^{M1}$ represents an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:

(d) a 1,4-cyclohexylene group (one —$CH_2$— or nonadjacent two or more —$CH_2$— present in the group may be substituted by —O— or —S—); and (e) a 1,4-phenylene group (one —CH= or nonadjacent two or more —CH= present in the group may be substituted by —N=), and the group (d) and the group (e) may be each independently substituted by a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

when PM is 2, 3, or 4 and a plurality of $K^{M1}$ are present, $K^{M1}$ may be the same or different, and when PM is 2, 3, or 4 and a plurality of $C^{M2}$ are present, $C^{M2}$ may be the same or different;

$X^{M1}$ and $M^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. However, the compounds represented by the general formula (i) are excluded.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6. According to a further embodiment of the present invention, the number of the types is 7 or more.

In the liquid crystal composition of the present invention, it is necessary to properly adjust the content of the compound represented by the general formula (M) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 1%. For example, according to another embodiment of the present invention, the lower limit value is 10%. For example, according to still another embodiment of the present invention, the lower limit value is 20%. For example, according to a further embodiment of the present invention, the lower limit value is 30%. For example, according to a further embodiment of the present invention, the lower limit value is 40%. For example, according to a further embodiment of the present invention, the lower limit value is 45%. For example, according to a further embodiment of the present invention, the lower limit value is 50%. For example, according to a further embodiment of the present invention, the lower limit value is 55%. For example, according to a further embodiment of the present invention, the lower limit value is 60%. For example, according to a further embodiment of the present invention, the lower limit value is 65%. For example, according to a further embodiment of the present invention, the lower limit value is 70%. For example, according to a further embodiment of the present invention, the lower limit value is 75%. For example, according to a further embodiment of the present invention, the lower limit value is 80%.

Also, for example, according to an embodiment of the present invention, the upper limit value of the preferred content relative to the total amount of the liquid crystal composition of the present invention is 95%. According to another embodiment of the present invention, the upper limit value is 85%. According to still another embodiment of the present invention, the upper limit value is 75%. According to a further embodiment of the present invention, the upper limit value is 65%. According to a further embodiment of the present invention, the upper limit value is 55%. According to a further embodiment of the present invention, the upper limit value is 45%. According to a further embodiment of the present invention, the upper limit value is 35%. According to a further embodiment of the present invention, the upper limit value is 25%.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition having good temperature stability is required, both the lower limit value and the upper limit value are preferably slightly low. In addition, when it is desired to increase dielectric anisotropy for keeping the drive voltage low, both the lower limit value and the upper limit value are preferably slightly high.

When a ring structure to which $R^{M1}$ is bonded is a phenyl group (aromatic), $R^{M1}$ is preferably a linear alkyl group having 1 to 5 carbon atoms, a linear alkoxy group having 1 to 4 carbon atoms, or an alkenyl group having 4 to 5 carbon atoms. While when a ring structure to which $R^{M1}$ is bonded is a saturated ring structure, such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

When a ring structure to which $R^{M1}$ is bonded is a phenyl group (aromatic), $R^{M1}$ is preferably a linear alkyl group having 1 to 5 carbon atoms, a linear alkoxy group having 1 to 4 carbon atoms, or an alkenyl group having 4 to 5 carbon atoms. While when a ring structure to which $R^{M1}$ is bonded is a saturated ring structure, such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

When the liquid crystal composition is required to have chemical stability, a compound represented by the general formula (M) preferably does not contain a chlorine atom in its molecule. Further, the content of a compound containing a chlorine atom in the liquid crystal composition is preferably 5% or less, preferably 3% or less, preferably 1% or less, and preferably 0.5% or less, and the compound containing a chlorine atom is preferably substantially not contained. The expression "substantially not contained" represents that the liquid crystal composition is contaminated with only an unintentional compound having a chlorine atom such as a compound produced as impurities during production of the compound.

The compound represented by the general formula (M) is preferably, for example, a compound selected from a compound group represented by general formula (VIII).

[Chem. 80]

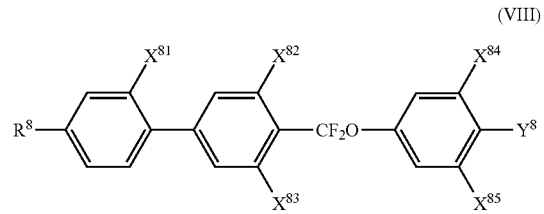

(VIII)

(In the formula, $R^8$ represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —$OCF_3$.)

The types of compounds which can be combined are not particularly limited, but the compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to a further embodiment of the present invention, the number of the types is 3 or more.

In the liquid crystal composition of the present invention, it is necessary to properly adjust the content of the compound represented by the general formula (VIII) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 2%. For example, according to another embodiment of the present invention, the lower limit value is 4%. For example, according to still another embodiment of the present invention, the lower limit value is 5%. For example, according to a further embodiment of the present invention, the lower limit value is 6%. For example, according to a further embodiment of the present invention, the lower limit value is 7%. For example, according to a further embodiment of the present invention, the lower limit value is 8%. For example, according to a further embodiment of the present invention, the lower limit value is 9%. For example, according to a further embodiment of the present invention, the lower limit value is 10%. For example, according to a further embodiment of the present invention, the lower limit value is 11%. For example, according to a further embodiment of the present invention, the lower limit value is 12%. For example, according to a further embodiment of the present invention, the lower limit value is 14%. For example, according to a further embodiment of the present invention, the lower limit value is 15%. For example, according to a further embodiment of the present invention, the lower limit value is 21%. For example, according to a further embodiment of the present invention, the lower limit value is 23%.

Also, for example, according to an embodiment of the present invention, the upper limit value of the preferred content relative to the total amount of the liquid crystal composition of the present invention is 40%. According to another embodiment of the present invention, the upper limit value is 30%. According to still another embodiment of the present invention, the upper limit value is 25%. According to a further embodiment of the present invention, the upper limit value is 21%. According to a further embodiment of the present invention, the upper limit value is 16%. According to a further embodiment of the present invention, the upper limit value is 12%. According to a further embodiment of the present invention, the upper limit value is 8%. According to a further embodiment of the present invention, the upper limit value is 5%.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition having good temperature stability is required, both the lower limit value and the upper limit value are preferably slightly low. In addition, when it is desired to increase dielectric anisotropy for keeping the drive voltage low, both the lower limit value and the upper limit value are preferably slightly high.

Further, the compound represented by the general formula (VIII) is preferably a compound represented by general formula (VIII-1).

[Chem. 81]

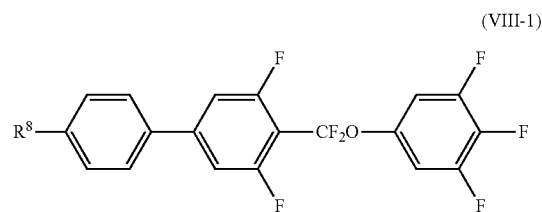

(VIII-1)

(In the formula, $R^8$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2 or more.

Further, preferred examples of the compound represented by the general formula (VIII-1) include compounds represented by formula (26.1) to formula (26.4), a compound represented by the formula (26.1) or the formula (26.2) is preferred, and the compound represented by the formula (26.2) is more preferred.

[Chem. 82]

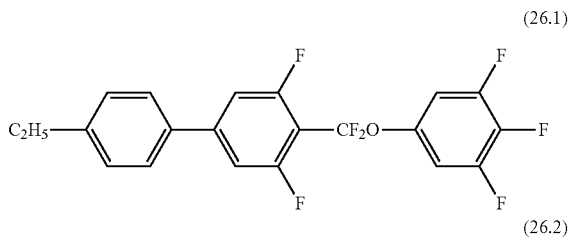

(26.1)

(26.2)

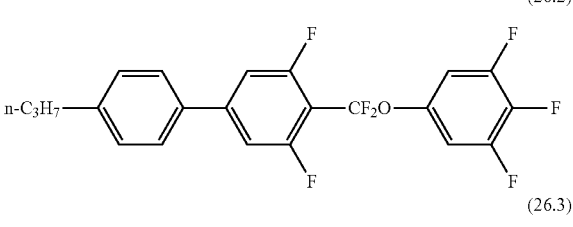

(26.3)

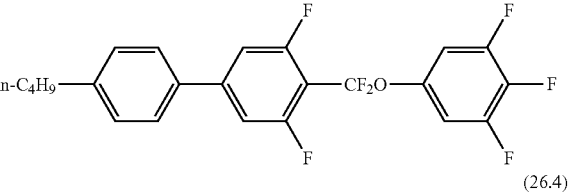

(26.4)

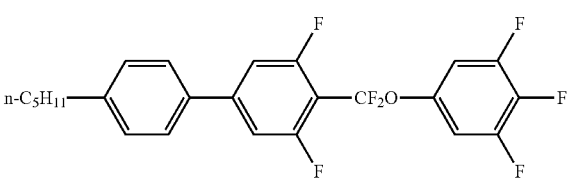

In view of solubility at a low temperature, transition temperature, electric reliability, birefringence, etc., the content of the compound represented by the formula (26.2) relative to the total amount of the liquid crystal composition of the present invention is preferably 2% by mass or more, more preferably 4% by mass or more, and particularly preferably 5% by mass or more. In view of solubility at a low temperature, transition temperature, electric reliability, etc., the maximum ratio is preferably limited to 40% by mass or less, more preferably 35% by mass or less, still more preferably 30% by mass or less, and particularly preferably 25% by mass or less.

Further, the compound represented by the general formula (VIII) is preferably a compound represented by general formula (VIII-2).

[Chem. 83]

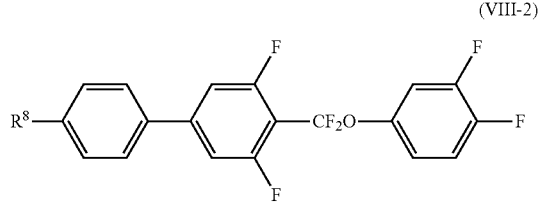
(VIII-2)

(In the formula, R⁸ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to a further embodiment of the present invention, the number of the types is 3 or more.

In view of solubility at a low temperature, transition temperature, electric reliability, birefringence, etc., the content of the compound represented by the general formula (VIII-2) is preferably 2.5% by mass or more, preferably 8% by mass or more, more preferably 10% by mass or more, and still more preferably 12% by mass or more. The maximum allowable content is preferably 25% by mass or less, more preferably 20% by mass or less, and still more preferably 15% by mass or less.

Further, preferred examples of the compound represented by the general formula (VIII-2) include compounds represented by formula (27.1) to formula (27.4), and a compound represented by the formula (27.2) is more preferred.

[Chem. 84]

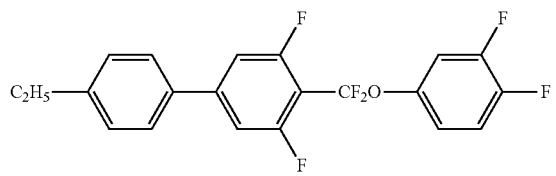
(27.1)

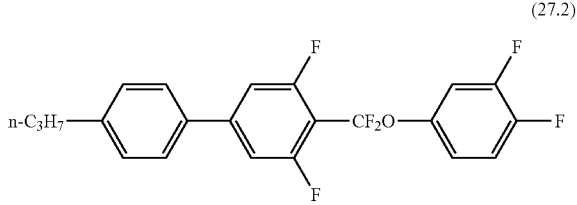
(27.2)

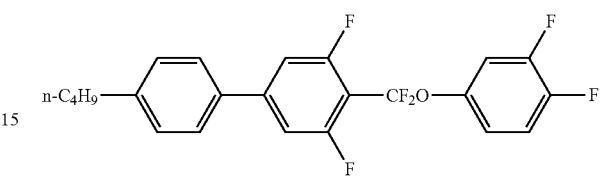
(27.3)

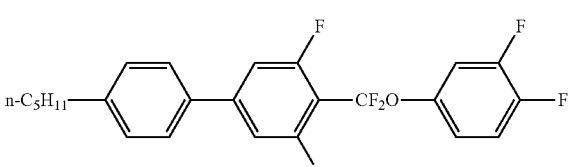
(27.4)

The compound represented by the general formula (M) is preferably, for example, a compound selected from a compound group represented by general formula (IX).

[Chem. 85]

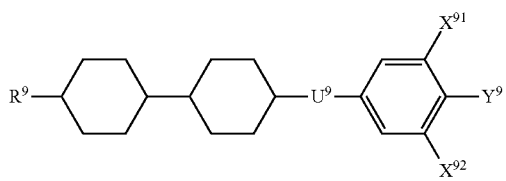
(IX)

(In the formula, R⁹ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, $Y^9$ represents a fluorine atom, a chlorine atom, or —OCF₃, and $U^9$ represents a single bond, —COO—, or —CF₂O—.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In the liquid crystal composition of the present invention, it is necessary to properly adjust the content of the compound represented by the general formula (Ix) according to desired performance such as solubility at a low temperature, transition temperature, electric reliability, birefringence, process adaptability, dropping marks, image sticking, dielectric anisotropy, etc.

For example, according to an embodiment of the present invention, the lower limit value of the preferred content relative to the total amount of the liquid crystal composition of the present invention is 3%. For example, according to another embodiment of the present invention, the lower limit value is 5%. For example, according to still another embodiment of the present invention, the lower limit value is 8%. For example, according to a further embodiment of the present invention, the lower limit value is 10%. For example, according to a further embodiment of the present invention, the lower limit value is 12%. For example, according to a further embodiment of the present invention, the lower limit value is 15%. For example, according to a further embodiment of the present invention, the lower limit value is 17%. For example, according to a further embodiment of the present invention, the lower limit value is 20%. For example, according to a further embodiment of the present invention, the lower limit value is 24%. For example, according to a further embodiment of the present invention, the lower limit value is 28%. For example, according to a further embodiment of the present invention, the lower limit value is 30%. For example, according to a further embodiment of the present invention, the lower limit value is 34%. For example, according to a further embodiment of the present invention, the lower limit value is 39%. For example, according to a further embodiment of the present invention, the lower limit value is 40%. For example, according to a further embodiment of the present invention, the lower limit value is 42%. For example, according to a further embodiment of the present invention, the lower limit value is 45%.

Also, for example, according to an embodiment of the present invention, the upper limit value of the preferred content relative to the total amount of the liquid crystal composition of the present invention is 70%. According to another embodiment of the present invention, the upper limit value is 60%. According to still another embodiment of the present invention, the upper limit value is 55%. According to a further embodiment of the present invention, the upper limit value is 50%. According to a further embodiment of the present invention, the upper limit value is 45%. According to a further embodiment of the present invention, the upper limit value is 40%. According to a further embodiment of the present invention, the upper limit value is 35%. According to a further embodiment of the present invention, the upper limit value is 30%. According to a further embodiment of the present invention, the upper limit value is 25%. According to a further embodiment of the present invention, the upper limit value is 20%. According to a further embodiment of the present invention, the upper limit value is 15%. According to a further embodiment of the present invention, the upper limit value is 10%.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

Further, the compound represented by the general formula (IX) is preferably a compound represented by general formula (IX-1).

[Chem. 86]

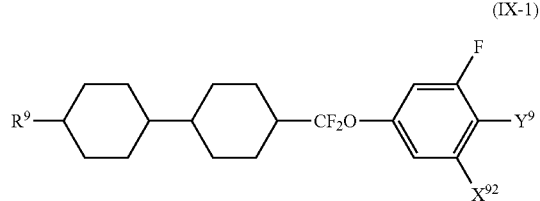

(IX-1)

(In the formula, $R^9$ represents an alkyl group having 1 to 5 carbon atoms, an alkenyl group having 2 to 5 carbon atoms, or an alkoxy group having 1 to 4 carbon atoms, $X^{92}$ represents a hydrogen atom or a fluorine atom, and $Y^9$ represents a fluorine atom or —$OCF_3$.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4 or more.

Further, the compound represented by the general formula (IX-1) is preferably a compound represented by general formula (IX-1-1).

[Chem. 87]

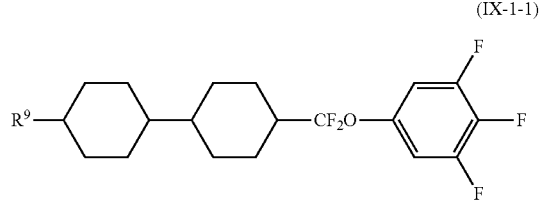

(IX-1-1)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but compounds are used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3 or more.

In view of solubility at a low temperature, transition temperature, electric reliability, birefringence, etc., the content of the compound represented by the general formula (IX-1-1) has preferred upper limit and lower limit values according to an embodiment.

For example, according to an embodiment, the lower limit value of the content relative to the total amount of the liquid crystal composition of the present invention is preferably 1%; according to another embodiment, the lower limit value is preferably 2%; according to still another embodiment, the lower limit value is preferably 4%; according to a further embodiment, the lower limit value is preferably 10%; according to a further embodiment, the lower limit value is preferably 14%; according to a further embodiment, the lower limit value is preferably 16%; and according to a further embodiment, the lower limit value is preferably 21%.

In addition, according to an embodiment, the upper limit value of the content is preferably 40%; according to another embodiment, the upper limit value is preferably 35%; according to still another embodiment, the upper limit value is preferably 30%; according to a further embodiment, the upper limit value is preferably 25%; according to a further embodiment, the upper limit value is preferably 10%; according to a further embodiment, the upper limit value is preferably 7%; and according to a further embodiment, the upper limit value is preferably 5%.

Further, preferred examples of the compound represented by the general formula (IX-1-1) include compounds represented by formula (28.1) to formula (28.5), and a compound represented by formula (28.3) and/or formula (28.5) is more preferred.

[Chem. 88]

(28.1)

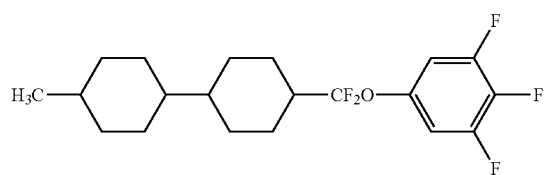

(28.2)

(28.3)

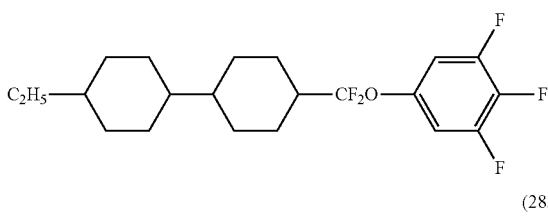

(28.4)

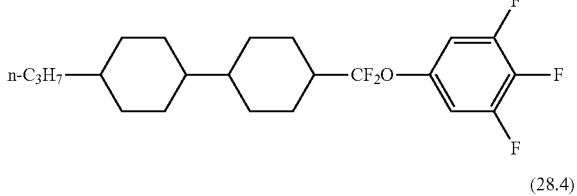

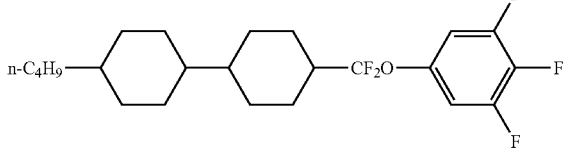

-continued (28.5)

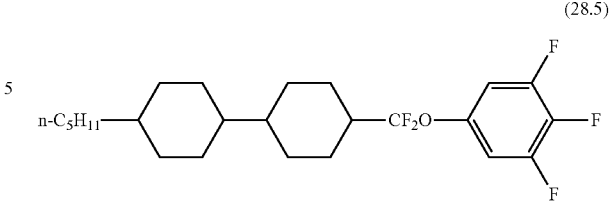

In the liquid crystal composition of the present invention, the content of the compound represented by the formula (28.3) relative to the total amount of the liquid crystal composition of the present invention is preferably 1% by mass or more, more preferably 3% by mass or more, more preferably 5% by mass or more, more preferably 8% by mass or more, more preferably 10% by mass or more, more preferably 14% by mass or more, and particularly preferably 16% by mass or more. In view of solubility at a low temperature, transition temperature, electric reliability, etc., the maximum ratio is preferably limited to 30% by mass or less, more preferably 25% by mass or less, still more preferably 22% by mass or less, and particularly preferably less than 20% by mass.

In the liquid crystal composition of the present invention, the content of the compound represented by the formula (28.5) relative to the total amount of the liquid crystal composition of the present invention is preferably 3% by mass or more and more preferably 5% by mass or more. In view of solubility at a low temperature, transition temperature, electric reliability, etc., the maximum ratio is preferably limited to 25% by mass or less, more preferably less than 20% by mass, still more preferably 15% by mass or less, and particularly preferably less than 13% by mass.

Further, the compound represented by the general formula (IX-1) is preferably a compound represented by general formula (IX-1-2).

[Chem. 89]

(IX-1-2)

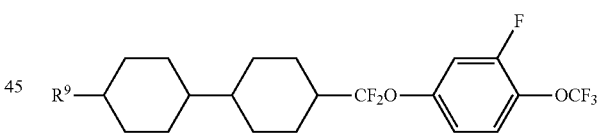

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but the compounds are preferably used alone or in combination of two or three, more preferably two to four.

The content of the compound represented by the general formula (IX-1-2) relative to the total amount of the liquid crystal composition of the present invention is preferably 1% by mass or more, more preferably 5% by mass or more, even more preferably 8% by mass or more, still more preferably 10% by mass or more, still more preferably 14% by mass or more, and particularly preferably 16% by mass or more. In addition, in view of solubility at a low temperature, transition temperature, electric reliability, etc., the maximum ratio is preferably limited to 30% by mass or less, more preferably 25% by mass or less, still more preferably 22% by mass or less, and particularly preferably less than 20% by mass.

Further, preferred examples of the compound represented by the general formula (IX-1-2) include compounds represented by formula (29.1) to formula (29.4), and a compound represented by the formula (29.2) and/or formula (29.4) is more preferred.

[Chem. 90]

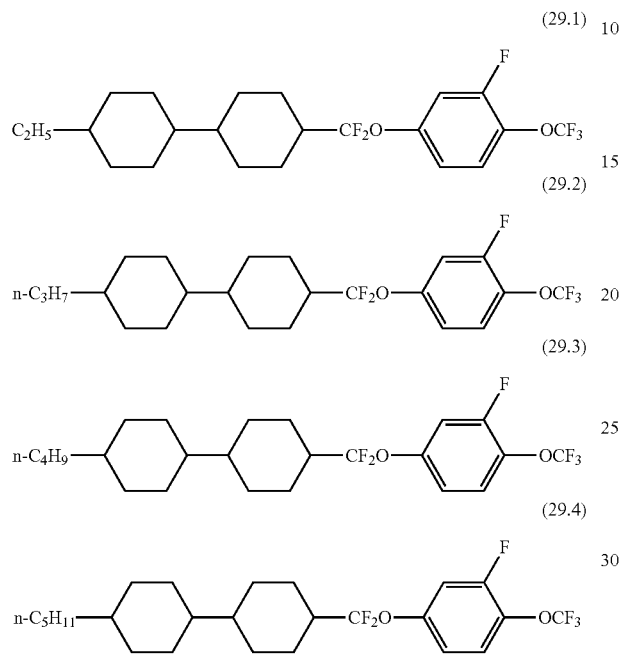

(29.1)

(29.2)

(29.3)

(29.4)

The compound represented by the general formula (IX) is preferably a compound represented by general formula (IX-2).

[Chem. 91]

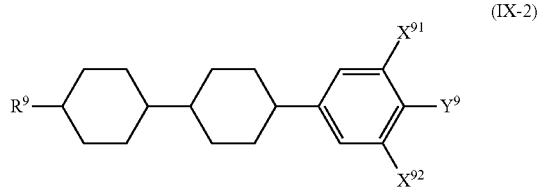

(IX-2)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —OCF$_3$.)

The types of compounds which can be combined are not particularly limited, but the compounds are properly used in combination according to each embodiment in view of solubility at a low temperature, transition temperature, electric reliability, birefringence, etc. For example, according to an embodiment of the present invention, the number of the type of compound used is 1; according to another embodiment, the number of the types combined is 2; according to still another embodiment, the number of the types combined is 3; according to a further embodiment, the number of the types combined is 4; according to a further embodiment, the number of the types combined is 5; and according to a further embodiment, the number of the types combined is 6 or more.

Further, the compound represented by the general formula (IX-2) is preferably a compound represented by general formula (IX-2-1).

[Chem. 92]

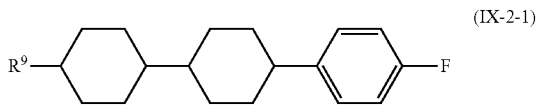

(IX-2-1)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but the compounds are preferably used alone or in combination of two or three in view of solubility at a low temperature, transition temperature, electric reliability, birefringence, etc.

In view of characteristics such as solubility at a low temperature, transition temperature, electric reliability, birefringence, etc., the content of the compound represented by the general formula (IX-2-1) has preferred upper limit and lower limit values according to each embodiment. For example, according to an embodiment of the present invention, the lower limit value of the content relative to the total amount of the liquid crystal composition of the present invention is 1%; according to another embodiment, the lower limit value is 2%; according to still another embodiment, the lower limit value is 4%; according to a further embodiment, the lower limit value is 10%; according to a further embodiment, the lower limit value is 14%; according to a further embodiment, the lower limit value is 16%; and according to a further embodiment, the lower limit value is 21%. Also, for example, according to an embodiment of the present invention, the upper limit value of the content is 40%; according to another embodiment, the upper limit value is 35%; according to still another embodiment, the upper limit value is 30%; according to a further embodiment, the upper limit value is 25%; according to a further embodiment, the upper limit value is 22%; according to a further embodiment, the upper limit value is 20%; according to a further embodiment, the upper limit value is 10%; according to a further embodiment, the upper limit value is 7%; and according to a further embodiment, the upper limit value is 5%.

Further, preferred examples of the compound represented by the general formula (IX-2-1) include compounds represented by formula (30.1) to formula (30.4), and compounds represented by the formula (30.1) and formula (30.2) are more preferred.

[Chem. 93]

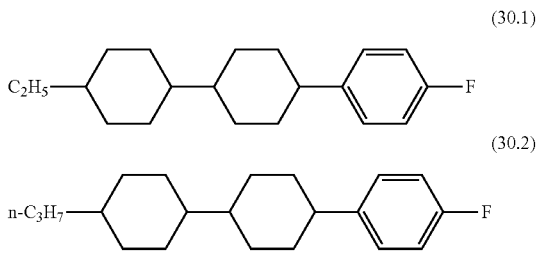

(30.1)

(30.2)

-continued (30.3)
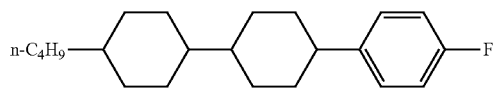

(30.4)
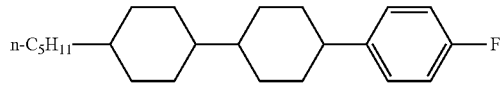

Further, the compound represented by the general formula (IX-2) is preferably a compound represented by general formula (IX-2-2).

[Chem. 94]

(IX-2-2)
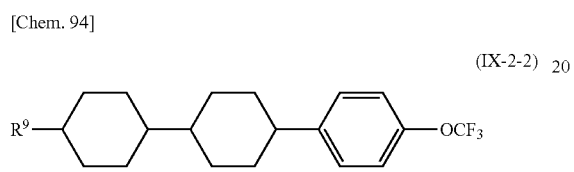

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but the compounds are preferably used alone or in combination of two or three, more preferably two to four, in view of solubility at a low temperature, transition temperature, electric reliability, birefringence, etc.

In view of characteristics such as solubility at a low temperature, transition temperature, electric reliability, birefringence, etc., the content of a compound represented by the general formula (IX-2-2) has preferred upper limit and lower limit values according to each embodiment. For example, according to an embodiment of the present invention, the lower limit value of the content relative to the total amount of the liquid crystal composition of the present invention is 1%; according to another embodiment, the lower limit value is 2%; according to still another embodiment, the lower limit value is 4%; according to a further embodiment, the lower limit value is 10%; according to a further embodiment, the lower limit value is 14%; according to a further embodiment, the lower limit value is 16%; and according to a further embodiment, the lower limit value is 21%. Also, for example, according to an embodiment of the present invention, the upper limit value of the content is 40%; according to another embodiment, the upper limit value is 35%; according to still another embodiment, the upper limit value is 30%; according to a further embodiment, the upper limit value is 25%; according to a further embodiment, the upper limit value is 22%; according to a further embodiment, the upper limit value is 15%; according to a further embodiment, the upper limit value is 12%; according to a further embodiment, the upper limit value is 8%; and according to a further embodiment, the upper limit value is 4%.

Further, preferred examples of the compound represented by the general formula (IX-2-2) include compounds represented by formula (31.1) to formula (31.4), and compounds represented by formula (31.1) to formula (31.4) are more preferred.

[Chem. 95]

(31.1)
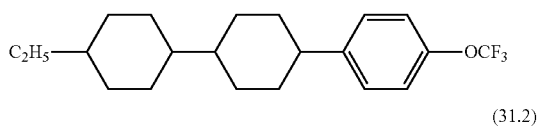

(31.2)
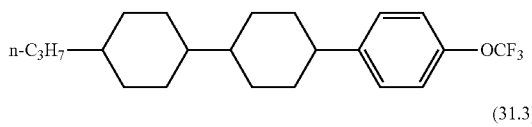

(31.3)
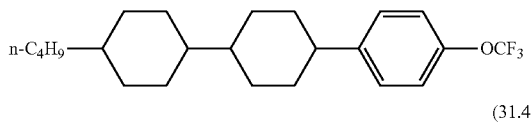

(31.4)
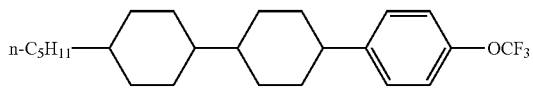

Further, the compound represented by the general limit value is 30%; according to a further embodiment, the upper limit value is 25%; according to a further embodiment, the upper limit value is 22%; according to a further embodiment, the upper limit value is 15%; according to a further embodiment, the upper limit value is 12%; according to a further embodiment, the upper limit value is 8%; and according to a further embodiment, the upper limit value is 4%.

Further, preferred examples of the compound represented by the general formula (IX-2-2) include compounds represented by formula (31.1) to formula (31.4), and compounds represented by formula (31.1) to formula (31.4) are more preferred.

[Chem. 95]

(31.1)
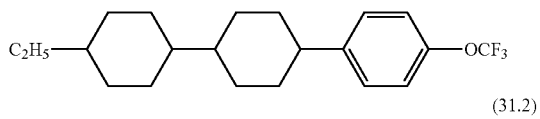

(31.2)
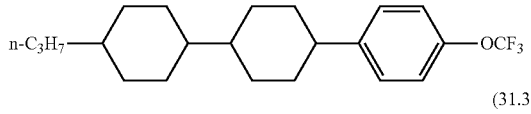

(31.3)
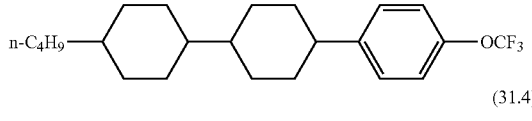

(31.4)
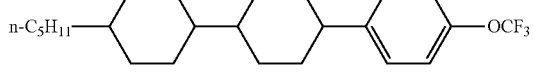

Further, the compound represented by the general formula (IX-2) is preferably a compound represented by general formula (IX-2-3).

[Chem. 96]

(IX-2-3)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but the compounds are preferably used alone or in combination of two in view of solubility at a low temperature, transition temperature, electric reliability, birefringence, etc.

The content of a compound represented by the general formula (IX-2-3) relative to the total amount of the liquid crystal composition of the present invention is preferably 1% by mass or more, more preferably 3% by mass or more, even more preferably 6% by mass or more, still more preferably 8% by mass or more, and particularly preferably 15% by mass or more. In addition, in view of solubility at a low temperature, transition temperature, electric reliability, etc., the maximum ratio is preferably limited to 30% by mass or less, more preferably less than 20% by mass, still more preferably 15% by mass or less, and particularly preferably less than 10% by mass.

Further, preferred examples of the compound represented by the general formula (IX-2-3) include compounds represented by formula (32.1) to formula (32.4), and a compound represented by formula (32.2) and/or a compound represented by formula (32.4) is more preferred.

[Chem. 97]

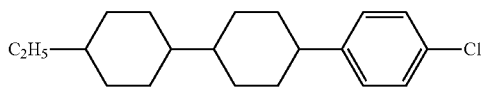
(32.1)

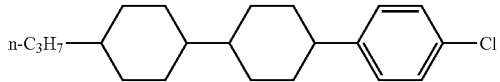
(32.2)

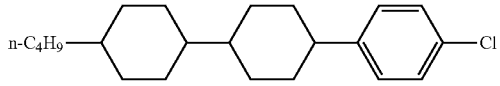
(32.3)

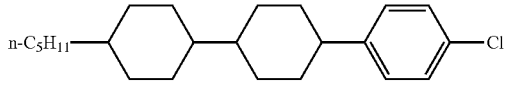
(32.4)

Further, the compound represented by the general formula (IX-2) is preferably a compound represented by general formula (IX-2-4).

[Chem. 98]

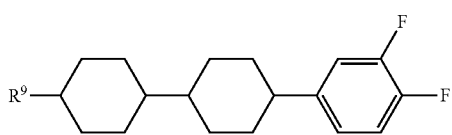
(IX-2-4)

(In the formula, $R^9$ represents an alkyl group having 1 to 5 carbon atoms, an alkenyl group having 2 to 5 carbon atoms, or an alkoxy group having 1 to 4 carbon atoms.)

The content of a compound represented by the general formula (IX-2-4) relative to the total amount of the liquid crystal composition of the present invention is preferably 1% by mass or more, more preferably 3% by mass or more, still more preferably 6% by mass or more, and particularly preferably 8% by mass or more. In addition, in view of solubility at a low temperature, transition temperature, electric reliability, etc., the maximum ratio is preferably limited to 30% by mass or less, more preferably 20% by mass or less, still more preferably 15% by mass or less, and particularly preferably less than 10% by mass.

Further, preferred examples of the compound represented by the general formula (IX-2-4) include compounds represented by formula (33.1) to formula (33.5), and a compound represented by the formula (33.1) and/or the formula (33.3) is more preferred.

[Chem. 99]

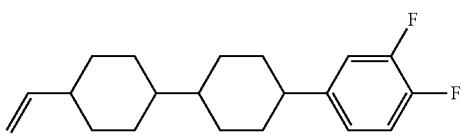
(33.1)

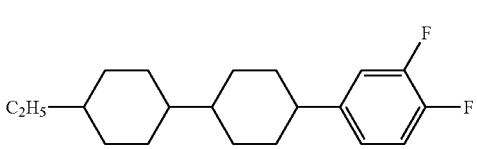
(33.2)

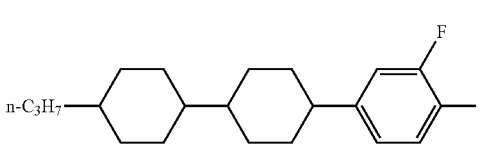
(33.3)

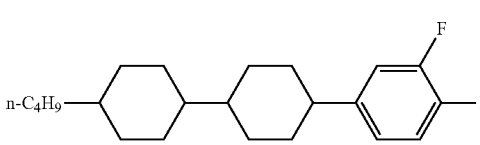
(33.4)

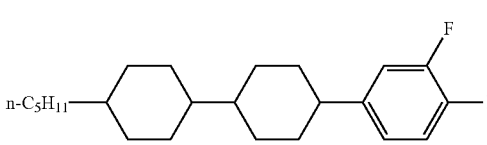
(33.5)

Further, the compound represented by the general formula (IX-2) is preferably a compound represented by general formula (IX-2-5).

[Chem. 100]

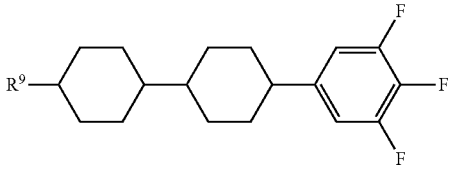
(IX-2-5)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but the compounds are properly used in combination according to each embodiment in view of solubility at a low temperature, transition temperature, electric reliability, birefringence, etc. For example, according to an embodiment of the present invention, the number of type used is 1; according to another embodiment, the number the types is 2; according to still another embodiment, the number of types used is 3; and according to a further embodiment, the number of types used is 4 or more.

In view of characteristics such as solubility at a low temperature, transition temperature, electric reliability, birefringence, etc., the content of the compound represented by the general formula (IX-2-5) has upper limit and lower limit values according to each embodiment. For example, according to an embodiment of the present invention, the lower limit value of the content relative to the total amount of the liquid crystal composition of the present invention is 4%; according to another embodiment, the lower limit value is 8%; according to still another embodiment, the lower limit value is 12%; according to a further embodiment, the lower limit value is 21%; according to a further embodiment, the lower limit value is 30%; according to a further embodiment, the lower limit value is 31%; and according to a further embodiment, the lower limit value is 34%. Also, for example, according to an embodiment of the present invention, the upper limit value of the content is 45%; according to another embodiment, the upper limit value is 40%; according to still another embodiment, the upper limit value is 35%; according to a further embodiment, the upper limit value is 32%; according to a further embodiment, the upper limit value is 22%; according to a further embodiment, the upper limit value is 13%; according to a further embodiment, the upper limit value is 9%; according to a further embodiment, the upper limit value is 8%; and according to a further embodiment, the upper limit value is 5%.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

Further, preferred examples of the compound represented by the general formula (IX-2-5) include compounds represented by formula (34.1) to formula (34.5), and a compound represented by the formula (34.1), the formula (34.2), the formula (34.3), and/or the formula (34.5) is more preferred.

[Chem. 101]

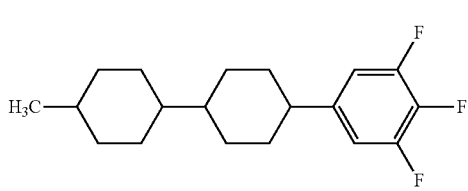
(34.1)

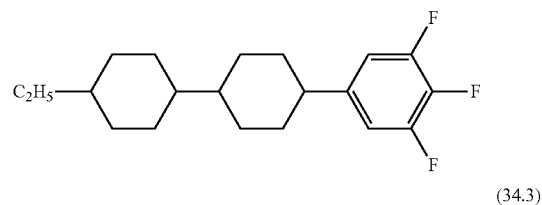
(34.2)

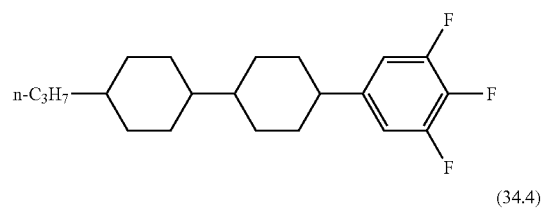
(34.3)

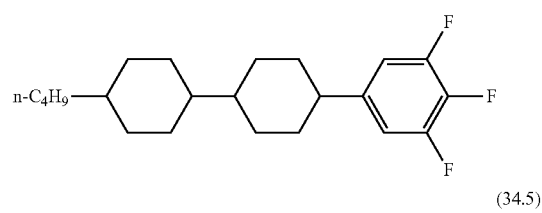
(34.4)

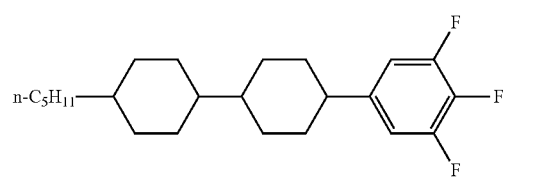
(34.5)

The compound represented by the general formula (IX) is preferably a compound represented by general formula (IX-3).

[Chem. 102]

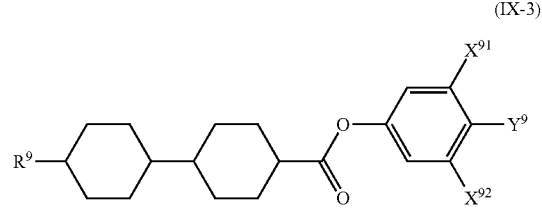
(IX-3)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.)

Further, the compound represented by the general formula (IX-3) is preferably a compound represented by general formula (IX-3-1).

[Chem. 103]

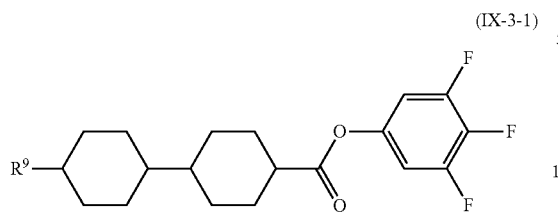

(IX-3-1)

(In the formula, R$^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but the compounds are preferably used alone or in combination of two in view of solubility at a low temperature, transition temperature, electric reliability, birefringence, etc.

The content of a compound represented by the general formula (IX-3-1) relative to the total amount of the liquid crystal composition of the present invention is preferably 3% by mass or more, more preferably 7% by mass or more, still more preferably 13% by mass or more, and particularly preferably 15% by mass or more. In addition, in view of solubility at a low temperature, transition temperature, electric reliability, etc., the maximum ratio is preferably limited to 30% by mass or less, more preferably 20% by mass or less, still more preferably 18% by mass or less, and particularly preferably less than 10% by mass.

Further, preferred examples of the compound represented by the general formula (IX-3-1) include compounds represented by formula (35.1) to formula (35.4), and a compound represented by the formula (35.1) and/or the formula (35.2) is more preferred.

[Chem. 104]

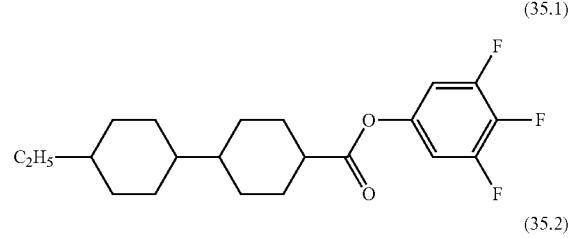

(35.1)

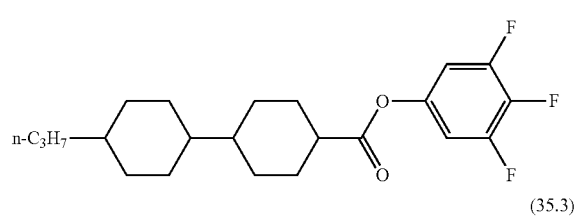

(35.2)

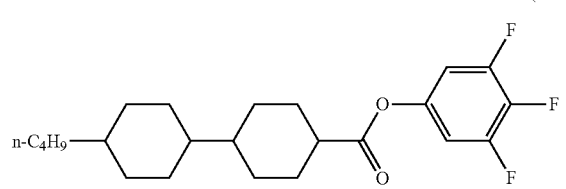

(35.3)

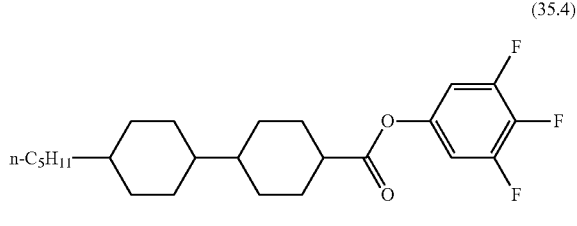

(35.4)

The compound represented by the general formula (M) is preferably a compound represented by general formula (X).

[Chem. 105]

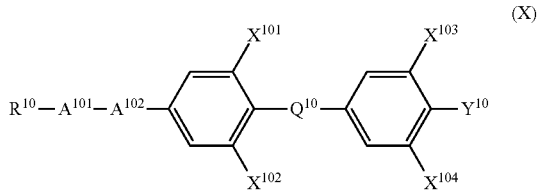

(X)

(In the formula, X$^{101}$ to X$^{104}$ each independently represent a fluorine atom or a hydrogen atom, Y$^{10}$ represents a fluorine atom, a chlorine atom, or —OCF$_3$, Q$^{10}$ represents a single bond or —CF$_2$O—, R$^{10}$ represents an alkyl group having 1 to 5 carbon atoms, an alkenyl group having 2 to 5 carbon atoms, or an alkoxy group having 1 to 4 carbon atoms, and A$^{101}$ and A$^{102}$ each independently represent a 1,4-cyclohexylene group, a 1,4-phenylene group, or

[Chem. 106]

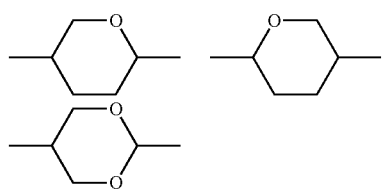

wherein a hydrogen atom on a 1,4-phenylene group may be substituted by a fluorine atom, the compounds represented by the general formula (i) being excluded.)

Compounds which can be combined are not particularly limited, but are properly used in combination according to each embodiment in view of solubility at a low temperature, transition temperature, electric reliability, birefringence, etc. For example, according to an embodiment of the present invention, the number of the type of compound used is 1. According to another embodiment of the present invention, the number of the types is 2. According to still another embodiment, the number of the types is 3. According to a further embodiment, the number of the types is 4. According to a further embodiment, the number of the types is 5 or more.

In view of characteristics such as solubility at a low temperature, transition temperature, electric reliability, birefringence, etc., the content of a compound represented by the general formula (X) has an upper limit value and a lower limit value according to each embodiment. For example, according to an embodiment of the present invention, the lower limit value of the content relative to the total amount of the liquid crystal composition of the present invention is 2%; according to another embodiment, the lower limit value is 3%; according to still another embodiment, the lower limit value is 6%; according to a further embodiment, the lower limit value is 8%; according to a further embodiment, the lower limit value is 9%; according to a further embodiment, the lower limit value is 11%; according to a further embodiment, the lower limit value is 12%; according to a further embodiment, the lower limit value is 18%; according to a further embodiment, the lower limit value is 19%; according to a further embodiment, the lower limit value is 23%; and according to a further embodiment, the lower limit value is 25%. Also, for example, according to an embodiment of the present invention, the upper limit value of the content is 45%; according to another embodiment, the upper limit value is 35%; according to still another embodiment, the upper limit value is 30%; according to a further embodiment, the upper limit value is 25%; according to a further embodiment, the upper limit value is 20%; according to a further embodiment, the upper limit value is 13%; according to a further embodiment, the upper limit value is 9%; according to a further embodiment, the upper limit value is 6%; and according to a further embodiment, the upper limit value is 3%.

When the viscosity of the liquid crystal composition is kept low and the liquid crystal composition having fast response is required, both the lower limit value and the upper limit value are preferably slightly low. Further, when the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

The compound represented by the general formula (X) and used in the liquid crystal composition of the present invention is preferably a compound represented by general formula (X-1).

[Chem. 107]

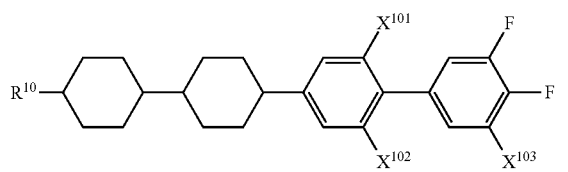

(X-1)

(In the formula, $X^{101}$ to $X^{103}$ each independently represent a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms. However, the compounds represented by the general formula (i) are excluded.)

Compounds which can be combined are not particularly limited, but are properly used in combination according to each embodiment in view of solubility at a low temperature, transition temperature, electric reliability, birefringence, etc. For example, according to an embodiment of the present invention, the number of the type used is 1. According to another embodiment of the present invention, the number of the types is 2. According to still another embodiment, the number of the types is 3. According to a further embodiment, the number of the types is 4. According to a further embodiment, the number of the types is 5 or more.

In view of characteristics such as solubility at a low temperature, transition temperature, electric reliability, birefringence, etc., the content of a compound represented by the general formula (X-1) has an upper limit value and a lower limit value according to each embodiment. For example, according to an embodiment of the present invention, the lower limit value of the content relative to the total amount of the liquid crystal composition of the present invention is 2%; according to another embodiment, the lower limit value is 3%; according to still another embodiment, the lower limit value is 5%; according to a further embodiment, the lower limit value is 6%; according to a further embodiment, the lower limit value is 7%; according to a further embodiment, the lower limit value is 8%; according to a further embodiment, the lower limit value is 9%; according to a further embodiment, the lower limit value is 13%; according to a further embodiment, the lower limit value is 18%; and according to a further embodiment, the lower limit value is 23%.

Also, for example, according to an embodiment of the present invention, the upper limit value of the content is 40%; according to another embodiment, the upper limit value is 30%; according to still another embodiment, the upper limit value is 25%; according to a further embodiment, the upper limit value is 20%; according to a further embodiment, the upper limit value is 15%; according to a further embodiment, the upper limit value is 10%; according to a further embodiment, the upper limit value is 6%; according to a further embodiment, the upper limit value is 4%; and according to a further embodiment, the upper limit value is 2%.

Further, the compound represented by the general formula (X-1) and used in the liquid crystal composition of the present invention is preferably a compound represented by general formula (X-1-1).

[Chem. 108]

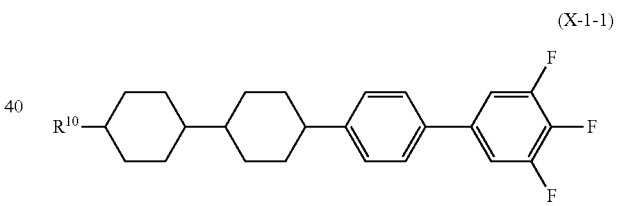

(X-1-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used in combination in view of solubility at a low temperature, transition temperature, electric reliability, birefringence, etc. For example, according to an embodiment of the present invention, the number of the type used is 1. According to another embodiment of the present invention, the number of the types is 2. According to still another embodiment, the number of the types is 3. According to a further embodiment, the number of the types is 4 or more.

The content of a compound represented by the general formula (X-1-1) has an upper limit value and a lower limit value according to each embodiment in view of characteristics such as solubility at a low temperature, transition temperature, electric reliability, birefringence, etc. For example, according to an embodiment of the present invention, the lower limit value of the content relative to the total amount of the liquid crystal composition of the present invention is 3%; according to another embodiment, the lower limit value is 4%; according to still another embodiment, the lower limit value is 6%; according to a further embodiment, the lower limit value is 9%; according to a further embodiment, the lower limit value is 12%; according to a further embodiment, the lower limit value is 15%; according to a further embodiment, the lower limit value is 18%; and according to a further embodiment, the lower limit value is 21%.

Also, for example, according to an embodiment of the present invention, the upper limit value of the content is 30%; according to another embodiment, the upper limit value is 20%; according to still another embodiment, the upper limit value is 13%; according to a further embodiment, the upper limit value is 10%; according to a further embodiment, the upper limit value is 7%; and according to a further embodiment, the upper limit value is 3%.

Preferred examples of the compound represented by the general formula (X-1-1) and used in the liquid crystal composition of the present invention include compounds represented by formula (36.1) to formula (36.4), and particularly a compound represented by the formula (36.1) and/or the formula (36.2) is preferably contained.

[Chem. 109]

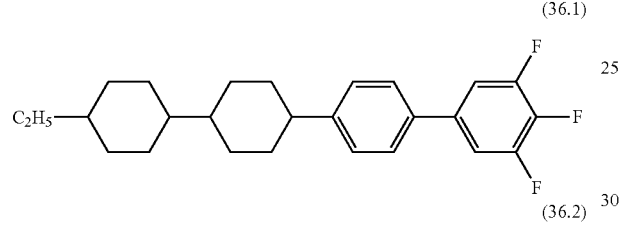
(36.1)

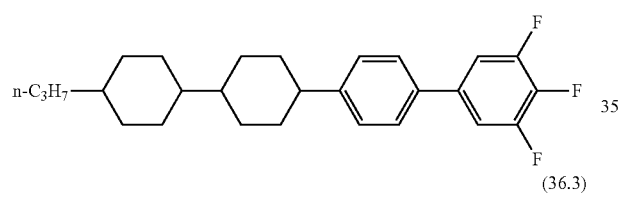
(36.2)

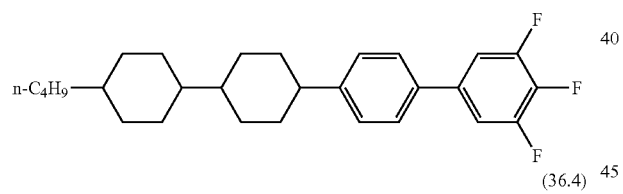
(36.3)

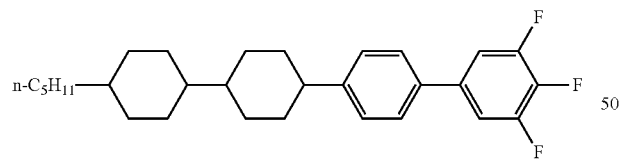
(36.4)

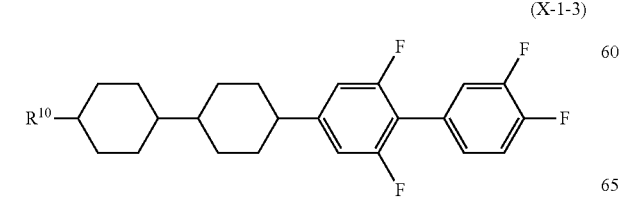

Further, the compound represented by the general formula (X-1) and used in the liquid crystal composition of the present invention is preferably a compound represented by general formula (X-1-3).

[Chem. 110]

(X-1-3)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more in view of solubility at a low temperature, transition temperature, electric reliability, birefringence, etc.

The content of a compound represented by the general formula (X-1-3) relative to the total amount of the liquid crystal composition of the present invention is preferably 1% by mass or more, more preferably 2% by mass or more, and still more preferably 6% by mass or more. In addition, in view of solubility at a low temperature, transition temperature, electric reliability, etc., the maximum ratio is preferably limited to 20% by mass or less, more preferably 16% by mass or less, still more preferably 12% by mass or less, and particularly preferably less than 10% by mass.

Preferred examples of the compound represented by the general formula (X-1-3) and used in the liquid crystal composition of the present invention include compounds represented by formula (38.1) to formula (38.4), and particularly a compound represented by formula (38.2) is preferably contained.

[Chem. 111]

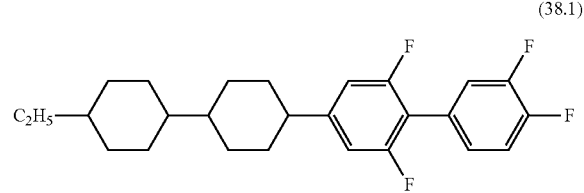
(38.1)

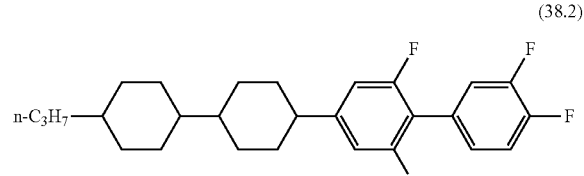
(38.2)

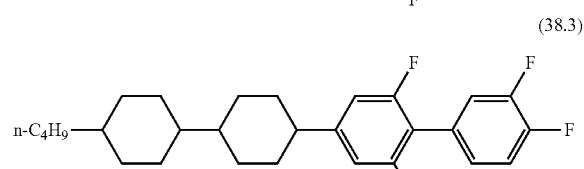
(38.3)

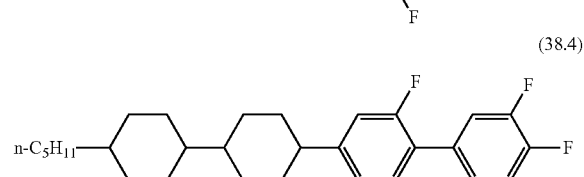
(38.4)

The compound used in the liquid crystal composition of the present invention and represented by the general formula (x) is preferably a compound represented by general formula (X-2).

[Chem. 112]

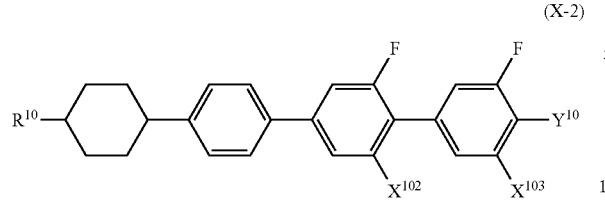

(X-2)

(In the formula, $X^{102}$ and $X^{103}$ each independently represent a fluorine atom or a hydrogen atom, $Y^{10}$ represents a fluorine atom, a chlorine atom, or —$OCF_3$, and $R^{10}$ represents an alkyl group having 1 to 5 carbon atoms, an alkenyl group having 2 to 5 carbon atoms, or an alkoxy group having 1 to 4 carbon atoms. However, the compounds represented by the general formula (i) are excluded.)

Compounds which can be combined are not particularly limited, but are preferably used alone or in combination of two or more in view of solubility at a low temperature, transition temperature, electric reliability, birefringence, etc.

The compound used in the liquid crystal composition of the present invention and represented by the general formula (X-2) is preferably a compound represented by general formula (X-2-1).

[Chem. 113]

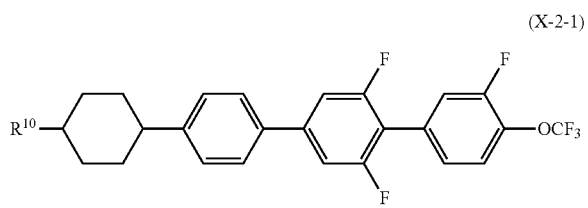

(X-2-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

The content of a compound represented by the general formula (X-2-1) relative to the total amount of the liquid crystal composition of the present invention is preferably 3% by mass or more, more preferably 4% by mass or more, and still more preferably 5% by mass or more. In addition, in view of solubility at a low temperature, transition temperature, electric reliability, etc., the maximum ratio is preferably limited to 20% by mass or less, more preferably 16% by mass or less, still more preferably 12% by mass or less, and particularly preferably 10% by mass or less.

Further, preferred examples of the compound used in the liquid crystal composition of the present invention and represented by the general formula (X-2-1) include compounds represented by formula (39.1) to formula (39.4), and particularly a compound represented by formula (39.2) is more preferably contained.

[Chem. 114]

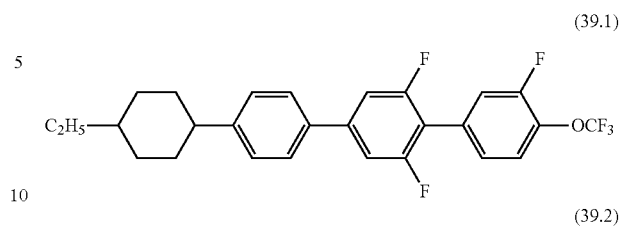

(39.1)

(39.2)

(39.3)

(39.4)

Further, a compound used in the liquid crystal composition of the present invention and represented by the general formula (X-2) is preferably a compound represented by general formula (X-2-2).

[Chem. 115]

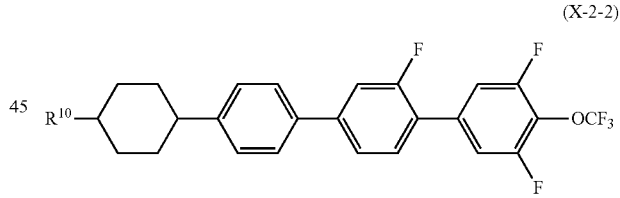

(X-2-2)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more in view of solubility at a low temperature, transition temperature, electric reliability, birefringence, etc.

The content of the compound represented by the general formula (X-2-2) relative to the total amount of the liquid crystal composition of the present invention is preferably 3% by mass or more, more preferably 6% by mass or more, and still more preferably 9% by mass or more. In addition, in view of solubility at a low temperature, transition temperature, electric reliability, etc., the maximum ratio is preferably limited to 20% by mass or less, more preferably 16% by mass or less, still more preferably 12% by mass or less, and particularly preferably 10% by mass or less.

Preferred examples of the compound used in the liquid crystal composition of the present invention and represented by the general formula (X-2-2) include compounds represented by formula (40.1) to formula (40.4), and particularly a compound represented by the formula (40.2) is preferably contained.

[Chem. 116]

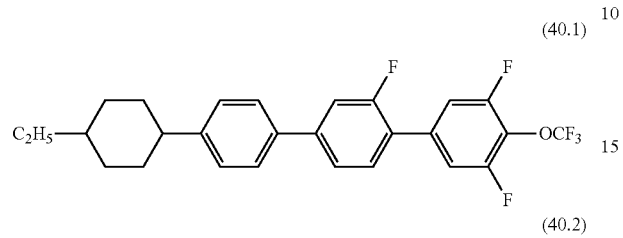

The compound represented by the general formula (X) is preferably a compound represented by general formula (X-3).

[Chem. 117]

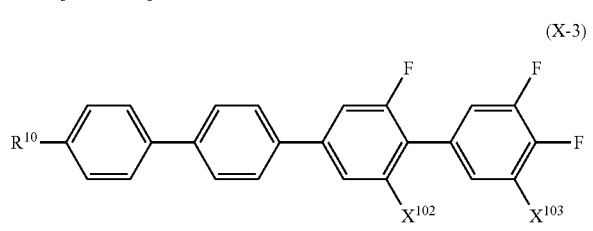

(In the formula, $X^{102}$ and $X^{103}$ each independently represent a fluorine atom or a hydrogen atom, and $R^{10}$ represents an alkyl group having 1 to 5 carbon atoms, an alkenyl group having 2 or 5 carbon atoms, or an alkoxy group having 1 to 4 carbon atoms. However, the compounds represented by the general formula (i) are excluded.)

Compounds which can be combined are not particularly limited, but are preferably used alone or in combination of two or more in view of solubility at a low temperature, transition temperature, electric reliability, birefringence, etc.

Further, the compound represented by the general formula (X) is preferably a compound represented by general formula (X-4).

[Chem. 118]

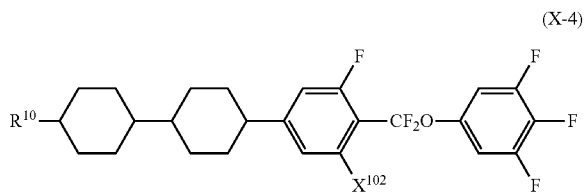

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

Further, the compound represented by the general formula (X-4) and used in the liquid crystal composition of the present invention is preferably a compound represented by general formula (X-4-1).

[Chem. 119]

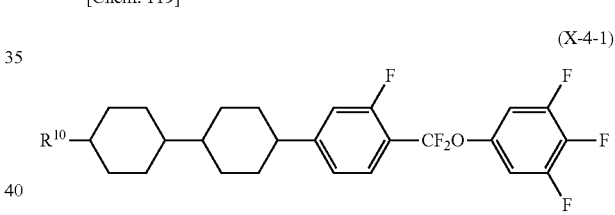

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

The content of a compound represented by the general formula (X-4-1) relative to the total amount of the liquid crystal composition of the present invention is preferably 2% by mass or more, more preferably 4% by mass or more, and still more preferably 6% by mass or more. In addition, in view of solubility at a low temperature, transition temperature, electric reliability, etc., the maximum ratio is preferably limited to 20% by mass or less, more preferably 17% by mass or less, still more preferably 15% by mass or less, and particularly preferably less than 13% by mass.

Further, preferred examples of the compound represented by the general formula (X-4-1) and used in the liquid crystal composition of the present invention include compounds represented by formula (42.1) to formula (42.4), and particularly a compound represented by the formula (42.3) is more preferably contained.

[Chem. 120]

(42.1)

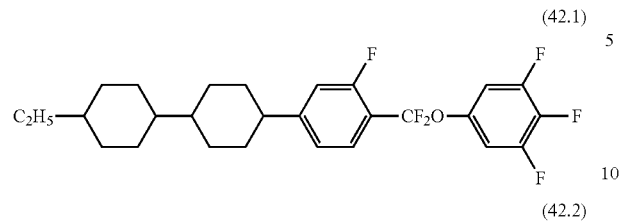

(42.2)

(42.3)

(42.4)

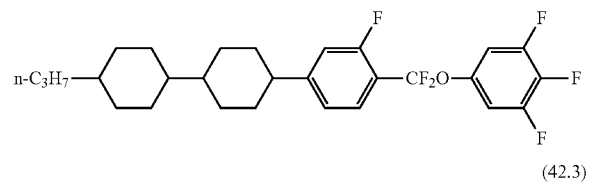
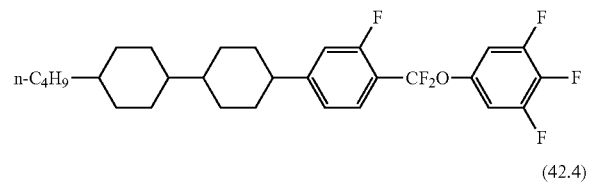
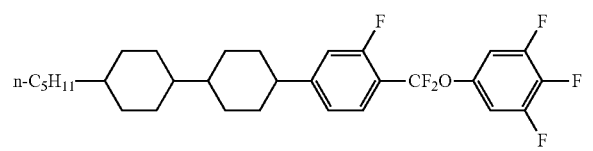

Further, the compound represented by the general formula (X) is preferably a compound represented by general formula (X-5).

[Chem. 121]

(X-5)

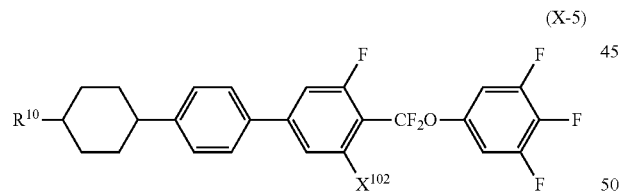

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

Further, the compound represented by the general formula (X-5) and used in the liquid crystal composition of the present invention is preferably a compound represented by general formula (X-5-1).

[Chem. 122]

(X-5-1)

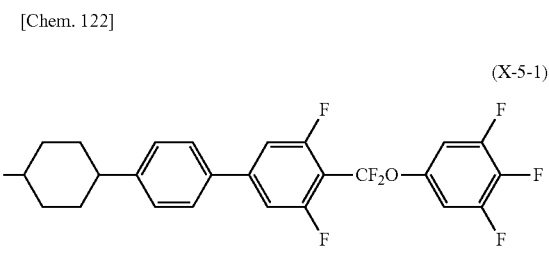

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

Further, preferred examples of the compound represented by the general formula (X-5-1) and used in the liquid crystal composition of the present invention include compounds represented by formula (43.1) to formula (43.4), and a compound represented by the formula (43.2) is particularly preferably contained.

[Chem. 123]

(43.1)

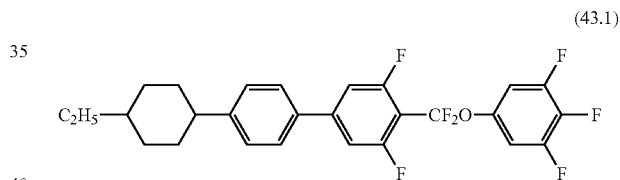

(43.2)

(43.3)

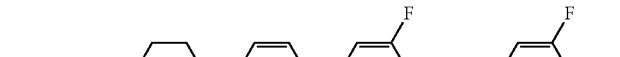

(43.4)

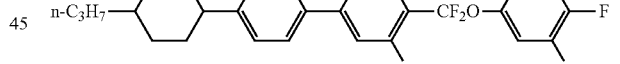

The compound represented by the general formula (X) and used in the liquid crystal composition of the present invention is preferably a compound represented by general formula (X-6).

[Chem. 124]

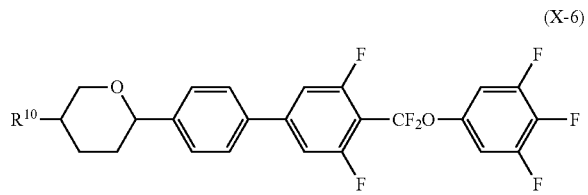

(X-6)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but preferably alone or in combination of two or more in view of solubility at a low temperature, transition temperature, electric reliability, birefringence, etc.

The content of a compound represented by the general formula (X-6) has an upper limit value and lower limit value according to each embodiment in view of characteristics such as solubility at a low temperature, transition temperature, electric reliability, birefringence, etc. For example, according to an embodiment of the present invention, the lower limit value of the content relative to the total amount of the liquid crystal composition of the present invention is 4%; according to another embodiment, the lower limit value is 5%; according to still another embodiment, the lower limit value is 6%; according to a further embodiment, the lower limit value is 8%; according to a further embodiment, the lower limit value is 9%; according to a further embodiment, the lower limit value is 11%; according to a further embodiment, the lower limit value is 14%; and according to a further embodiment, the lower limit value is 18%.

Also, for example, according to an embodiment of the present invention, the upper limit value of the content is 30%; according to another embodiment, the upper limit value is 20%; according to still another embodiment, the upper limit value is 13%; according to a further embodiment, the upper limit value is 10%; according to a further embodiment, the upper limit value is 7%; and according to a further embodiment, the upper limit value is 3%.

Further, preferred examples of the compound represented by the general formula (X-6) and used in the liquid crystal composition of the present invention include compounds represented by formula (44.1) to formula (44.4), and a compound represented by the formula (44.1) and/or the formula (44.2) is particularly preferably contained.

[Chem. 125]

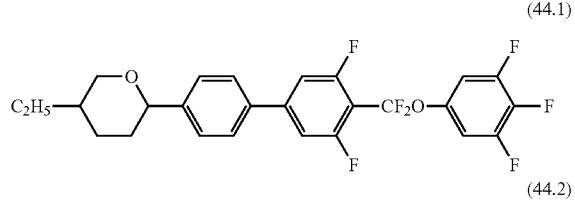

(44.1)

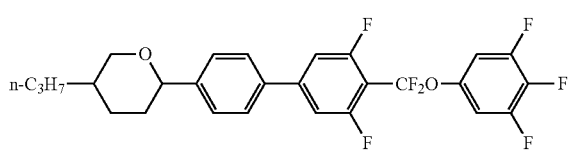

(44.2)

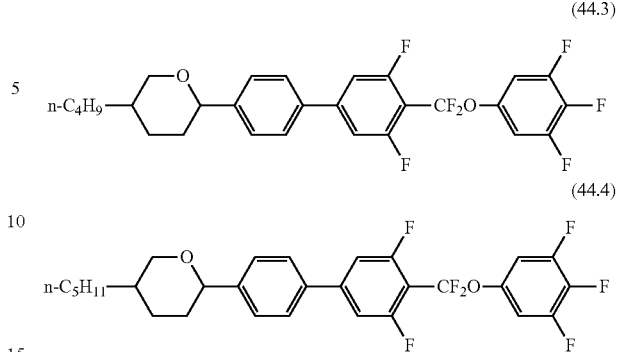

(44.3)

(44.4)

Further, the compound represented by the general formula (L) or the compound represented by the general formula (X) is preferably a compound selected from a group represented by general formula (XI).

[Chem. 126]

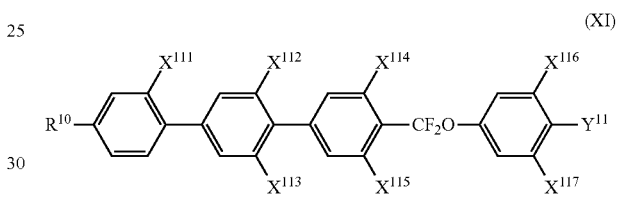

(XI)

(In the formula, $X^{111}$ to $X^{117}$ each independently represent a fluorine atom or a hydrogen atom, at least one of $X^{111}$ to $X^{117}$ represents a fluorine atom, $R^{11}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.)

Compounds which can be combined are not particularly limited, but are preferably used alone or in combination of two or three or more in view of solubility at a low temperature, transition temperature, electric reliability, birefringence, etc.

In view of characteristics such as solubility at a low temperature, transition temperature, electric reliability, birefringence, etc., the content of a compound represented by the general formula (XI) has an upper limit value and a lower limit value according to each embodiment. For example, according to an embodiment of the present invention, the lower limit value of the content relative to the total amount of the liquid crystal composition of the present invention is 2%; according to another embodiment, the lower limit value is 4%; according to still another embodiment, the lower limit value is 5%; according to a further embodiment, the lower limit value is 7%; according to a further embodiment, the lower limit value is 9%; according to a further embodiment, the lower limit value is 10%; according to a further embodiment, the lower limit value is 12%; according to a further embodiment, the lower limit value is 13%; according to a further embodiment, the lower limit value is 15%; and according to a further embodiment, the lower limit value is 18%.

Also, for example, according to an embodiment of the present invention, the upper limit value of the content is 30%; according to another embodiment, the upper limit value is 25%; according to still another embodiment, the upper limit value is 20%; according to a further embodiment, the upper limit value is 15%; according to a further embodiment, the upper limit value is 10%; and according to a further embodiment, the upper limit value is 5%.

When the liquid crystal composition of the present invention is used for a liquid crystal display device having a small cell gap, it is suitable to slightly increase the content of the compound represented by the general formula (XI). When the liquid crystal composition of the present invention is used for a liquid crystal display device having a low drive voltage, it is suitable to slightly increase the content of the compound represented by the general formula (XI). When the liquid crystal composition of the present invention is used for a liquid crystal display device used in a low-temperature environment, it is suitable to slightly decrease the content of the compound represented by the general formula (XI). When the liquid crystal composition of the present invention is used for a liquid crystal display device having fast response, it is suitable to slightly decrease the content of the compound represented by the general formula (XI).

Further, the compound represented by the general formula (XI) and used in the liquid crystal composition of the present invention is preferably a compound represented by general formula (XI-1).

[Chem. 127]

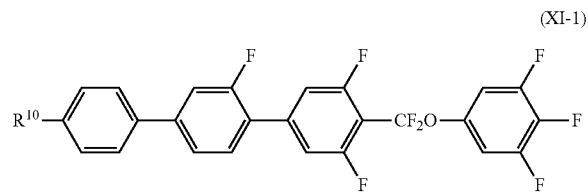

(XI-1)

(In the formula, $R^{11}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are properly used in combination according to each embodiment in view of solubility at a low temperature, transition temperature, electric reliability, birefringence, etc. For example, according to an embodiment of the present invention, the number of the type of compound used is 1; according to another embodiment, the number of the types combined is 2; and according to a further embodiment, the number of the types combined is 3 or more.

The content of a compound represented by the general formula (XI-1) relative to the total amount of the liquid crystal composition of the present invention is preferably 1% by mass or more, more preferably 2% by mass or more, even more preferably 3% by mass or more, still more preferably 4% by mass or more, still more preferably 6% by mass or more, and particularly preferably 9% by mass or more. In addition, in view of solubility at a low temperature, transition temperature, electric reliability, etc., the maximum ratio is preferably limited to 20% by mass or less, more preferably 15% by mass or less, still more preferably 12% by mass or less, and particularly preferably 8% by mass or less.

Further, preferred examples of the compound represented by the general formula (XI-1) and used in the liquid crystal composition of the present invention include compounds represented by formula (45.1) to formula (45.4), and particularly compounds represented by the formula (45.2) to the formula (45.4) are preferably contained, and compounds represented by the formula (45.2) and the formula (45.4) are more preferably contained.

[Chem. 128]

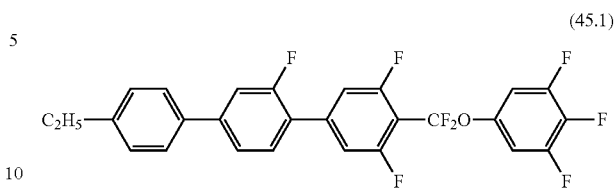

(45.1)

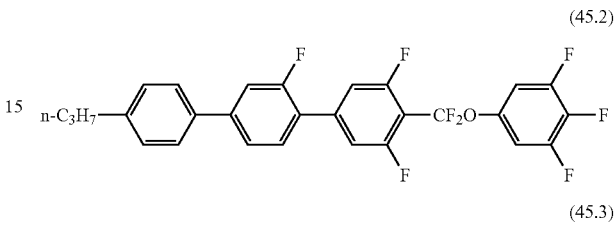

(45.2)

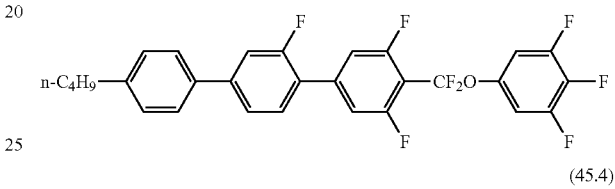

(45.3)

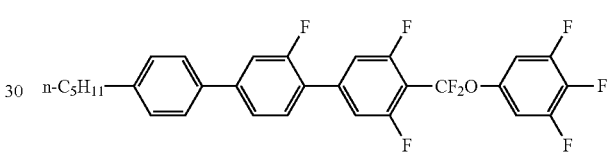

(45.4)

Further, the compound represented by the general formula (L) or the compound represented by the general formula (X) is preferably a compound selected from a group represented by general formula (XII).

[Chem. 129]

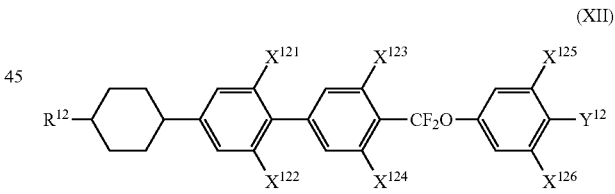

(XII)

(In the formula, $X^{121}$ to $X^{126}$ each independently represent a fluorine atom or a hydrogen atom, $R^{12}$ represents an alkyl group having 1 to 5 carbon atoms, an alkenyl group having 2 to 5 carbon atoms, or an alkoxy group having 1 to 4 carbon atoms, and $Y^{12}$ represents a fluorine atom or —$OCF_3$.)

Compounds which can be combined are not particularly limited, but are preferably used alone or in combination of two or three or more and more preferably used alone or in combination of two to four or more in view of solubility at a low temperature, transition temperature, electric reliability, birefringence, etc.

Further, the compound represented by the general formula (XII) and used in the liquid crystal composition of the present invention is preferably a compound represented by general formula (XII-1).

[Chem. 130]

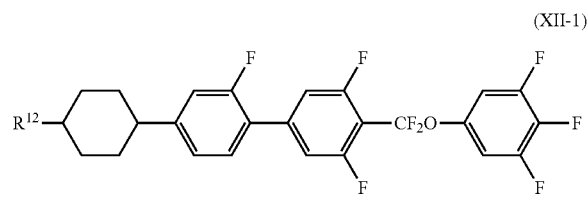

(XII-1)

(In the formula, $R^{12}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

The content of a compound represented by the general formula (XII-1) relative to the total amount of the liquid crystal composition of the present invention is preferably 1% by mass or more, more preferably 2% by mass or more, still more preferably 3% by mass or more, and particularly preferably 4% by mass or more. In addition, in view of solubility at a low temperature, transition temperature, electric reliability, etc., the maximum ratio is preferably limited to 15% by mass or less, more preferably 10% by mass or less, still more preferably 8% by mass or less, and particularly preferably 6% by mass or less.

Further, preferred examples of the compound represented by the general formula (XII-1) and used in the liquid crystal composition of the present invention include compounds represented by formula (46.1) to formula (46.4), and compounds represented by the formula (46.2) to the formula (46.4) are particularly preferably contained.

[Chem. 131]

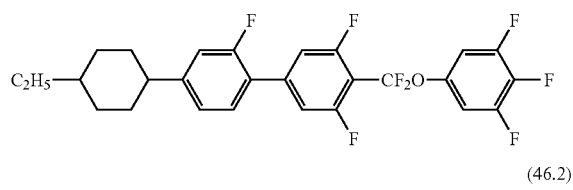

(46.1)

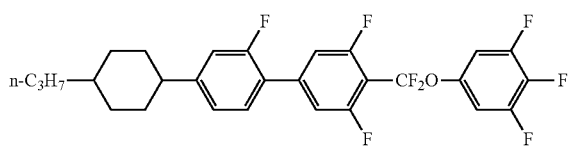

(46.2)

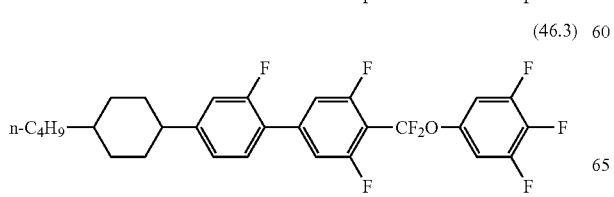

(46.3)

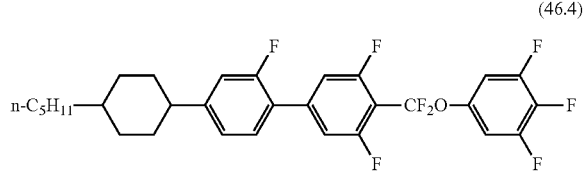

(46.4)

Further, the compound represented by the general formula (XII) is preferably a compound represented by general formula (XII-2).

[Chem. 132]

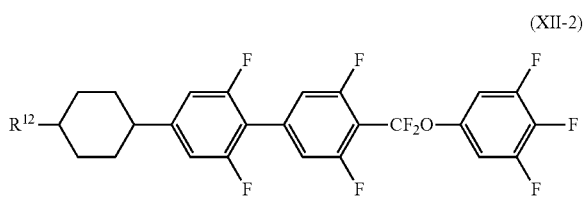

(XII-2)

(In the formula, $R^{12}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but are preferably used alone or in combination of two or more and more preferably used alone or in combination of two or three or more in view of solubility at a low temperature, transition temperature, electric reliability, birefringence, etc.

The content of a compound represented by the general formula (XII-2) relative to the total amount of the liquid crystal composition of the present invention is preferably 1% by mass or more, more preferably 3% by mass or more, even more preferably 4% by mass or more, still more preferably 6% by mass or more, and particularly preferably 9% by mass or more. In addition, in view of solubility at a low temperature, transition temperature, electric reliability, etc., the maximum ratio is preferably limited to 20% by mass or less, more preferably 17% by mass or less, still more preferably 15% by mass or less, and particularly preferably 13% by mass or less.

Further, preferred examples of the compound represented by the general formula (XII-2) and used in the liquid crystal composition of the present invention include compounds represented by formula (47.1) to formula (47.4), and compounds represented by the formula (47.2) to the formula (47.4) are particularly preferably contained.

[Chem. 133]

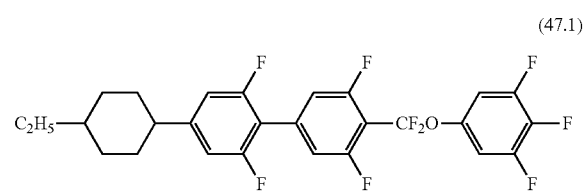

(47.1)

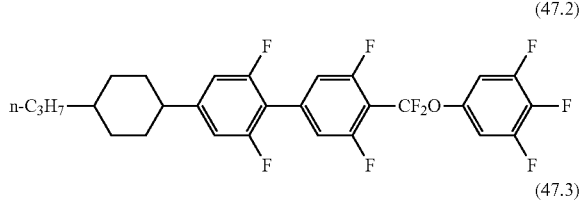

(47.2)

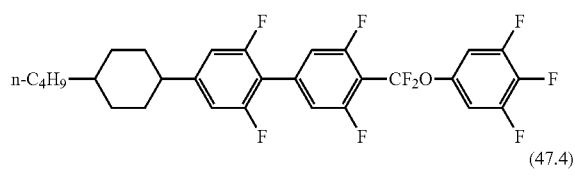

(47.3)

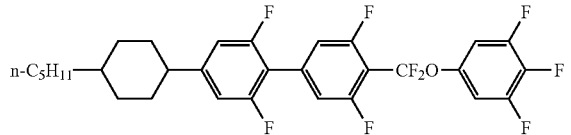

(47.4)

Further, the compound represented by the general formula (M) is preferably a compound selected from a compound group represented by general formula (XIII).

[Chem. 134]

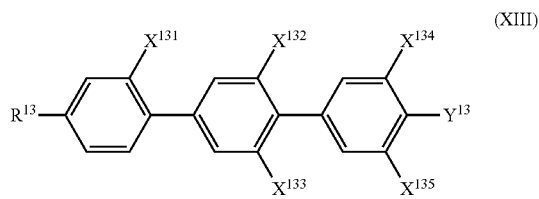

(XIII)

(In the formula, $X^{131}$ to $X^{135}$ each independently represent a fluorine atom or a hydrogen atom, $R^{13}$ represents an alkyl group having 1 to 5 carbon atoms, an alkenyl group having 2 to 5 carbon atoms, or an alkoxy group having 1 to 4 carbon atoms, and $Y^{13}$ represents a fluorine atom or —OCF$_3$, the compounds represented by the general formula (i) being excluded.)

The types of compounds which can be combined are not particularly limited, but preferably one or two, more preferably one to three, and still more preferably one to four of the compounds are contained.

In view of characteristics such as solubility at a low temperature, transition temperature, electric reliability, birefringence, etc., the content of a compound represented by the general formula (XIII) has upper limit and lower limit values according to each embodiment. For example, according to an embodiment of the present invention, the lower limit value of the content relative to the total amount of the liquid crystal composition of the present invention is 2%; according to another embodiment, the lower limit value is 4%; according to still another embodiment, the lower limit value is 5%; according to a further embodiment, the lower limit value is 7%; according to a further embodiment, the lower limit value is 9%; according to a further embodiment, the lower limit value is 11%; according to a further embodiment, the lower limit value is 13%; according to a further embodiment, the lower limit value is 14%; according to a further embodiment, the lower limit value is 16%; and according to a further embodiment, the lower limit value is 20%.

Also, for example, according to an embodiment of the present invention, the upper limit value of the content is 30%; according to another embodiment, the upper limit value is 25%; according to still another embodiment, the upper limit value is 20%; according to a further embodiment, the upper limit value is 15%; according to a further embodiment, the upper limit value is 10%; and according to a further embodiment, the upper limit value is 5%.

When the liquid crystal composition of the present invention is used for a liquid crystal display device having a small cell gap, it is desired to slightly increase the content of the compound represented by the general formula (XIII). When the liquid crystal composition of the present invention is used for a liquid crystal display device having a low drive voltage, it is desired to slightly increase the content of the compound represented by the general formula (XIII). When the liquid crystal composition of the present invention is used for a liquid crystal display device used in a low-temperature environment, it is desired to slightly decrease the content of the compound represented by the general formula (XIII). When the liquid crystal composition of the present invention is used for a liquid crystal display device having fast response, it is desired to slightly decrease the content of the compound represented by the general formula (XIII).

Further, the compound represented by the general formula (XIII) is preferably a compound represented by general formula (XIII-1).

[Chem. 135]

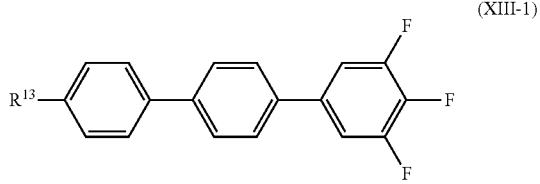

(XIII-1)

(In the formula, $R^{13}$ represents an alkyl group having 1 to 5 carbon atoms, an alkenyl group having 2 to 5 carbon atoms, or an alkoxy group having 1 to 4 carbon atoms.)

The content of a compound represented by the general formula (XIII-1) relative to the total amount of the liquid crystal composition of the present invention is preferably 1% by mass or more, more preferably 3% by mass or more, still more preferably 5% by mass or more, and particularly preferably 10% by mass or more. Also, the maximum allowable content is preferably 25% by mass or less, more preferably 20% by mass or less, and still more preferably 15% by mass or less.

Further, preferred examples of the compound represented by the general formula (XIII-1) include compounds represented by formula (48.1) to formula (48.4), and a compound represented by the formula (48.2) is particularly preferred.

[Chem. 136]

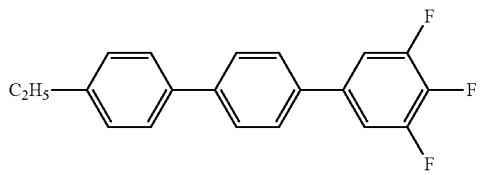

(48.1)

-continued (48.2)
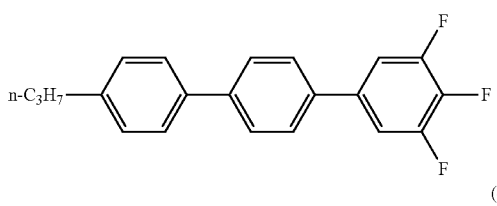

(48.3)
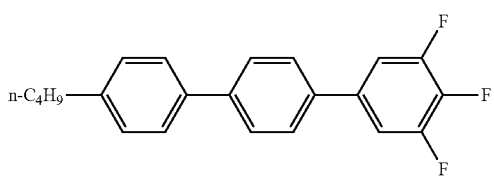

(48.4)
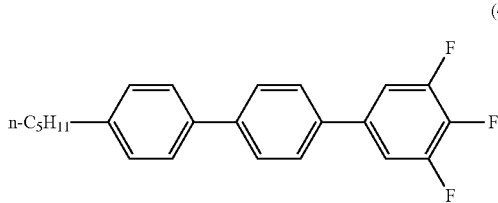

Further, the compound represented by the general formula (M) is preferably a compound selected from a compound group represented by general formula (XIV).

[Chem. 137]

(XIV)
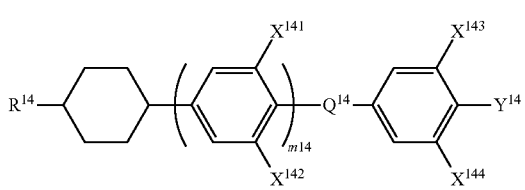

(In the formula, $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, $Y^{14}$ represents a fluorine atom, a chlorine atom, or $-OCF_3$, $Q^{14}$ represents a single bond, $-COO-$, or $-CF_2O-$, and $m^{14}$ represents 0 or 1.)

The types of compounds which can be combined are not limited, but are properly used in combination according to each embodiment in view of solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In view of characteristics such as solubility at a low temperature, transition temperature, electric reliability, birefringence, etc., the content of a compound represented by the general formula (XIV) has an upper limit value and a lower limit value according to each embodiment. For example, according to an embodiment of the present invention, the lower limit value of the content relative to the total amount of the liquid crystal composition of the present invention is 3%; according to another embodiment, the lower limit value is 7%; according to still another embodiment, the lower limit value is 8%; according to a further embodiment, the lower limit value is 11%; according to a further embodiment, the lower limit value is 12%; according to a further embodiment, the lower limit value is 16%; according to a further embodiment, the lower limit value is 18%; according to a further embodiment, the lower limit value is 19%; according to a further embodiment, the lower limit value is 22%; and according to a further embodiment, the lower limit value is 25%.

Also, for example, according to an embodiment of the present invention, the upper limit value of the content is 40%; according to another embodiment, the upper limit value is 35%; according to still another embodiment, the upper limit value is 30%; according to a further embodiment, the upper limit value is 25%; according to a further embodiment, the upper limit value is 20%; and according to a further embodiment, the upper limit value is 15%.

When the liquid crystal composition of the present invention is used for a liquid crystal display device having a low drive voltage, it is suitable to slightly increase the content of the compound represented by the general formula (XIV). When the liquid crystal composition of the present invention is used for a liquid crystal display device having fast response, it is suitable to slightly decrease the content of the compound represented by the general formula (xIV).

Further, the compound represented by the general formula (XIV) is preferably a compound represented by general formula (XIV-1).

[Chem. 138]

(XIV-1)
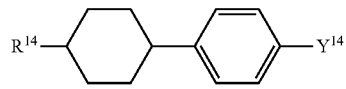

(In the formula, $R^{14}$ represents an alkyl group having 1 to 7 carbon atoms, an alkenyl group having 2 to 7 carbon atoms, or an alkoxy group having 1 to 7 carbon atoms, and $Y^{14}$ represents a fluorine atom, a chlorine atom, or $-OCF_3$.)

The types of compounds which can be combined are not limited, but compounds are properly used alone or in combination of two or three in view of solubility at a low temperature, transition temperature, electric reliability, birefringence, etc.

Further, the compound represented by the general formula (XIV-1) is preferably a compound represented by general formula (XIV-1-1).

[Chem. 139]

(XIV-1-1)
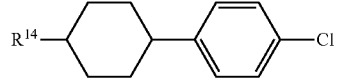

(In the formula, $R^{14}$ represents an alkyl group having 1 to 7 carbon atoms, an alkenyl group having 2 to 7 carbon atoms, or an alkoxy group having 1 to 7 carbon atoms.)

The content of a compound represented by the general formula (XIV-1) relative to the total amount of the liquid crystal composition of the present invention is preferably 2% by mass or more, more preferably 4% by mass or more, even more preferably 7% by mass or more, still more preferably 10% by mass or more, and particularly preferably 18% by mass or more. In addition, in view of solubility at a low temperature, transition temperature, electric reliability, etc., the maximum ratio is preferably limited to 30% by mass or less, more preferably 27% by mass or less, still more preferably 24% by mass or less, and particularly preferably less than 21% by mass.

Further, preferred examples of the compound represented by the general formula (XIV-1-1) include compounds represented by formula (51.1) to formula (51.4), and particularly a compound represented by formula (51.1) is more preferably contained.

[Chem. 140]

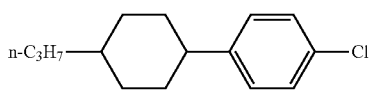
(51.1)

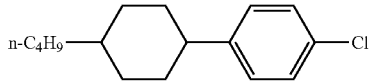
(51.2)

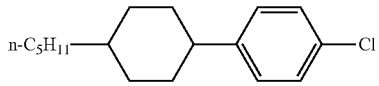
(51.3)

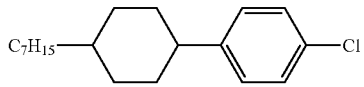
(51.4)

Further, the compound represented by the general formula (XIV-1) is preferably a compound represented by general formula (XIV-1-2).

[Chem. 141]

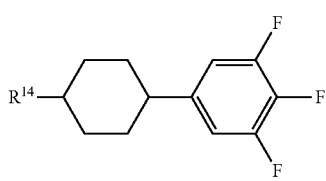
(XIV-1-2)

(In the formula, $R^{14}$ represents an alkyl group having 1 to 7 carbon atoms, an alkenyl group having 2 to 7 carbon atoms, or an alkoxy group having 1 to 7 carbon atoms.)

The content of a compound represented by the general formula (XIV-1-2) relative to the total amount of the liquid crystal composition of the present invention is preferably 1% by mass or more, more preferably 3% by mass or more, still more preferably 5% by mass or more, and particularly preferably 7% by mass or more. In addition, in view of solubility at a low temperature, transition temperature, electric reliability, etc., the maximum ratio is preferably limited to 15% by mass or less, more preferably 13% by mass or less, still more preferably 11% by mass or less, and particularly preferably less than 9% by mass.

Further, preferred examples of the compound represented by the general formula (XIV-1-2) include compounds represented by formula (52.1) to formula (52.4), and a compound represented by the formula (52.4) is particularly preferably contained.

[Chem. 142]

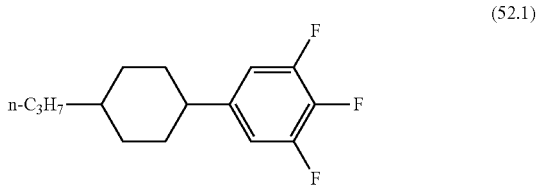
(52.1)

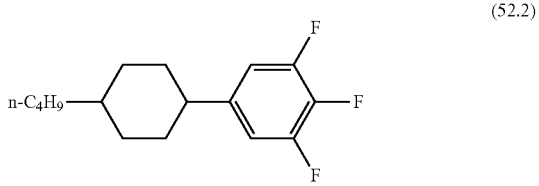
(52.2)

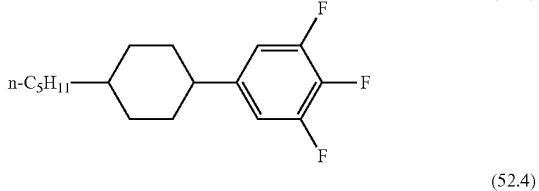
(52.3)

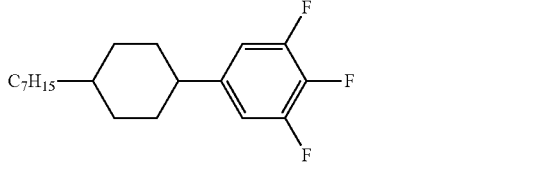
(52.4)

Further, the compound represented by the general formula (XIV) is preferably a compound represented by general formula (XIV-2).

[Chem. 143]

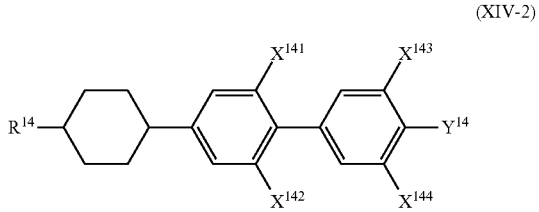
(XIV-2)

(In the formula, $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, and $Y^{14}$ represents a fluorine atom, a chlorine atom, or —$OCF_3$.)

The types of compounds which can be combined are not limited, but compounds are properly used in combination according to each embodiment in view of solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

In view of characteristics such as solubility at a low temperature, transition temperature, electric reliability, birefringence, etc., the content of a compound represented by the general formula (XIV-2) has an upper limit value and a lower limit value according to each embodiment. For example, according to an embodiment of the present invention, the lower limit value of the content relative to the total amount of the liquid crystal composition of the present invention is 3%; according to another embodiment, the lower limit value is 7%; according to still another embodiment, the lower limit value is 8%; according to a further embodiment, the lower limit value is 10%; according to a further embodiment, the lower limit value is 11%; according to a further embodiment, the lower limit value is 12%; according to a further embodiment, the lower limit value is 18%; according to a further embodiment, the lower limit value is 19%; according to a further embodiment, the lower limit value is 21%; and according to a further embodiment, the lower limit value is 22%.

Also, for example, according to an embodiment of the present invention, the upper limit value of the content is 40%; according to another embodiment, the upper limit value is 35%; according to still another embodiment, the upper limit value is 25%; according to a further embodiment, the upper limit value is 20%; according to a further embodiment, the upper limit value is 15%; and according to a further embodiment, the upper limit value is 10%.

When the liquid crystal composition of the present invention is used for a liquid crystal display device having a low drive voltage, it is desired to slightly increase the content of the compound represented by the general formula (XIV-2). When the liquid crystal composition of the present invention is used for a liquid crystal display device having fast response, it is desired to slightly decrease the content of the compound represented by the general formula (XIV-2).

Further, the compound represented by the general formula (XIV-2) is preferably a compound represented by general formula (XIV-2-1).

[Chem. 144]

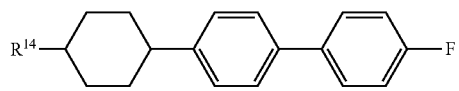

(XIV-2-1)

(In the formula, $R^{14}$ represents an alkyl group having 1 to 5 carbon atoms, an alkenyl group having 2 to 5 carbon atoms, or an alkoxy group having 1 to 4 carbon atoms.)

The content of a compound represented by the general formula (XIV-2-1) relative to the total amount of the liquid crystal composition of the present invention is preferably 1% by mass or more, more preferably 3% by mass or more, still more preferably 5% by mass or more, and particularly preferably 7% by mass or more. In addition, in view of solubility at a low temperature, transition temperature, electric reliability, etc., the maximum ratio is preferably limited to 15% by mass or less, more preferably 13% by mass or less, still more preferably 11% by mass or less, and particularly preferably less than 9% by mass.

Further, preferred examples of the compound represented by the general formula (XIV-2-1) include compounds represented by formula (53.1) to formula (53.4), and a compound represented by the formula (53.4) is particularly preferably contained.

[Chem. 145]

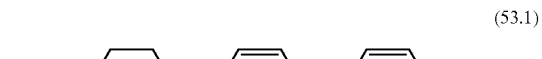

(53.1)

(53.2)

(53.3)

(53.4)

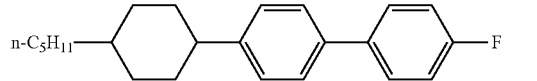

The compound represented by the general formula (XIV-2) is preferably a compound represented by general formula (XIV-2-2).

[Chem. 146]

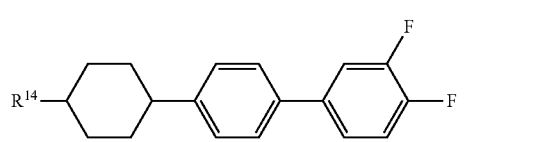

(XIV-2-2)

(In the formula, $R^{14}$ represents an alkyl group having 1 to 5 carbon atoms, an alkenyl group having 2 to 5 carbon atoms, or an alkoxy group having 1 to 4 carbon atoms.)

The content of a compound represented by the general formula (XIV-2-2) relative to the total amount of the liquid crystal composition of the present invention is preferably 3% by mass or more, more preferably 6% by mass or more, still more preferably 9% by mass or more, and particularly preferably 12% by mass or more. In addition, in view of solubility at a low temperature, transition temperature, electric reliability, etc., the maximum ratio is preferably limited to 20% by mass or less, more preferably 17% by mass or less, still more preferably 15% by mass or less, and particularly preferably 14% by mass or less.

Further, preferred examples of the compound represented by the general formula (XIV-2-2) include compounds represented by formula (54.1) to formula (54.4), and a compound represented by the formula (54.2) and/or the formula (54.4) is particularly preferably contained.

[Chem. 147]

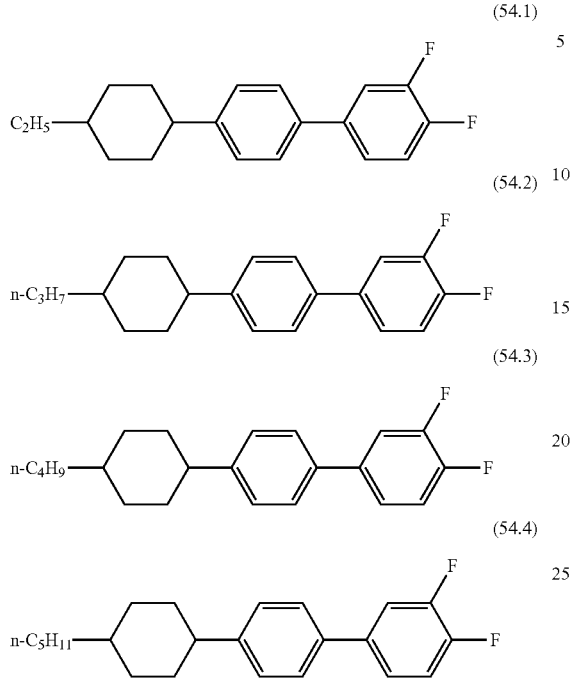

(54.1)
(54.2)
(54.3)
(54.4)

The compound represented by the general formula (XIV-2) is preferably a compound represented by general formula (XIV-2-3).

[Chem. 148]

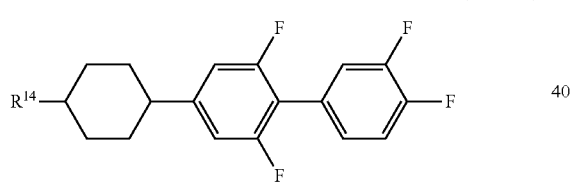

(XIV-2-3)

(In the formula, $R^{14}$ represents an alkyl group having 1 to 5 carbon atoms, an alkenyl group having 2 to 5 carbon atoms, or an alkoxy group having 1 to 4 carbon atoms.)

The content of a compound represented by the general formula (XIV-2-3) relative to the total amount of the liquid crystal composition of the present invention is preferably 5% by mass or more, more preferably 9% by mass or more, and particularly preferably 12% by mass or more. In addition, in view of solubility at a low temperature, transition temperature, electric reliability, etc., the maximum ratio is preferably limited to 30% by mass or less, more preferably 27% by mass or less, still more preferably 24% by mass or less, and particularly preferably less than 20% by mass.

Further, preferred examples of the compound represented by the general formula (XIV-2-3) include compounds represented by formula (55.1) to formula (55.4), and a compound represented by the formula (55.2) and/or the formula (55.4) is particularly preferably contained.

[Chem. 149]

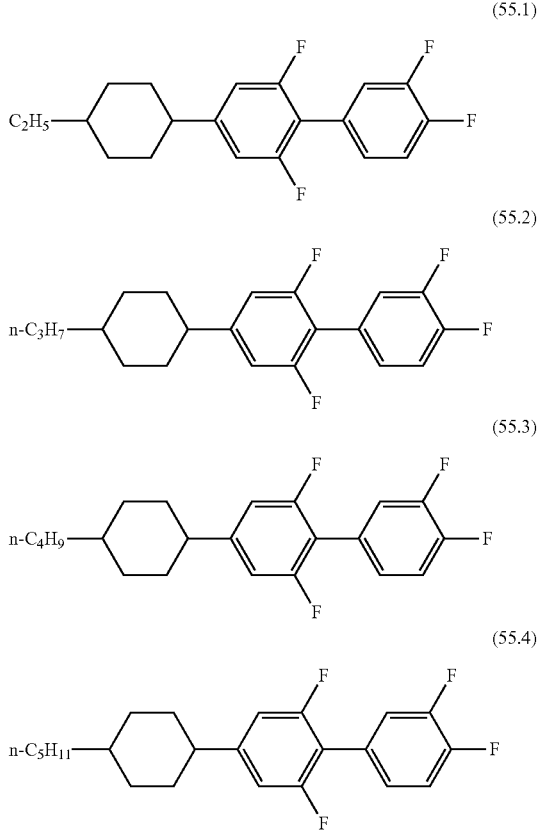

(55.1)
(55.2)
(55.3)
(55.4)

The compound represented by the general formula (XIV-2) is preferably a compound represented by general formula (XIV-2-4).

[Chem. 150]

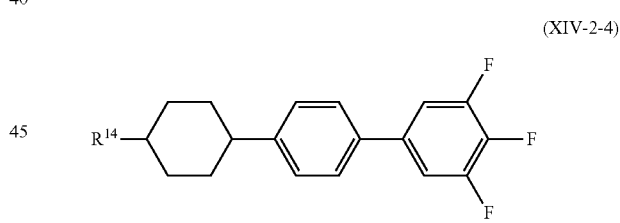

(XIV-2-4)

(In the formula, $R^{14}$ represents an alkyl group having 1 to 5 carbon atoms, an alkenyl group having 2 to 5 carbon atoms, or an alkoxy group having 1 to 4 carbon atoms.)

The types of compounds which can be combined are not limited, but compounds are properly used in combination according to each embodiment in view of solubility at a low temperature, transition temperature, electric reliability, birefringence, etc. For example, according to an embodiment of the present invention, the number of the compound used is 1. According to another embodiment of the present invention, the number of the types is 2. According to a further embodiment of the present invention, the number of the types is 3 or more.

The content of a compound represented by the general formula (XIV-2-4) has an upper limit value and a lower limit value according to each embodiment in view of characteristics such as solubility at a low temperature, transition temperature, electric reliability, birefringence, etc. For example, according to an embodiment of the present invention, the lower limit of the content relative to the total amount of the liquid crystal composition of the present invention is 2%; according to another embodiment, the lower limit value is 5%; according to still another embodiment, the lower limit value is 8%; according to a further embodiment, the lower limit value is 9%; according to a further embodiment, the lower limit value is 10%; according to a further embodiment, the lower limit value is 18%; according to a further embodiment, the lower limit value is 21%; according to a further embodiment, the lower limit value is 22%; and according to a further embodiment, the lower limit value is 24%.

Also, for example, according to an embodiment of the present invention, the upper limit value of the content is 35%; according to another embodiment, the upper limit value is 30%; according to still another embodiment, the upper limit value is 25%; according to a further embodiment, the upper limit value is 20%; according to a further embodiment, the upper limit value is 15%; and according to a further embodiment, the upper limit value is 10%.

When the liquid crystal composition of the present invention is used for a liquid crystal display device having a low drive voltage, it is desired to slightly increase the content of the compound represented by the general formula (XIV-2-4). When the liquid crystal composition is used for a liquid crystal display device having fast response, it is desired to slightly decrease the content of the compound represented by the general formula (XIV-2-4).

Further, preferred examples of the compound represented by the general formula (XIV-2-4) include compounds represented by formula (56.1) to formula (56.4), and compounds represented by the formula (56.1), the formula (56.2), and the formula (56.4) are particularly preferably contained.

[Chem. 151]

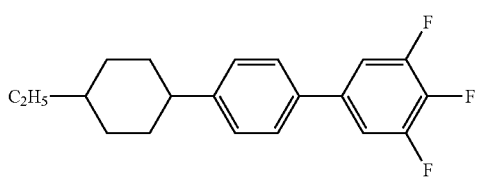
(56.1)

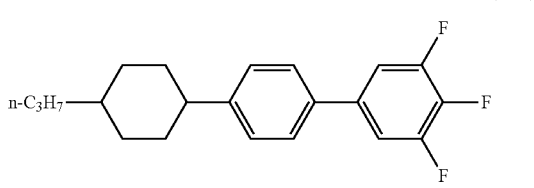
(56.2)

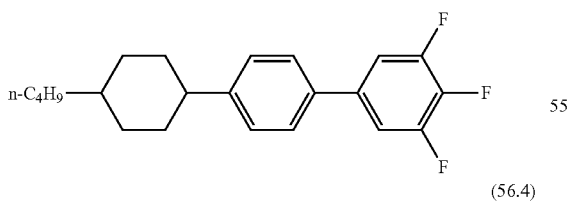
(56.3)

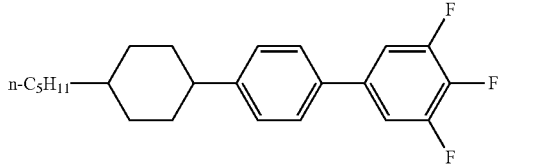
(56.4)

Further, the compound represented by the general formula (XIV-2) is preferably a compound represented by general formula (XIV-2-5).

[Chem. 152]

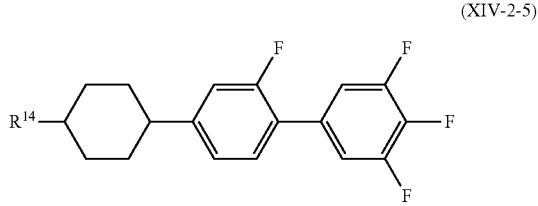
(XIV-2-5)

(In the formula, $R^{14}$ represents an alkyl group having 1 to 5 carbon atoms, an alkenyl group having 2 to 5 carbon atoms, or an alkoxy group having 1 to 4 carbon atoms.)

The content of a compound represented by the general formula (XIV-2-5) relative to the total amount of the liquid crystal composition of the present invention is preferably 5% by mass or more, more preferably 10% by mass or more, and particularly preferably 13% by mass or more. In addition, in view of solubility at a low temperature, transition temperature, electric reliability, etc., the maximum ratio is preferably limited to 25% by mass or less, more preferably less than 22% by mass, still more preferably 18% by mass or less, and particularly preferably less than 15% by mass.

Further, examples of the compound represented by the general formula (XIV-2-5) include compounds represented by formula (57.1) to formula (57.4). A compound represented by the formula (57.1) is particularly preferably contained.

[Chem. 153]

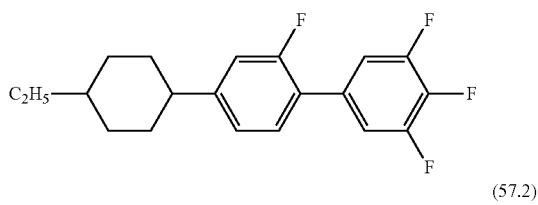
(57.1)

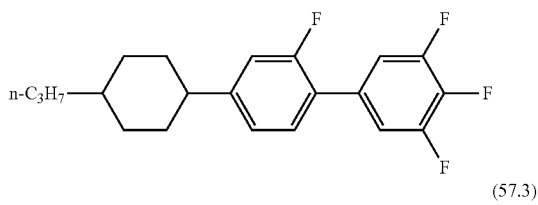
(57.2)

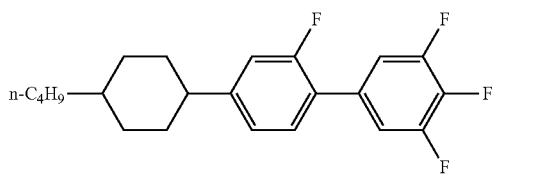
(57.3)

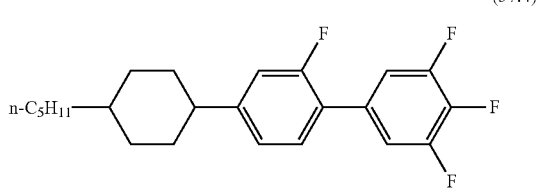
(57.4)

Further, the compound represented by the general formula (XIV-2) is preferably a compound represented by general formula (XIV-2-6).

[Chem. 154]

(XIV-2-6)

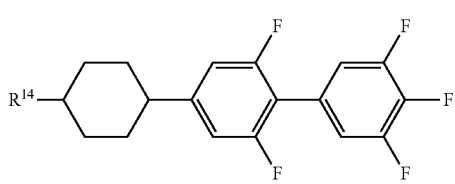

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by the general formula (XIV-2-6) relative to the total amount of the liquid crystal composition of the present invention is preferably 5% by mass or more, more preferably 10% by mass or more, and particularly preferably 15% by mass or more. In addition, in view of solubility at a low temperature, transition temperature, electric reliability, etc., the maximum ratio is preferably limited to 25% by mass or less, more preferably 22% by mass or less, still more preferably 20% by mass or less, and particularly preferably less than 17% by mass.

Further, examples of the compound represented by the general formula (XIV-2-6) include compounds represented by formula (58.1) to formula (58.4), and a compound represented by the formula (58.2) is particularly preferably contained.

[Chem. 155]

(58.1)

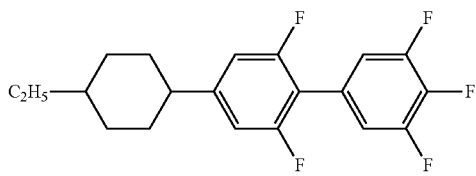

-continued (58.2)

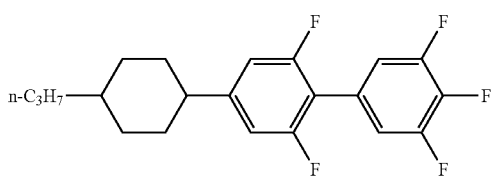

(58.3)

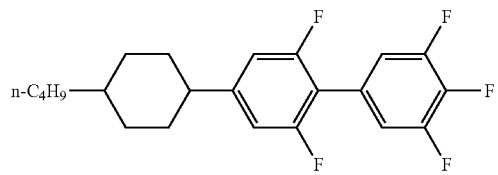

(58.4)

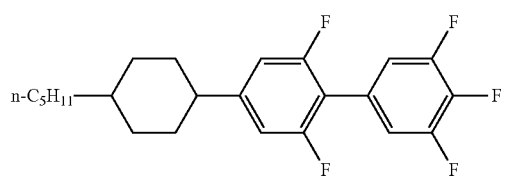

Each of the compounds used in the present invention does not have a peroxy acid (—CO—OO—) structure in its molecule. Also, when reliability and long-term stability of the liquid crystal composition are regarded as important, it is desired not to use a compound having a carbonyl group. In addition, when UV irradiation stability is regarded as important, it is desired not to use a compound substituted by a chlorine atom. It is also desired to use only compounds in which all ring structures in a molecule are six-member rings.

The liquid crystal composition of the present invention can contain a polymerizable compound in order to manufacture a liquid crystal display device of a PS mode, a horizontal electric field-type PSA mode, or a horizontal electric field-type PSVA mode. A photopolymerizable monomer subjected to polymerization that proceeds by energy rays such as light can be used as the polymerizable compound, and a polymerizable compound having as a structure a liquid crystal skeleton in which a plurality of six-member rings are connected together, for example, a biphenyl derivative, a terphenyl derivative, or the like, can be used. Preferred examples thereof include difunctional monomers represented by general formula (XX).

[Chem. 156]

(XX)

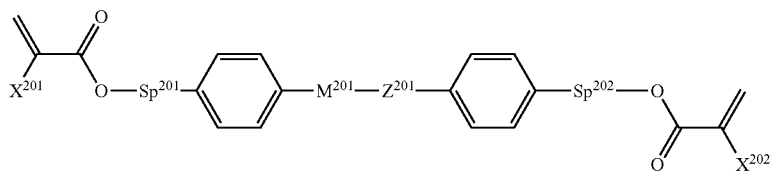

(In the formula, $X^{201}$ and $X^{202}$ each independently represent a hydrogen atom or a methyl group, $Sp^{201}$ and $Sp^{202}$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—OCO—, —CH=CH—OCO—, —COO—CH=CH—, —OCO—CH=CH—, —COO—CH$_2$CH$_2$—, —OCO—CH$_2$CH$_2$—, —CH$_2$—CH$_2$—OCO—, —CH$_2$CH$_2$—OCO—, —COO—CH$_2$—, —OCO—CH$_2$—, —CH$_2$—COO—, —CH$_2$—OCO—, —CY$^1$=CY$^2$— (wherein $Y^1$ and $Y^2$ each independently represent a fluorine atom or a hydrogen atom), —C≡C—, or a single bond, $M^{201}$ represents a 1,4-phenylene group, a trans-1,4-cyclohexylene group, or a single bond, and all 1,4-phenylene groups in the formula may have a fluorine atom substituted for any desired hydrogen atom.)

Either a diacrylate derivative in which $X^{201}$ and $X^{202}$ both represent hydrogen atoms or a dimethacrylate derivative in which $X^{201}$ and $X^{202}$ both represent methyl groups is preferred, and a compound in which one of $X^{201}$ and $X^{202}$ represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

$Sp^{201}$ and $Sp^{202}$ each independently represent a single bond, an alkylene group having 1 to 8 carbon atoms, or —O—$(CH_2)_s$—, but at least one of $Sp^{201}$ and $Sp^{202}$ is preferably a single bond for a PSA display device. Specifically, a compound in which $Sp^{201}$ and $Sp^{202}$ both represent single bonds or a form in which one represents a single bond, and the other represents an alkylene group having 1 to 8 carbon atoms, or —O—$(CH_2)_s$— is preferred. In this case, a 1-4 alkyl group is preferred, and s is preferably 1 to 4.

$Z^{201}$ is preferably —$OCH_2$—, —$CH_2O$—, —OCO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

$M^{201}$ represents a 1,4-phenylene group in which any hydrogen atom may be substituted by a fluorine atom, a trans-1,4-cyclohexylene group, or a single bond, but a 1,4-phenylene group or a single bond is preferred. When C represents a ring structure other than a single bond, $Z^{201}$ is also preferably a linkage group other than a single bond, and when $M^{201}$ is a single bond, $Z^{201}$ is preferably a single bond.

In view of the above, specifically, a ring structure between $Sp^{201}$ and $Sp^{202}$ in the general formula (XX) is preferably a structure described below.

In the general formula (XX), when $M^{201}$ represents a single bond, and the ring structure includes two rings, formula (XXa-1) to formula (XXa-5) are preferred, formula (XXa-1) to formula (XXa-3) are more preferred, and formula (XXa-1) is particularly preferred.

[Chem. 157]

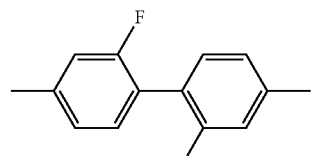
(XXa-1)

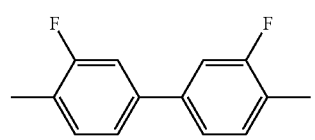
(XXa-2)

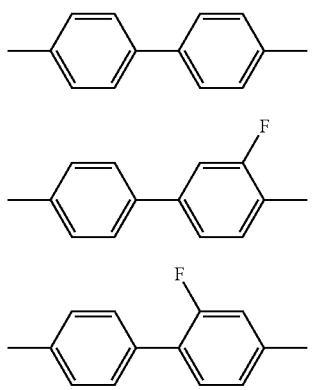
(XXa-3)

(XXa-4)

(XXa-5)

(In the formulae, each end is bonded to $Sp^{201}$ or $Sp^{202}$.)

A polymerizable compound having such a skeleton has, after polymerization, alignment regulating force optimum for a PSA-mode liquid crystal display device, and thus a good alignment state can be achieved, thereby suppressing display unevenness or causing no display unevenness.

In view of the above, polymerizable monomers of general formula (XX-1) to general formula (XX-4) are particularly preferred, and general formula (XX-2) is most preferred.

[Chem. 158]

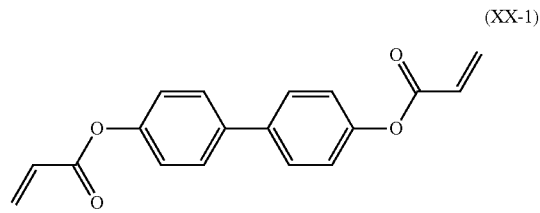
(XX-1)

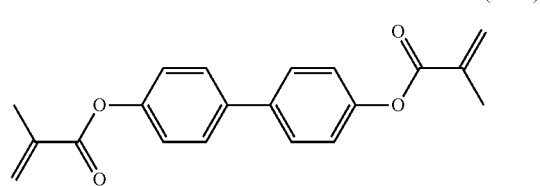
(XX-2)

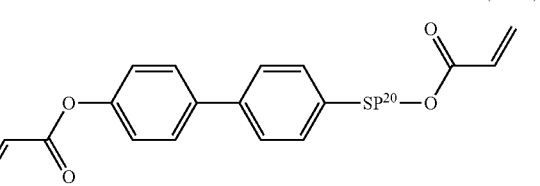
(XX-3)

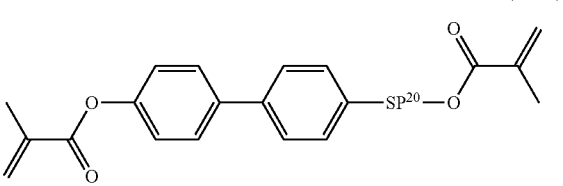
(XX-4)

(In the formulae, $Sp^{20}$ represents an alkylene group having 2 to 5 carbon atoms.)

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like.

The liquid crystal composition of the present invention can further contain a compound represented by general formula (Q).

[Chem. 159]

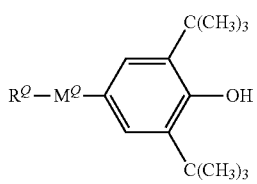
(Q)

(In the formula, $R^Q$ represents a linear alkyl or branched alkyl group having 1 to 22 carbon atoms, one or two or more $CH_2$ groups in the alkyl group may be substituted by —O—, —CH=CH—, —CO—, —OCO—, —COO—, —C≡C—, —CF$_2$O—, or —OCF$_2$— so that oxygen atoms are not directly adjacent to each other, and $M^Q$ represents a trans-1,4-cyclohexylene group, a 1,4-phenylene group, or a single bond.)

$R^Q$ represents a linear alkyl or branched alkyl group having 1 to 22 carbon atoms, and one or two or more $CH_2$ groups in the alkyl group may be substituted by —O—, —CH=CH—, —CO—, —OCO—, —COO—, —C≡C—, —CF$_2$O—, or —OCF$_2$— so that oxygen atoms are not directly adjacent to each other. However, a linear alkyl group having 1 to 10 carbon atoms, a linear alkoxy group, a linear alkyl group in which one $CH_2$ group is substituted by —OCO— or —COO—, a branched alkyl group, a branched alkoxy group, and a branched alkyl group in which one $CH_2$ group is substituted by —OCO— or —COO— are preferred, and a linear alkyl group having 1 to 20 carbon atoms, a linear alkyl group in which one $CH_2$ group is substituted by —OCO— or —COO—, a branched alkyl group, a branched alkoxy group, and a branched alkyl group in which one $CH_2$ group is substituted by —OCO— or —COO— are more preferred. $M^Q$ represents a trans-1,4-cyclohexylene group, a 1,4-phenylene group, or a single bond, but a trans-1,4-cyclohexylene group or a 1,4-phenylene group is preferred.

Preferred examples of the compound represented by the general formula (Q) include compounds represented by general formula (Q-a) to general formula (Q-d) below.

[Chem. 160]

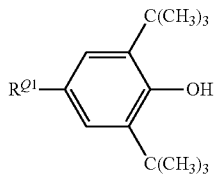
(Q-a)

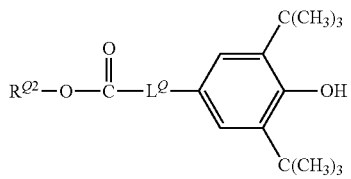
(Q-b)

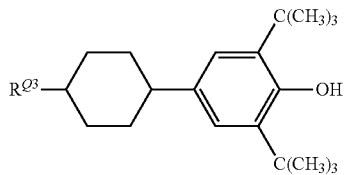
(Q-c)

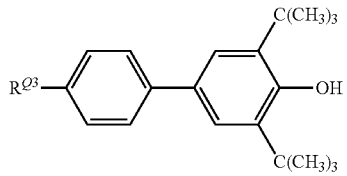
(Q-d)

In the formulae, $R^{Q1}$ is preferably a linear alkyl or branched alkyl group having 1 to 10 carbon atoms, $R^{Q2}$ is preferably a linear alkyl or branched alkyl group having 1 to 20 carbon atoms, $R^{Q3}$ is preferably a linear alkyl or branched alkyl group having 1 to 8 carbon atoms, a linear alkoxy group, or a branched alkoxy group, and $L^Q$ is preferably a linear alkylene or branched alkylene group having 1 to 8 carbon atoms. Among compounds represented by the general formula (Q-a) to the general formula (Q-d), compounds represented by the general formula (Q-c) and the general formula (Q-d) are more preferred.

The liquid crystal composition of the present invention preferably contains one or two compounds and more preferably one to five compounds represented by the general formula (Q), and the content thereof is preferably 0.001% to 1% by mass, more preferably 0.001% to 0.1% by mass, and particularly preferably 0.001% to 0.05% by mass.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (nematic liquid crystal display device), STN-LCD (super twisted nematic liquid crystal display device), OCB-LCD, FFS mode, and IPS-LCD (in-plane switching liquid crystal display device), particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by, for example, sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, a metal insulator-metal resistivity element, or the like may be installed on the substrate.

The substrates are opposed to each other so that the transparent electrode layers face inward. In this case, the gap between the substrates may be adjusted through spacers. The resulting light control layer is preferably adjusted to have a thickness of 1 to 100 μm. The thickness is more preferably 1.5 to 10 μm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a retardation film can be used for widening the angle of view. Examples of the spacers include glass particles, plastic particles, alumina particles, columnar spacers made of a photoresist material, and the like. Then, a sealing agent such as an epoxy-based heat-curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates. However, the vacuum injection method has the problem of leaving injection marks, instead of causing dropping marks. The present invention can preferably use the ODF method in a process for manufacturing a liquid crystal display device. In the process for manufacturing a liquid crystal display device using the ODF method, the liquid crystal display device can be manufactured by applying an epoxy-based light/heat curable sealing agent on a substrate of either a back plane or a front plane by using a dispenser to draw a closed loop bank-like shape, dropping a predetermined amount of the liquid crystal composition in the shape under deaeration, and then bonding together the front plane and the back plane. The liquid crystal composition of the present invention can be stably dropped in the ODF step and thus can be preferably used.

Since an appropriate polymerization rate is desired for achieving good liquid crystal-aligning performance, a preferred method of polymerizing the polymerizable compound is a polymerization method in which the compound is polymerized by irradiation with one or combination of two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with proper transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a horizontal electric field-type MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used as a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

The liquid crystal display device using the liquid crystal composition of the present invention satisfies both fast response and the suppression of display defects and is useful, particularly useful for liquid crystal display devices for active matrix driving, and can be used for liquid crystal display devices for a VA mode, a PSVA mode, a PAS-mode, an IPS (in-plane switching) mode, a FFS (fringe field switching) mode, or an ECB mode.

A liquid crystal display device according to a preferred embodiment of the present invention is described in detail below with reference to the drawings.

FIG. 1 is a sectional view showing a liquid crystal display device including two opposed substrates, a sealing material provided between the substrates, and a liquid crystal sealed in a sealed region surrounded by the sealing material.

Specifically, the liquid crystal display device shown has a specified form in which a back plane formed by providing a TFT layer 102 and a pixel electrode 103 on a first substrate 100 and further providing thereon a passivation film 104 and a first alignment film 105 is opposed to a front plane formed by providing on a second substrate 200 a black matrix 202, a color filter 203, a planarization film (overcoat film) 201, and a transparent electrode 204 and then providing a second alignment film 205 thereon. Further, a sealing material 301 is provided between the substrates, a liquid crystal layer 303 is provided to be sealed in a sealed region surrounded by the sealing material, and projections (columnar spacers) 302 and 304 are provided on the substrate surface in contact with the sealing material 301.

The material of the first substrate or the second substrate is not particularly limited as long as it is substantially transparent, and glass, ceramics, plastics, and the like can be used. Materials which can be used for a plastic substrate include cellulose derivatives such as cellulose, triacetyl cellulose, diacetyl cellulose, and the like; polycycloolefin derivatives; polyesters such as polyethylene terephthalate, polyethylene naphthalate, and the like; polyolefins such as polypropylene, polyethylene, and the like; polycarbonate, polyvinyl alcohol, polyvinyl chloride, polyvinylidene chloride, polyamide, polyimide, polyimide-amide, polystyrene, polyacrylate, polymethyl methacrylate, polyether sulfone, polyarylate, inorganic-organic composite materials such as glass fiber-epoxy resin, glass fiber-acrylic resin, and the like.

When a plastic substrate is used, a barrier film is preferably provided. The function of the barrier film is to decrease the moisture permeability possessed by the plastic substrate to improve the reliability of electric characteristics of the liquid crystal display device. The barrier film is not particularly limited as long as it has high transparency and low water-vapor permeability, and a thin film formed by vapor deposition, sputtering, or chemical vapor deposition (CVD method) using an inorganic material such as silicon oxide or the like is generally used.

In the present invention, the materials used for the first substrate and the second substrate are not particularly limited and may be the same or different. A glass substrate is preferred because the liquid crystal display device having excellent heat resistance and dimensional stability can be manufactured. Also, a plastic substrate is preferred because it is suitable for a manufacturing method by a roll-to-roll method and also suitable for weight lightening or flexibilizing. In addition, for the purpose of imparting flatness and heat resistance, good results can be obtained by a combination of a plastic substrate and a glass substrate.

In examples described below, a substrate is used as a material of the first substrate 100 or the second substrate 200.

The back plane includes the TFT layer 102 and the pixel electrode 103 provided on the first substrate 100. These are produced by a usual array process. The passivation film 104 and the first alignment film 105 are provided thereon to produce the back plane.

The passivation film 104 (also referred to as the inorganic protective film) is a film for protecting the TFT layer, and a nitride film ($SiN_x$), an oxide film ($SiO_x$), or the like is generally formed by a chemical vapor deposition (CVD) technique or the like.

The first alignment film 105 is a film having the function to align a liquid crystal, and a polymer material such as polyimide is generally used in many cases. An alignment agent solution including a polymer material and a solvent is used as a coating solution. The alignment film may inhibit adhesive force with the sealing material, and is thus formed by pattern application within the sealed region. The application is performed by using a printing method such as a flexographic printing method or a droplet discharge method such as ink jet. The applied alignment agent solution is pre-dried to evaporate the solvent, and then cross-linked and cured by baking. Then, alignment treatment is performed for causing an alignment function.

The alignment treatment is generally performed by a rubbing method. The polymer film formed as described above is rubbed in one direction with a rubbing cloth composed of fibers such as rayon to cause a liquid crystal aligning function.

Also, an optical alignment method may be used. The optical alignment method is a method of producing the alignment function by irradiating an alignment film containing an organic material having photosensitivity with polarized light without causing flaws or dust on the substrate due to rubbing. An example of the organic material used in the optical alignment method is a material containing a dichroic dye. A dye which can be used as the dichroic dye is a dye having a group (hereinafter abbreviated as an "optical alignment group") which produces photoreaction serving as an origin of the liquid crystal alignment function, such as molecular alignment induction or isomerization reaction by a Weigert effect due to photodichroism (for example, an azobenzene group), dimerization reaction (for example, a cinnamoyl group), photo-crosslinking reaction (for example, a benzophenone group), or photodecomposition reaction (for example, a polyimide group). The applied alignment agent solution is pre-dried to evaporate the solvent and then irradiated with light (polarized light) having any desired polarization to produce an alignment film having the alignment function in a desired direction.

On the other hand, the front plane includes the black matrix 202, the color filter 203, the planarization film 201, the transparent electrode 204, and the second alignment film 205 which are provided on the second substrate 200.

The black matrix 202 is formed by, for example, a pigment dispersion method. Specifically, a color resin solution containing a black colorant uniformly dispersed therein for forming the black matrix is applied to the second substrate 200 provided with the barrier film 201 to form a color layer. Then, the color layer is cured by baking. Then, photoresist is applied to the color layer and then pre-baked. The photoresist is exposed to light through a mask pattern, and then the color layer is patterned by development. Then, the photoresist layer is removed, and the color layer is baked to complete the black matrix 202.

Alternatively, a photoresist-type pigment dispersion may be used. In this case, the photoresist-type pigment dispersion is applied, pre-baked, and then exposed to light through a mask pattern, and then the color layer is patterned by development. Then, the photoresist layer is removed, and the color layer is baked to complete the black matrix 202.

The color filter 203 is formed by a pigment dispersion method, an electrodeposition method, a printing method, or a dyeing method. For example, in the pigment dispersion method, a color resin solution containing a (for example, red) pigment uniformly dispersed therein is applied to the second substrate 200 and cured by baking, and then a photoresist is applied thereon and pre-baked. The photoresist is exposed to light through a mask pattern and patterned by development. Then, the photoresist layer is removed, and baking is again performed to complete the (red) color filter 203 (203a). The order of the colors to be formed is not particularly limited. Similarly, a green color filter 203 (203b) and a blue color filter 203 (203c) are formed.

The transparent electrode 204 is provided on the color filter 203 (if required, the overcoat layer (201) is provided on the color filter 203 in order to planarize the surface). The transparent electrode 204 preferably has as high transmittance as possible and as low electric resistance as possible. The transparent electrode 204 is formed by a sputtering method of forming an oxide film such as ITO or the like.

Also, for the purpose of protecting the transparent electrode 204, the passivation film may be provided on the transparent electrode 204.

The second alignment film 205 is the same as the first alignment film 105 described above.

The specific configurations of the back plane and the front plane used in the present invention are described above, but the present invention is not limited to the specific configurations, and modification in the configurations can be freely made according to a desired liquid crystal display device.

The shape of the columnar spacers is not particularly limited, and the horizontal section thereof can be formed in any one of various shapes such as a circular shape, polygonal shapes, e.g., a tetragonal shape, and the like. However, in view of a misalignment margin in a process, the horizontal section particularly preferably has a circular shape or a regular polygonal shape. Also, the projection shape is preferably a truncated conical shape or a truncated pyramidal shape.

The material of the columnar spacers is not particularly limited as long as it is undissolved in the sealing material, the organic solvent used in the sealing material, or the liquid crystal, but a synthetic resin (curable resin) is preferred from the viewpoint of processing and weight lightening. On the other hand, the projections can be provided on the surface of the first substrate in contact with the sealing material by a photolithography method or a droplet discharge method. For this reason, a photocurable resin suitable for the photolithography method or droplet discharge method is preferably used.

Figure 2:
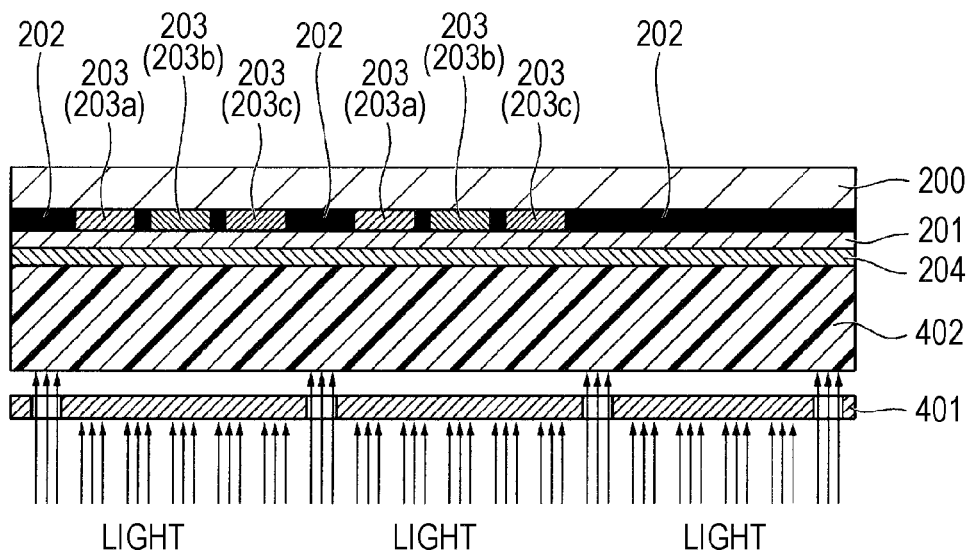
FIG. 2 is a drawing of an exposure step using, as a photomask pattern, a pattern for forming columnar spacers on a black matrix.

The case where the columnar spacers are formed by the photolithography method is described as an example. FIG. 2 is a drawing of an exposure step using, as a photomask pattern, a pattern for forming columnar spacers on a black matrix.

A resin solution (not containing a colorant) for forming the columnar spacers is applied to the transparent electrode 204 of the front plane. Then, a resin layer 402 is cured by baking. Then, a photoresist is applied to the resin layer and pre-baked. The photoresist is exposed to light through a mask pattern 401, and then the resin layer is patterned by development. Then, the photoresist layer is removed, and the resin layer is baked to complete columnar spacers (302 and 0304 in FIG. 1).

The formation positions of the columnar spacers can be determined to desired positions by the mask pattern. Therefore, both the inside of the sealed region and the outside (sealing material applied portion) of the sealed region of the liquid crystal display device can be simultaneously formed. Also, the columnar spacers are preferably formed at positions on the black matrix so as not to degrade the quality of the sealed region. The columnar spacers formed by the photolithography method may be referred to as "column spacers" or "photo-spacers".

A mixture containing a negative water-soluble resin, such as a PVA-stilbazo photosensitive resin or the like, a polyfunctional acrylic monomer, an acrylic acid copolymer, a triazole-based initiator, etc. is used as the material of the columnar spacers. Another method uses a color resin prepared by dispersing a colorant in a polyimide resin. In the present invention, the material is not particularly limited, and the spacers can be formed by using a known material according to compatibility with the liquid crystal and sealing material used.

After the columnar spacers are provided on the surface serving as the sealed region on the front plane as described above, the sealing material (301 in FIG. 1) is applied to the surface of the back plane which comes in contact with the sealing material.

The material of the sealing material is not particularly limited, and a curable resin composition prepared by adding a polymerization initiator to an epoxy-based or acrylic photo-curable, heat-curable, or photo-heat-curable resin is used. Also, in order to control moisture permeability, elastic modulus, and viscosity, a filler composed of an inorganic or organic substance may be added. Examples of the shape of the filler include, but not particularly limited to, a spherical shape, a fibrous shape, an amorphous shape, and the like. Further, a spherical or fibrous gap material having a monodisperse diameter may be mixed for controlling a good cell gap, or a fibrous material which is easily entangled with projections on the substrate may be mixed for more enhancing the adhesive force to the substrate. In this case, the diameter of the fibrous material used is preferably about $1/5$ to $1/10$ or less of the cell gap, and the length of the fibrous material is preferably shorter than the width of the seal applied.

The material of the fibrous material is not particularly limited as long as a predetermined shape can be formed, and can be properly selected from synthetic fibers such as cellulose, polyamide, polyester, and like, and inorganic materials such as glass, carbon, and the like.

The method for applying the sealing material is a printing method or a dispensing method, and the dispensing method is preferred because of a small amount of the sealing material used. The application position of the sealing material is generally a position on the black matrix so as to avoid an adverse effect on the sealed region. In order to form a liquid crystal dropping region in the next step (to avoid leakage of the liquid crystal), the shape of the sealing material applied is a closed-loop shape.

The liquid crystal is dropped in the closed-loop shape (sealed region) of the front plane to which the sealing material has been applied. Usually, a disperser is used. In order to allow the amount of the liquid crystal dropped to coincide with the volume of a liquid crystal cell, the amount of the liquid crystal dropped is basically the same as the volume determined by multiplying the height of the columnar spacers by the area inside of the seal applied. In order to optimize a liquid crystal leakage in a cell bonding step and display characteristics, the amount of the liquid crystal dropped may be properly adjusted, or liquid crystal dropping positions may be dispersed.

Next, the back plane is bonded to the front plane on which the sealing material has been applied, and the liquid crystal has been dropped. Specifically, the front plane and the back plane are attracted to a stage having a mechanism of attracting a substrate, such as an electrostatic chuck, to be arranged at a position (distance) where the second alignment film of the front plane faces the first alignment film of the back plane, and the sealing agent does not contact the other substrate. In this state, the pressure in the system is reduced. After the completion of pressure reduction, the positions of both substrates are adjusted (alignment operation) while the bonding position between the front plane and the back plane is confirmed. After the adjustment of the bonding position is completed, the substrates are brought near to each other to a position where the sealing material on the front plane is in contact with the back plane. In this state, the system is filled with inert gas to return the pressure to atmospheric pressure while gradually releasing the reduced pressure. In this case, the front plane and the back plane are bonded together by the atmospheric pressure to form a cell gap corresponding to the height of the columnar spacers. In this state, the sealing material is cured by irradiation with ultraviolet light to form a liquid crystal cell. Then, in some cases, a heating step is added to accelerate curing of the sealing material. In order to enhance adhesion of the sealing material and improve reliability of electric characteristics, the heating step is often added.

EXAMPLES

The present invention is described in further detail below by way of examples, but the present invention is not limited to these examples. In the examples and comparative examples below, "%" in a composition represents "% by mass".

The characteristics measured in the examples are as follows.

Tni: nematic-isotropic liquid phase transition temperature (° C.)

Δn: refractive index anisotropy at 295K (sometimes called birefringence)

Δ∈: dielectric anisotropy at 295K

η: viscosity at 295K (mPa·s)

γ1: rotational viscosity at 295K (mPa·s)

VHR; voltage holding ratio (%) at 313K under the conditions of a frequency of 60 Hz and an applied voltage of 5 V Image Sticking:

Image sticking of a liquid crystal display device was evaluated by display of a predetermined fixed pattern within a display area for 1440 hours and then uniform display over the entire screen to visually observe the level of residual image of the fixed pattern based on the following four levels:

A: No residual image
B: Slight residual image at an allowable level
C: Residual image at an unallowable level
D: Significant residual image Volatility/Contamination of Manufacturing Apparatus:

Volatility of a liquid crystal material was evaluated by observing an operation state of a vacuum stirring-defoaming mixer while lighting with a stroboscope to visually observe foaming of the liquid crystal material. Specifically, 0.8 kg of the liquid crystal material was placed in a dedicated vessel of the vacuum stirring-defoaming mixer with a volume of 2.0 L, and the vacuum stirring defoaming mixer was operated at a revolution speed of 15 $S^{-1}$ and a rotation speed of 7.5 $S^{-1}$ under deaeration at 4 kPa. A time required up to the start of foaming was determined and evaluated based on the following four levels.

A: 3 minutes or more were required until foaming, causing the low possibility of apparatus contamination by evaporation B: 1 minute or more and less than 3 minutes were required until foaming, causing the possibility of slight apparatus contamination by evaporation C: 30 seconds or more and less than 1 minute were required until foaming, causing the occurrence of apparatus contamination by evaporation D: Less than 30 seconds were required until foaming, causing the possibility of significant apparatus contamination by evaporation Process Adaptability:

Process adaptability was evaluated by, in the ODF process, dropping 40 pL of liquid crystal each 100,000 times using a constant-volume measuring pump to measure a change in amount of the liquid crystal dropped 200 times during each of 0 to 200 times, 201 to 400 times, 401 to 600 times, . . . 99801 to 100,000 times dropping based on the following four levels:

A: Very small change (enabling stable manufacture of a liquid crystal display device)
B: Slight change at an allowable level
C: Change at an unallowable level (degrading yield due to the occurrence of spots)
D: Significant change (causing liquid crystal leakage or vacuum foaming)

Solubility at Low Temperature:

Solubility at a low temperature was evaluated by, after preparing a liquid crystal composition, weighing 0.5 g of the liquid crystal composition in a 1-mL sample bottle, and continuously changing the temperature in a temperature control test chamber in a cycle of −20° C. (kept for 1 hour), temperature rise (0.2° C./min), 0° C. (kept for 1 hour), temperature rise (0.2° C./min), 20° C. (kept for 1 hour), temperature drop (−0.2° C./min), 0° C. (kept for 1 hour), temperature drop (−0.2° C./min), and −20° C. to visually observe the occurrence of precipitates of the liquid crystal composition based on the following four levels:

A: No precipitates were observed for 600 hours or more
B: No precipitates were observed for 300 hours or more
C: Precipitates were observed within 150 hours
D: Precipitates were observed within 75 hours Example 1

A composition shown below was prepared. Table 1 shows physical property values of the composition of Example 1.

[Chem. 161]

| Chemical Structure | | Ratio (%) |
|---|---|---|
| (structure) | (2.2) | 40 |
| (structure) | (1.3) | 10 |
| (structure) | (i-2.2) | 7 |
| (structure) | (i-2.1) | 8 |

[Chem. 161]
| Chemical Structure | | Ratio (%) |
|---|---|---|
| 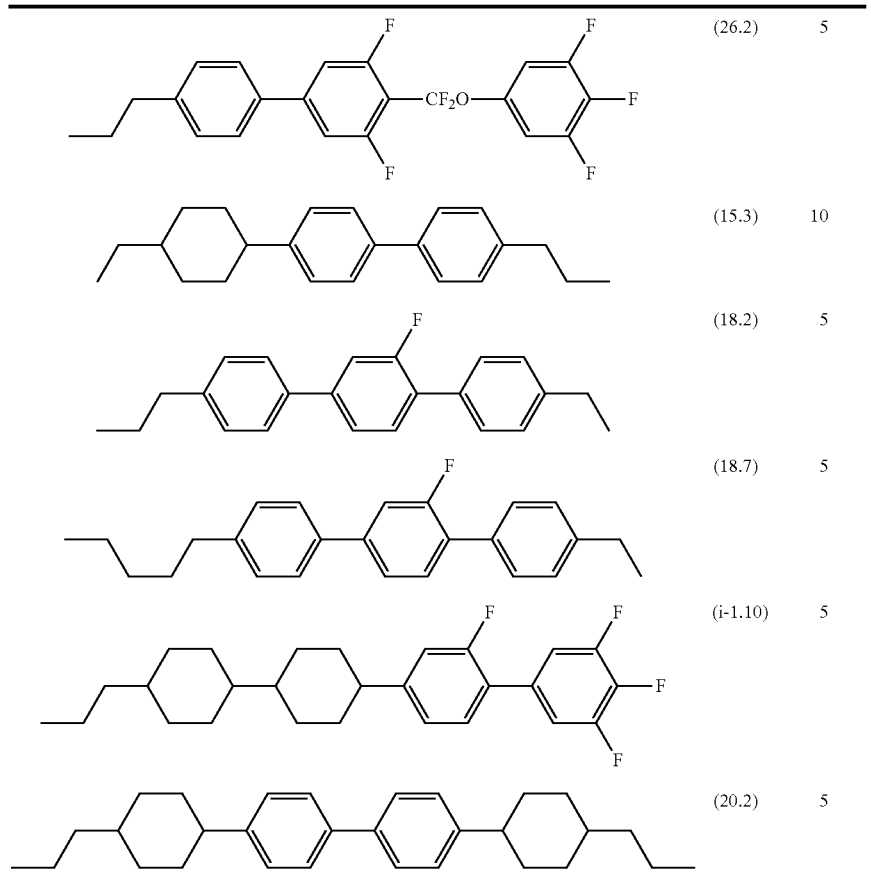 | (26.2) | 5 |
| | (15.3) | 10 |
| | (18.2) | 5 |
| | (18.7) | 5 |
| | (i-1.10) | 5 |
| | (20.2) | 5 |
TABLE 1
| Tni (° C.) | 95.7 |
|---|---|
| Δn | 0.142 |
| Δε | 6.6 |
Example 2
A composition shown below was prepared. Table 2 shows physical property values of the composition of Example 2.
[Chem. 162]
| Chemical Structure | | Ratio (%) |
|---|---|---|
| 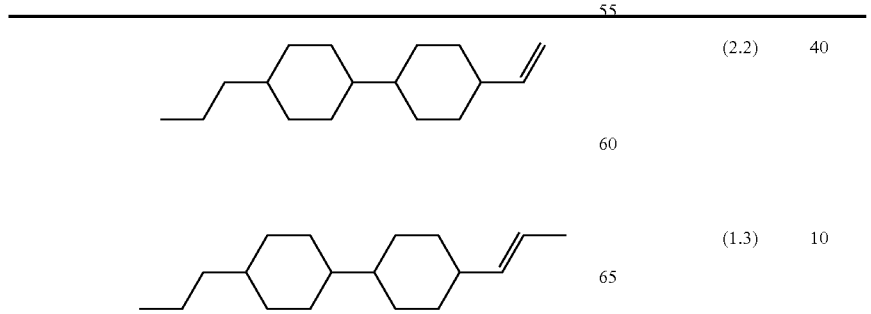 | (2.2) | 40 |
| | (1.3) | 10 |

-continued
[Chem.162]
| Chemical Structure | | Ratio (%) |
|---|---|---|
| 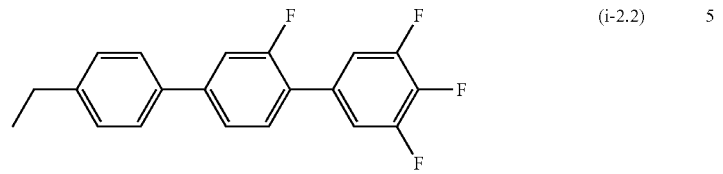 | (i-2.2) | 5 |
| 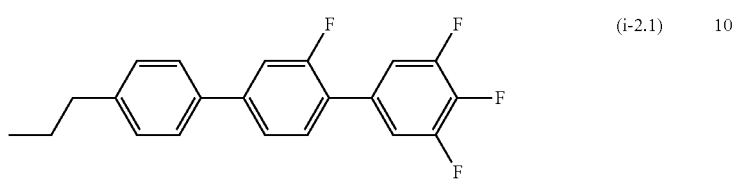 | (i-2.1) | 10 |
| 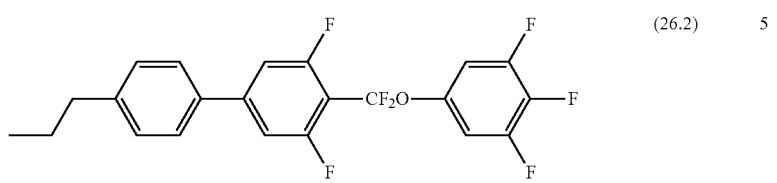 | (26.2) | 5 |
| 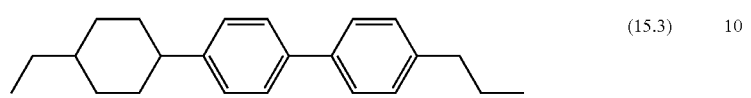 | (15.3) | 10 |
| 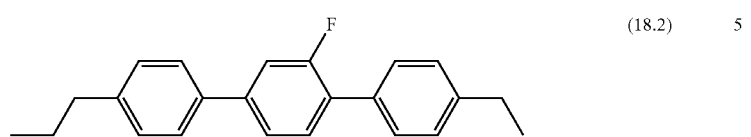 | (18.2) | 5 |
| 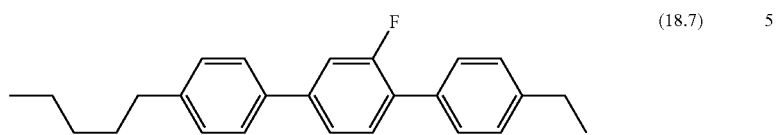 | (18.7) | 5 |
| 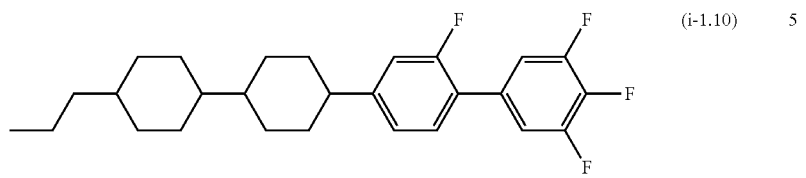 | (i-1.10) | 5 |
| 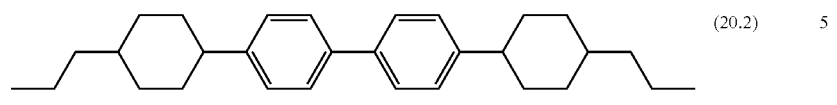 | (20.2) | 5 |

TABLE 2

| | |
|---|---|
| Tni (° C.) | 95.9 |
| Δn | 0.142 |
| Δε | 6.6 |

The compositions of Examples 1 and 2 each containing three or more compounds represented by the general formula (i) showed substantially the same physical property values and excellent storage stability.

Comparative Example 1

A composition shown below containing two compounds represented by the general formula (i) was prepared. Table 3 shows physical property values of the composition of Comparative Example 1.

[Chem.163]

| Chemical Structure | | Ratio (%) |
|---|---|---|
| | (2.2) | 40 |
| | (1.3) | 10 |
| | (26.2) | 5 |
| | (15.3) | 10 |
| | (18.2) | 5 |
| | (18.7) | 5 |
| | (i-1.10) | 5 |
| | (20.2) | 5 |
| | (57.2) | 15 |

TABLE 3

| Tni (° C.) | 98.1 |
|---|---|
| Δn | 0.129 |
| Δε | 6.1 |

The composition of Comparative Example 1 containing only one compound represented by the general formula (i) showed lower Δn and Δε than the compositions of Examples 1 and 2 each containing three or more compounds represented by the general formula (i).

Comparative Example 2

A composition shown below containing two compounds represented by the general formula (i) was prepared. Table 4 shows physical property values of the composition of Comparative Example 2.

[Chem.164]

| Chemical Structure | | Ratio (%) |
|---|---|---|
| | (2.2) | 40 |
| | (1.3) | 10 |
| | (i-2.2) | 15 |
| | (26.2) | 5 |
| | (15.3) | 10 |
| | (18.2) | 5 |
| | (18.7) | 5 |
| | (i-1.10) | 5 |
| | (20.2) | 5 |

TABLE 4

| Tni (° C.) | 94.9 |
|---|---|
| Δn | 0.143 |
| Δε | 6.6 |

The composition of Comparative Example 2 containing only two compounds represented by the general formula (i) showed the same physical property values as the compositions of Examples 1 and 2 each containing three or more compounds represented by the general formula (i), but precipitation was confirmed 4 weeks after.

Comparative Example 3

A composition shown below containing two compounds represented by the general formula (i) was prepared. Table 5 shows physical property values of the composition of Comparative Example 3.

[Chem.165]

| Chemical Structure | | Ratio (%) |
|---|---|---|
| 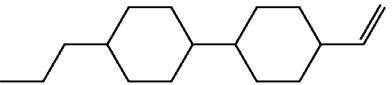 [SMILES: C=CC1CCC(C2CCC(CCC)CC2)CC1] | (2.2) | 40 |
| 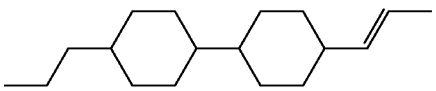 | (1.3) | 10 |
| 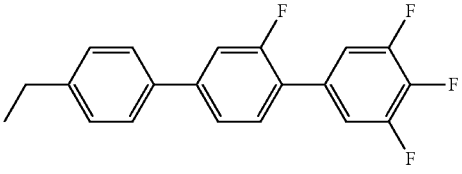 [SMILES: CCc1ccc(-c2ccc(-c3cc(F)c(F)c(F)c3)c(F)c2)cc1] | (i-2.2) | 10 |
| 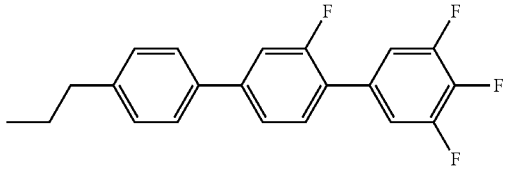 | (i-2.1) | 10 |
| 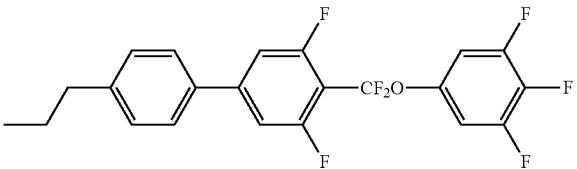 | (26.2) | 5 |
| 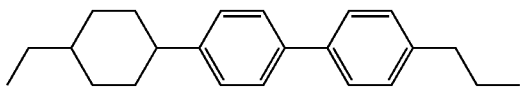 | (15.3) | 10 |
| 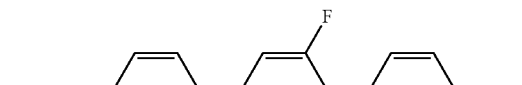 | (18.2) | 5 |
|  | (18.7) | 5 |
|  | (20.2) | 5 |

TABLE 5

| | |
|---|---|
| Tni (° C.) | 86.2 |
| Δn | 0.145 |
| Δε | 6.7 |

The composition of Comparative Example 3 containing only two compounds represented by the general formula (i) showed lower Tni than the compositions of Examples 1 and 2 each containing three or more compounds represented by the general formula (i), and precipitation was confirmed 4 weeks after.

Example 3

A composition shown below was prepared. Table 6 shows physical property values of the composition of Example 3.

[Chem. 166]

| Chemical Structure | | Ratio (%) |
|---|---|---|
| 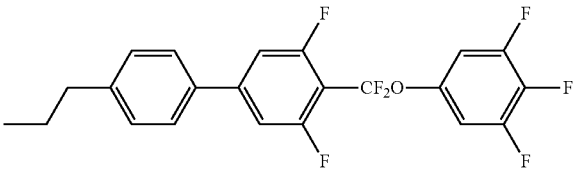 | (26.2) | 5 |
| 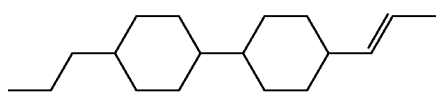 [SMILES: C/C=C/C1CCC(C2CCC(CCC)CC2)CC1] | (1.3) | 10 |
| 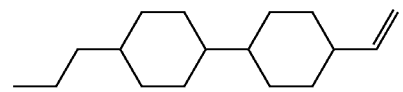 [SMILES: C=CC1CCC(C2CCC(CCC)CC2)CC1] | (2.2) | 50 |
| 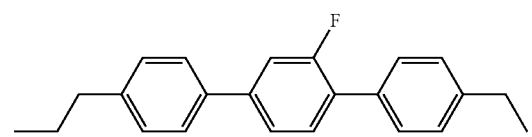 [SMILES: CCCc1ccc(-c2ccc(-c3ccc(CC)cc3)c(F)c2)cc1] | (18.2) | 5 |
| 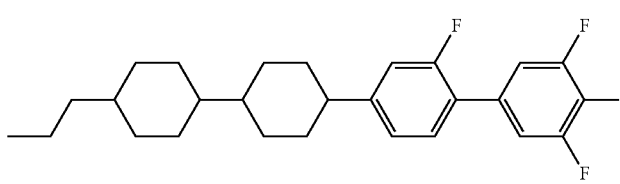 | (i-1.10) | 3 |
| 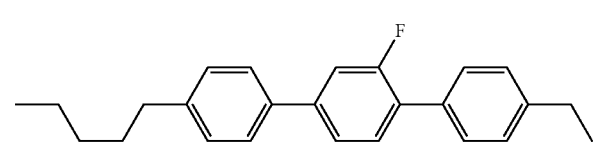 [SMILES: CCCCCc1ccc(-c2ccc(-c3ccc(CC)cc3)c(F)c2)cc1] | (18.7) | 5 |
| 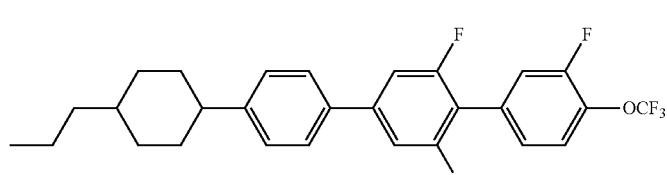 | (39.2) | 5 |
| 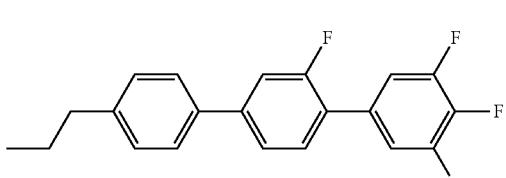 | (i-2.1) | 5 |
| 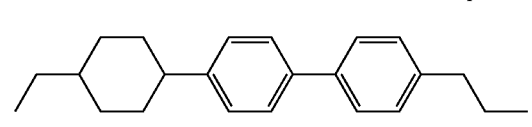 | (15.3) | 5 |

-continued

[Chem. 166]

| Chemical Structure | | Ratio (%) |
|---|---|---|
| (structure with ethyl-phenyl-difluorophenyl-trifluorophenyl) | (i-2.2) | 5 |
| (structure with cyclohexyl-phenyl-phenyl-cyclohexyl) | (20.2) | 2 |

TABLE 6

| | |
|---|---|
| Tni (° C.) | 77.9 |
| Δn | 0.114 |
| Δε | 4.4 |
| η (mPa·s) | 10.3 |
| γ1 (mPa·s) | 40 |

Example 4

A composition shown below was prepared. Table 7 shows physical property values of the composition of Example 4.

[Chem. 167]

| Chemical Structure | | Ratio (%) |
|---|---|---|
| (propyl-phenyl-difluorophenyl-CF₂O-trifluorophenyl) | (26.2) | 5 |
| (propyl-dicyclohexyl-vinyl with methyl) | (1.3) | 5 |
| (propyl-dicyclohexyl-vinyl) | (2.2) | 45 |
| (propyl-phenyl-fluorophenyl-phenyl-ethyl) | (18.2) | 5 |
| (propyl-dicyclohexyl-difluorophenyl-trifluorophenyl) | (i-1.10) | 5 |
| (butyl-phenyl-fluorophenyl-phenyl-ethyl) | (18.7) | 7 |

-continued
[Chem. 167]
| Chemical Structure | | Ratio (%) |
|---|---|---|
| 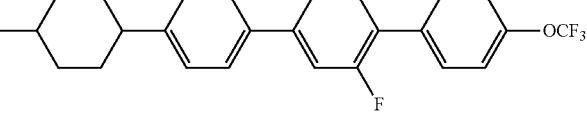 | (39.2) | 6 |
| 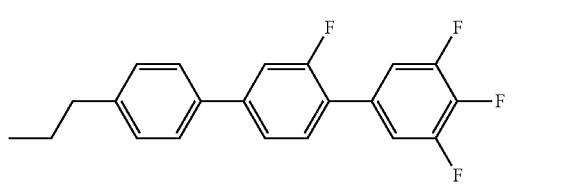 | (i-2.1) | 10 |
| 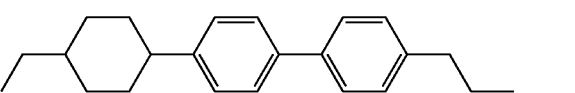 [SMILES: CCCc1ccc(-c2ccc(C3CCC(CC)CC3)cc2)cc1] | (15.3) | 7 |
| 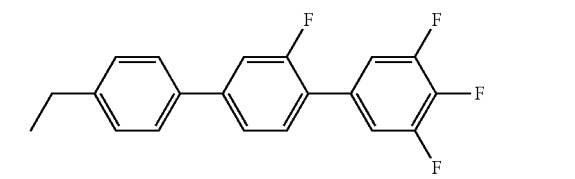 [SMILES: CCc1ccc(-c2ccc(-c3cc(F)c(F)c(F)c3)c(F)c2)cc1] | (i-2.2) | 3 |
| 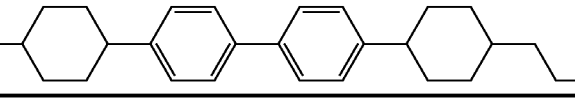 | (20.2) | 2 |
TABLE 7
| | |
|---|---|
| Tni (° C.) | 80.5 |
| Δn | 0.127 |
| Δε | 5.9 |
| η (mPa·s) | 13.7 |
| γ1 (mPa·s) | 58 |
Example 5
A composition shown below was prepared. Table 8 shows physical property values of the composition of Example 5.
[Chem. 168]
| Chemical Structure | | Ratio (%) |
|---|---|---|
| | (26.2) | 5 |
| | (1.3) | 5 |
| | (2.2) | 40 |

-continued
[Chem. 168]
| Chemical Structure | | Ratio (%) |
|---|---|---|
| 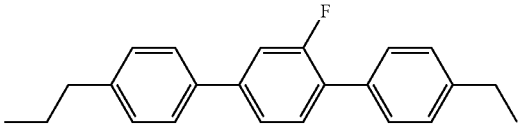 [SMILES: CCCc1ccc(-c2ccc(-c3ccc(CC)cc3)c(F)c2)cc1] | (18.2) | 5 |
| 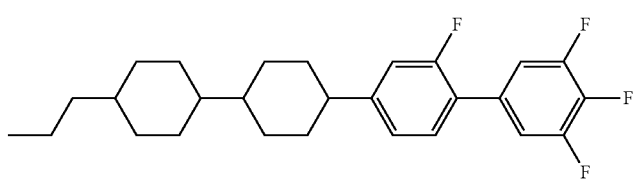 [SMILES: CCCC1CCC(C2CCC(c3ccc(-c4cc(F)c(F)c(F)c4)c(F)c3)CC2)CC1] | (i-1.10) | 7 |
| 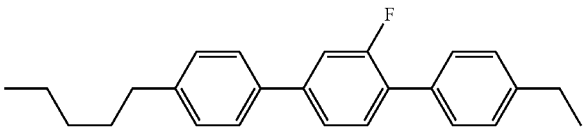 | (18.7) | 7 |
| 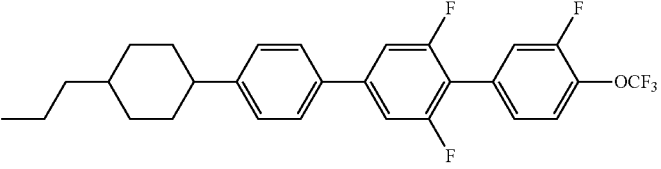 [SMILES: CCCC1CCC(c2ccc(-c3cc(F)c(-c4ccc(OC(F)(F)F)c(F)c4)c(F)c3)cc2)CC1] | (39.2) | 6 |
| 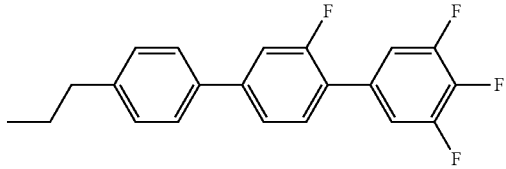 [SMILES: CCCc1ccc(-c2ccc(-c3cc(F)c(F)c(F)c3)c(F)c2)cc1] | (i-2.1) | 10 |
| 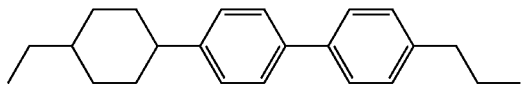 [SMILES: CCCc1ccc(-c2ccc(C3CCC(CC)CC3)cc2)cc1] | (15.3) | 7 |
| 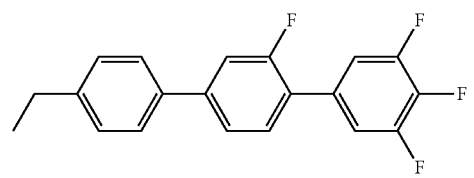 [SMILES: CCc1ccc(-c2ccc(-c3cc(F)c(F)c(F)c3)c(F)c2)cc1] | (i-2.2) | 8 |

TABLE 8

| | |
|---|---|
| Tni (° C.) | 76.8 |
| Δn | 0.130 |
| Δε | 7.3 |
| η (mPa·s) | 15.3 |
| γ1 (mPa·s) | 64 |

Example 6

A composition shown below was prepared. Table 9 shows physical property values of the composition of Example 6.

[Chem. 169]

| Chemical Structure | | Ratio (%) |
|---|---|---|
| [propyl-biphenyl with F substituents-CF$_2$O-trifluorophenyl] | (26.2) | 5 |
| [propyl-bicyclohexyl-propenyl] | (1.3) | 15 |
| [propyl-bicyclohexyl-vinyl] | (2.2) | 30 |
| [vinyl-cyclohexyl-methylphenyl] | (6.7) | 5 |
| [propyl-bicyclohexyl-CF$_2$O-trifluorophenyl] | (28.3) | 3 |
| [butenyl-cyclohexyl-methylphenyl] | (6.9) | 10 |
| [propyl-bicyclohexyl-fluorophenyl-trifluorophenyl] | (i-1.10) | 10 |
| [pentyl-bicyclohexyl-CF$_2$O-trifluorophenyl] | (28.5) | 3 |
| [ethyl-biphenyl with F substituents-CF$_2$O-trifluorophenyl] | (26.1) | 4 |

[Chem. 169]
| Chemical Structure | | Ratio (%) |
|---|---|---|
| 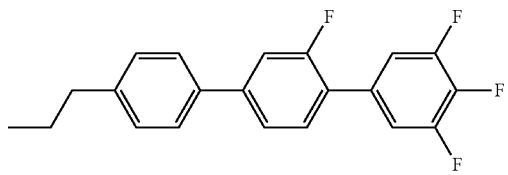 | (i-2.1) | 10 |
| 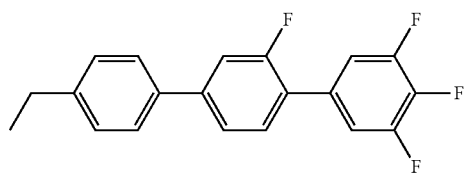 [SMILES: CCc1ccc(-c2ccc(-c3cc(F)c(F)c(F)c3)c(F)c2)cc1] | (i-2.2) | 5 |
TABLE 9
| | |
|---|---|
| Tni (° C.) | 80.3 |
| Δn | 0.103 |
| Δε | 7.4 |
| η (mPa·s) | 12.8 |
| γ1 (mPa·s) | 59 |
Example 7
A composition shown below was prepared. Table 10 shows physical property values of the composition of Example 7.
[Chem. 170]
| Chemical Structure | | Ratio (%) |
|---|---|---|
| 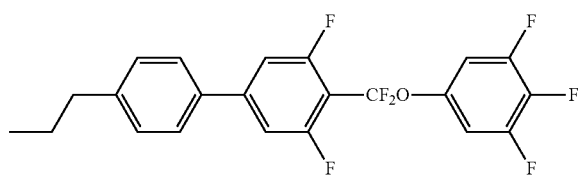 | (26.2) | 5 |
| 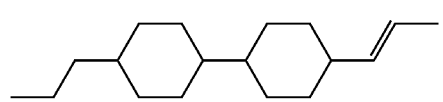 | (1.3) | 15 |
| 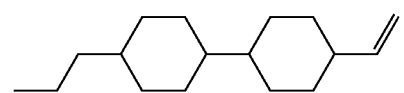 [SMILES: C=CC1CCC(C2CCC(CCC)CC2)CC1] | (2.2) | 30 |
| 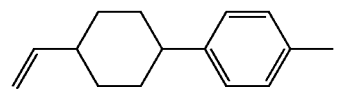 | (6.7) | 5 |
| 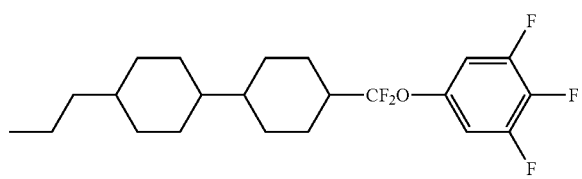 | (28.3) | 3 |
| 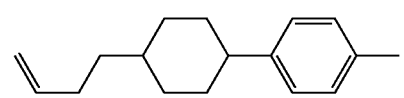 | (6.9) | 10 |

-continued
[Chem. 170]
| Chemical Structure | | Ratio (%) |
|---|---|---|
| 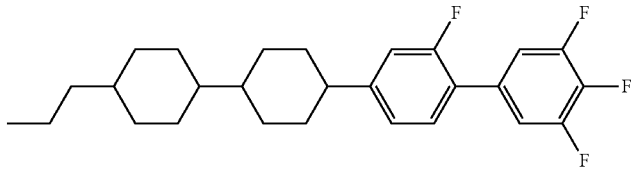 [SMILES: CCCC1CCC(C2CCC(c3ccc(-c4cc(F)c(F)c(F)c4)c(F)c3)CC2)CC1] | (i-1.10) | 9 |
| 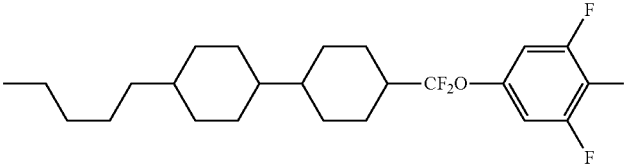 | (28.5) | 3 |
| 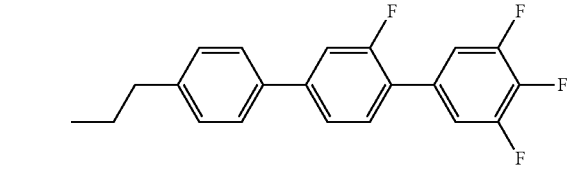 [SMILES: CCCc1ccc(-c2ccc(-c3cc(F)c(F)c(F)c3)c(F)c2)cc1] | (i-2.1) | 10 |
| 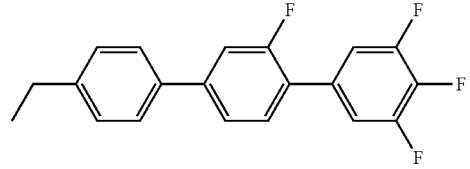 [SMILES: CCc1ccc(-c2ccc(-c3cc(F)c(F)c(F)c3)c(F)c2)cc1] | (i-2.2) | 10 |
TABLE 10
| Tni (° C.) | 81.2 |
|---|---|
| Δn | 0.103 |
| Δε | 6.9 |
| η (mPa·s) | 11.7 |
| γ1 (mPa·s) | 61 |
Example 8
A composition shown below was prepared. Table 11 shows physical property values of the composition of Example 8.
[Chem. 171]
| Chemical Structure | | Ratio (%) |
|---|---|---|
| 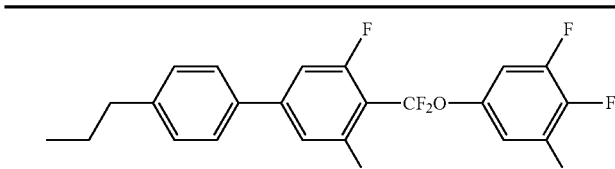 | (26.2) | 8 |
| 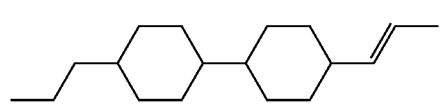 [SMILES: C/C=C/C1CCC(C2CCC(CCC)CC2)CC1] | (1.3) | 15 |
| 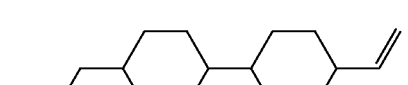 | (2.2) | 30 |
| 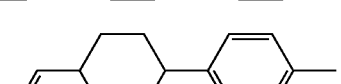 | (6.7) | 5 |

-continued
[Chem. 171]
| Chemical Structure | | Ratio (%) |
|---|---|---|
| 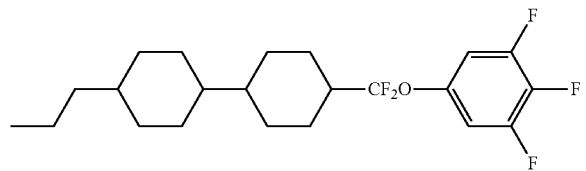 | (28.3) | 5 |
| 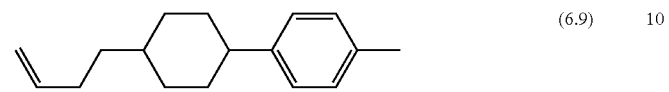 | (6.9) | 10 |
| 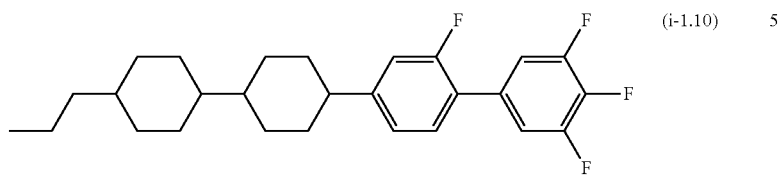 | (i-1.10) | 5 |
| 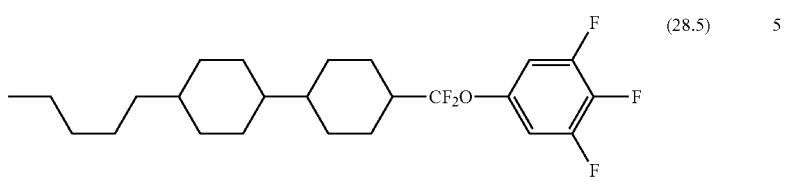 | (28.5) | 5 |
| 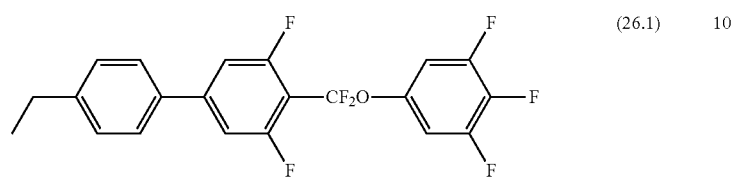 | (26.1) | 10 |
| 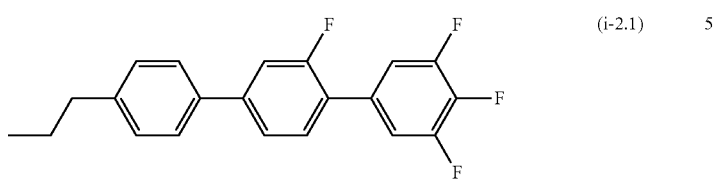 | (i-2.1) | 5 |
| 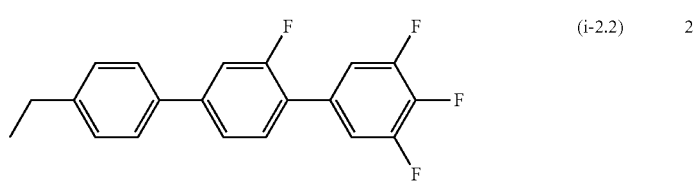 | (i-2.2) | 2 |

TABLE 11

| | |
|---|---|
| Tni (° C.) | 70.9 |
| Δn | 0.100 |
| Δε | 7.9 |
| η (mPa·s) | 14.3 |
| γ1 (mPa·s) | 44 |

TABLE 12

| | |
|---|---|
| Tni (° C.) | 70.7 |
| Δn | 0.105 |
| Δε | 6.8 |
| η (mPa·s) | 12.2 |
| γ1 (mPa·s) | 46 |

Example 9

A composition shown below was prepared. Table 12 shows physical property values of the composition of Example 9.

Example 10

A composition shown below was prepared. Table 13 shows physical property values of the composition of Example 10.

[Chem. 172]

| Chemical Structure | Ratio (%) | |
|---|---|---|
| | (1.3) | 15 |
| | (2.2) | 40 |
| | (6.7) | 7 |
| | (i-2.1) | 7 |
| | (18.5) | 3 |
| | (15.3) | 8 |
| | (i-2.2) | 5 |
| | (42.3) | 10 |
| | (i-2.4) | 5 |

[Chem. 173]
| Chemical Structure | | Ratio (%) |
|---|---|---|
| 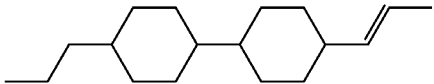 | (1.3) | 15 |
| 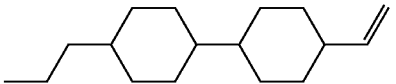 | (2.2) | 40 |
| 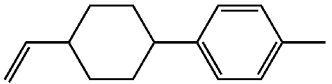 | (6.7) | 7 |
| 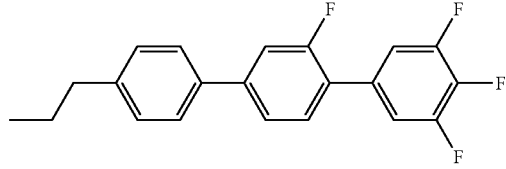 [SMILES: CCCc1ccc(-c2ccc(-c3cc(F)c(F)c(F)c3)c(F)c2)cc1] | (i-2.1) | 3 |
| 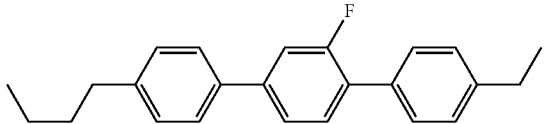 [SMILES: CCCCc1ccc(-c2ccc(-c3ccc(CC)cc3)c(F)c2)cc1] | (18.5) | 3 |
| 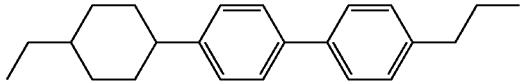 | (15.3) | 8 |
| 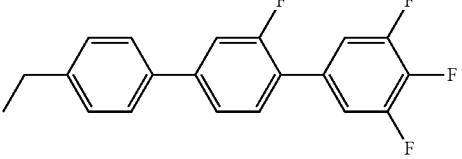 | (i-2.2) | 3 |
| 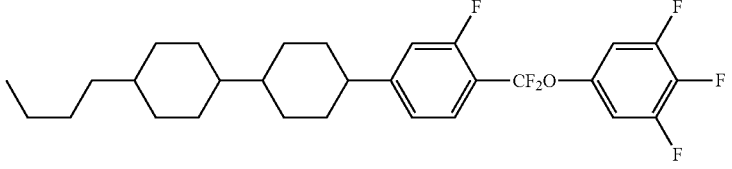 | (42.3) | 10 |
| 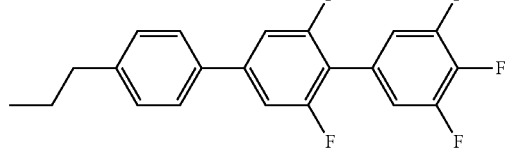 | (i-2.4) | 3 |
| 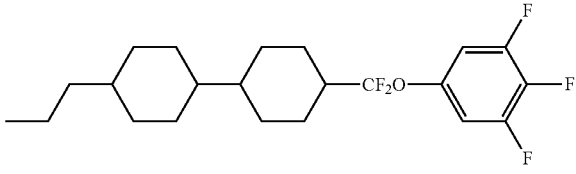 | (28.3) | 8 |

TABLE 13

| | |
|---|---|
| Tni (° C.) | 81.1 |
| Δn | 0.100 |
| Δε | 6.2 |
| η (mPa·s) | 12.1 |
| γ1 (mPa·s) | 41 |

Example 11

A composition shown below was prepared. Table 14 shows physical property values of the composition of Example 11.

[Chem. 174]

| Chemical Structure | | Ratio (%) |
|---|---|---|
| propyl-cyclohexyl-cyclohexyl-CH=CH-CH3 | (1.3) | 20 |
| propyl-cyclohexyl-cyclohexyl-CH=CH2 | (2.2) | 30 |
| CH2=CH-cyclohexyl-phenyl-CH3 | (6.7) | 7 |
| propyl-phenyl-(2-F)phenyl-(3,4,5-triF)phenyl | (i-2.1) | 5 |
| butyl-phenyl-(2-F)phenyl-phenyl-ethyl | (18.5) | 3 |
| ethyl-cyclohexyl-phenyl-phenyl-propyl | (15.3) | 5 |
| ethyl-phenyl-(2-F)phenyl-(3,4,5-triF)phenyl | (i-2.2) | 10 |
| butyl-cyclohexyl-cyclohexyl-(2-F)phenyl-CF2O-(3,4,5-triF)phenyl | (42.3) | 10 |
| propyl-phenyl-(2,6-diF)phenyl-(3,4,5-triF)phenyl | (i-2.4) | 5 |

-continued

[Chem. 174]

| Chemical Structure | | Ratio (%) |
|---|---|---|
| (structure: pentyl-phenyl-difluorophenyl-difluorophenyl-CF₂O-tetrafluorophenyl) | (45.4) | 5 |

TABLE 14

| | |
|---|---|
| Tni (° C.) | 71.0 |
| Δn | 0.113 |
| Δε | 9.0 |
| η (mPa·s) | 18.0 |
| γ1 (mPa·s) | 62 |

Example 12

A composition shown below was prepared. Table 15 shows physical property values of the composition of Example 12.

[Chem. 175]

| Chemical Structure | | Ratio (%) |
|---|---|---|
| (propyl-phenyl-difluorophenyl-CF₂O-tetrafluorophenyl) | (26.2) | 5 |
| (propyl-dicyclohexyl-propenyl) | (1.3) | 10 |
| (propyl-dicyclohexyl-vinyl) | (2.2) | 40 |
| (propyl-phenyl-fluorophenyl-phenyl-ethyl) | (18.2) | 4 |
| (propyl-dicyclohexyl-phenyl-trifluorophenyl) | (i-1.10) | 3 |
| (pentyl-phenyl-fluorophenyl-phenyl-ethyl) | (18.7) | 6 |
| (propyl-phenyl-fluorophenyl-trifluorophenyl) | (i-2.1) | 10 |

-continued

[Chem. 175]

| Chemical Structure | | Ratio (%) |
|---|---|---|
| [structure] | (18.5) | 3 |
| [structure] | (15.3) | 7 |
| [structure] | (20.2) | 4 |
| [structure] | (i-2.3) | 8 |

TABLE 15

| | |
|---|---|
| Tni (° C.) | 72.2 |
| Δn | 0.119 |
| Δε | 4.8 |
| η (mPa·s) | 11.9 |
| γ1 (mPa·s) | 41 |

Example 13

A composition shown below was prepared. Table 16 shows physical property values of the composition of Example 13.

[Chem. 176]

| Chemical Structure | | Ratio (%) |
|---|---|---|
| [structure] | (26.2) | 5 |
| [structure] | (1.3) | 10 |
| [structure] | (2.2) | 40 |
| [structure] | (18.2) | 4 |
| [structure] | (i-1.10) | 2 |

[Chem. 176]
| Chemical Structure | | Ratio (%) |
|---|---|---|
| 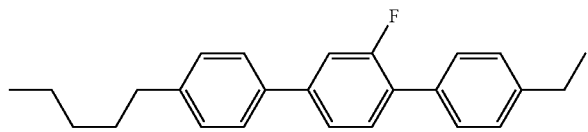 [SMILES: CCCCCc1ccc(-c2ccc(-c3ccc(CC)cc3)c(F)c2)cc1] | (18.7) | 6 |
| 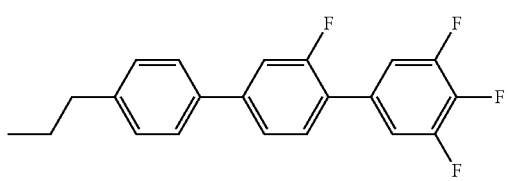 [SMILES: CCCc1ccc(-c2ccc(-c3cc(F)c(F)c(F)c3)c(F)c2)cc1] | (i-2.1) | 7 |
| 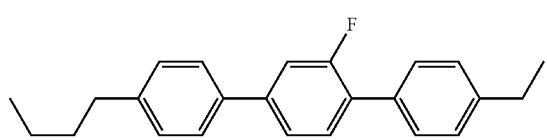 [SMILES: CCCCc1ccc(-c2ccc(-c3ccc(CC)cc3)c(F)c2)cc1] | (18.5) | 3 |
| 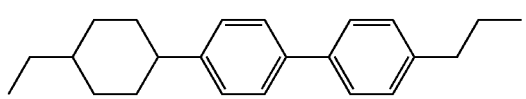 [SMILES: CCCc1ccc(-c2ccc(C3CCC(CC)CC3)cc2)cc1] | (15.3) | 7 |
| 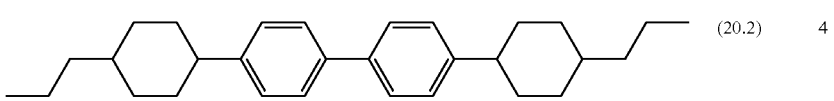 | (20.2) | 4 |
| 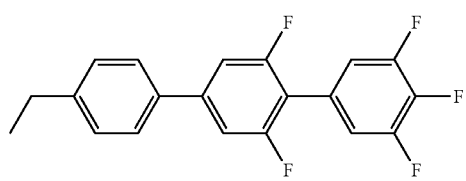 | (i-2.3) | 5 |
| 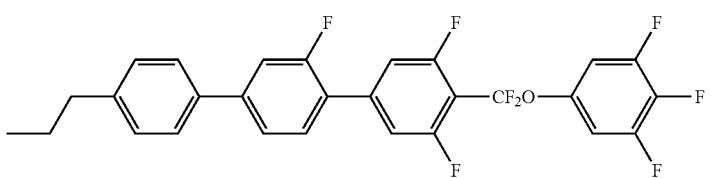 | (45.2) | 7 |

157
TABLE 16

| | |
|---|---|
| Tni (° C.) | 78.9 |
| Δn | 0.121 |
| Δε | 5.1 |
| η (mPa·s) | 15.1 |
| γ1 (mPa·s) | 46 |

158
Example 14

A composition shown below was prepared. Table 17 shows physical property values of the composition of Example 14.

[Chem. 177]

| Chemical Structure | | Ratio (%) |
|---|---|---|
| | (26.2) | 5 |
| | (1.3) | 10 |
| | (2.2) | 40 |
| | (18.2) | 4 |
| | (i-1.10) | 9 |
| | (18.7) | 5 |
| | (i-2.1) | 13 |
| | (15.3) | 5 |
| | (20.2) | 4 |

-continued

[Chem. 177]

| Chemical Structure | Ratio (%) |
|---|---|
| 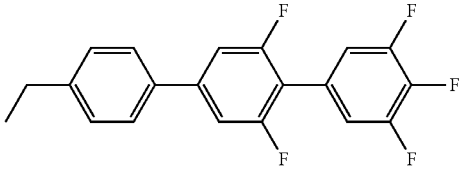 (i-2.3) | 5 |

TABLE 17

| Tni (° C.) | 80.6 |
|---|---|
| Δn | 0.116 |
| Δε | 5.6 |
| η (mPa · s) | 12.4 |
| γ1 (mPa · s) | 41 |

(Examples of Liquid Crystal Display Device)

An IPS-mode liquid crystal display having a structure shown in FIGS. 1 and 2 was formed by using each of the liquid crystal compositions described in Examples 1 to 3. The liquid crystal display devices had excellent display characteristics (refer to Table 18) and maintained stable display characteristics over a long time.

TABLE 18

|  | Example 1 | Example 2 | Example 3 |
|---|---|---|---|
| Initial voltage holding ratio/% | 99.2 | 99.4 | 99.2 |
| Voltage holding ratio 1 hour after at 150° C./% | 98.3 | 98.3 | 98.1 |
| Image sticking | A | A | A |
| Dropping mark | A | A | A |
| Process adaptability | A | A | A |
| Solubility at low temperature | A | A | A |

INDUSTRIAL APPLICABILITY

A composition exhibiting a liquid crystal composition value of positive Δε and stability to heat and light can be provided.

REFERENCE SIGNS LIST 100 first substrate
102 TFT layer
103 pixel electrode
104 passivation film
105 first alignment film
200 second substrate
201 planarization film (over coat layer)
202 black matrix
203 color filter
204 transparent electrode
205 second alignment film
301 sealing material
302 projection (columnar spacer)
303 liquid crystal layer
304 projection (columnar spacer)
401 mask pattern
402 resin layer

The invention claimed is:

1. A liquid crystal composition comprising three or more compounds represented by general formula (i) below, at least one compound represented by general formula (i'-2) below being contained as a compound represented by general formula (i) below, and further comprising at least one compound selected from the group consisting of a compound represented by general formula (I-1-1) below, a compound represented by general formula (I-1-2) below, a compound represented by general formula (IV-1) below, a compound represented by general formula (III) below, a compound represented by general formula (X-4) below, a compound represented by general formula (IX-1) below, a compound represented by general formula (XI-1) below, and a compound represented by general formula (VIII-1) below:

[Chem. 1]

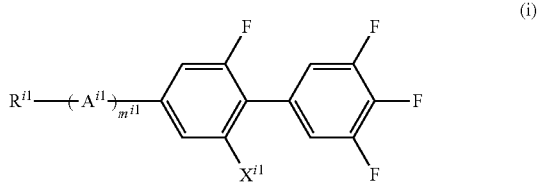 (i)

(In the formula, $R^{i1}$ represents an alkyl group having 1 to 8 carbon atoms, and one or nonadjacent two or more —$CH_2$— in the alkyl group may be each independently substituted by —CH=CH—, —C≡C—, —O—, —CO—, —COO—, or —OCO—; $m^{i1}$ represents 1 or 2; $A^{i1}$ represents a 1,4-cyclohexylene group or a 1,4-phenylene group which may have a fluorine atom or a chlorine atom substituted for a hydrogen atom, when $m^{i1}$ represents 1, $A^{i1}$ represents a 1,4-phenylene group which may have a fluorine atom or a chlorine atom substituted for a hydrogen atom, and when $m^{i1}$ represents 2 and a plurality of $A^{i1}$ are present, $A^{i1}$ may be the same or different; and $X^{i1}$ represents a hydrogen atom, a fluorine atom, or a chlorine atom)

[Chem. 2]

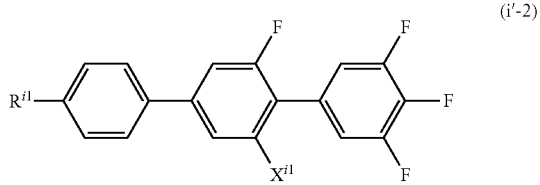 (i'-2)

(In the formula, $R^{i1}$ represents the same meaning as $R^{i1}$ in the general formula (i), and $X^{i1}$ represents a fluorine atom)

[Chem. 3]

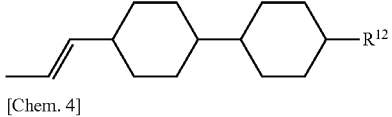

(I-1-1)

[Chem. 4]

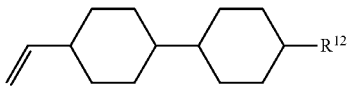

(I-1-2)

(In the formulae, $R^{12}$ each independently represent an alkyl group having 1 to 5 carbon atoms, an alkenyl group having 2 to 5 carbon atoms, or an alkoxy group having 1 to 5 carbon atoms)

[Chem. 5]

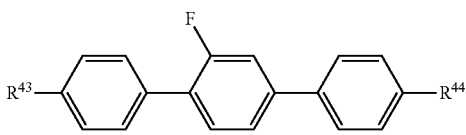

(IV-1)

(In the formula, $R^{43}$ and $R^{44}$ each independently represent an alkyl group having 1 to 5 carbon atoms or an alkenyl group having 2 to 5 carbon atoms)

[Chem. 6]

(III)

(In the formula, $R^{31}$ and $R^{32}$ each independently represent an alkenyl group having 2 to 5 carbon atoms, an alkyl group having 1 to 5 carbon atoms, or an alkoxy group having 1 to 4 carbon atoms)

[Chem. 7]

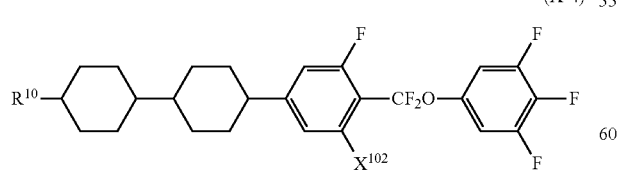

(X-4)

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms)

[Chem. 8]

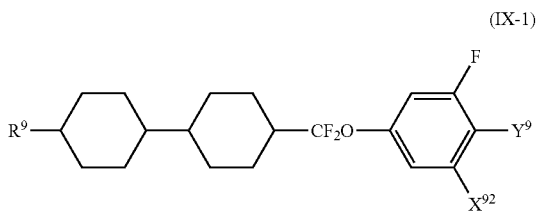

(IX-1)

(In the formula, $R^9$ represents an alkyl group having 1 to 5 carbon atoms, an alkenyl group having 2 to 5 carbon atoms, or an alkoxy group having 1 to 4 carbon atoms, $X^{92}$ represents a hydrogen atom or a fluorine atom, and $Y^9$ represents a fluorine atom or —$OCF_3$)

[Chem. 9]

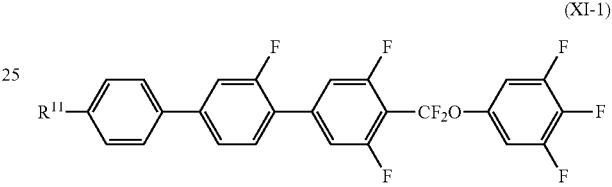

(XI-1)

(In the formula, $R^{11}$ represents an alkyl group having 1 to 5 carbon atoms, an alkenyl group having 2 to 5 carbon atoms, or an alkoxy group having 1 to 4 carbon atoms)

[Chem. 10]

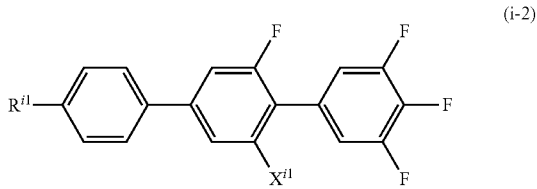

(VIII-1)

(In the formula, $R^8$ represents an alkyl group having 1 to 5 carbon atoms, an alkenyl group having 2 to 5 carbon atoms, or an alkoxy group having 1 to 4 carbon atoms).

2. The liquid crystal composition according to claim 1, comprising at least one compound represented by general formula (i-2) below and at least one compound represented by general formula (i-1) below as the compounds represented by the general formula (i):

[Chem. 11]

(i-2)

-continued (i-1)

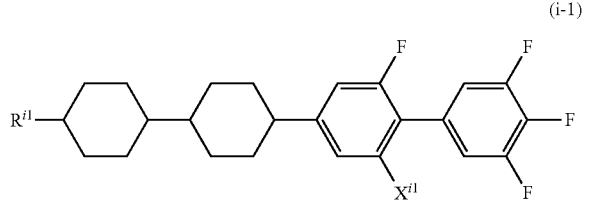

(In the formula (i-1), $R^{i1}$ represents the same meaning as $R^{i1}$ in the general formula (i), and $X^{i1}$ represents the same meaning $X^{i1}$ as in the general formula (i), and in the formula (i-2), $X^{i1}$ represents the same meaning as $R^{i1}$ in the general formula (i), and $X^{i1}$ represents a hydrogen atom or a chlorine atom).

3. The liquid crystal composition according to claim 2, comprising at least two compounds represented by general formula (i-2) as the compounds represented by the general formula (i).

4. The liquid crystal composition according to claim 1, further comprising a compound represented by general formula (L) below:

[Chem. 12]

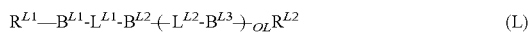

(L)

(In the formula, $R^{L1}$ and $R^{L2}$ each independently represents an alkyl group having 1 to 8 carbon atoms, and one or nonadjacent two or more —CH$_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of:
(a) a 1,4-cyclohexylene group (one —CH$_2$— or nonadjacent two or more —CH$_2$— present in the group may be substituted by —O—); and
(b) a 1,4-phenylene group (one —CH= or nonadjacent two or more —CH= present in the group may be substituted by —N=), and the group (a) and the group (b) may be each independently substituted by a cyano group, a fluorine atom, or a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and when OL is 2 or 3 and a plurality of $L^{L2}$ are present, $L^{L2}$ may be the same or different, and when OL is 2 or 3 and a plurality of $B^{L3}$ are present, $B^{L3}$ may be the same or different, the compound represented by the general formula (I-1-1), the compound represented by the general formula (I-1-2), the compound represented by the general formula (IV-1), and the compound represented by the general formula (III) being excluded).

5. The liquid crystal composition according to claim 1, further comprising a compound represented by general formula (M) below:

[Chem. 13]

(M)

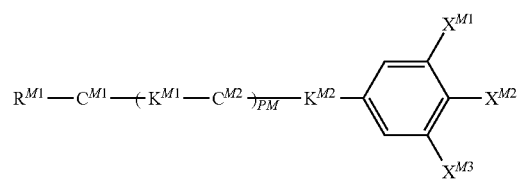

(In the formula, $R^{M1}$ represents an alkyl group having 1 to 8 carbon atoms, and one or nonadjacent two or more —CH$_2$— in the alkyl group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:
(d) a 1,4-cyclohexylene group (one —CH$_2$— or nonadjacent two or more —CH$_2$— present in the group may be substituted by —O— or —S—); and
(e) a 1,4-phenylene group (one —CH= or nonadjacent two or more —CH= present in the group may be substituted by —N=), and the group (d) and the group (e) may be each independently substituted by a cyano group, a fluorine atom, or a chlorine atom;

$K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;

when PM is 2, 3, or 4 and a plurality of $K^{M1}$ are present, $K^{M1}$ may be the same or different, and when PM is 2, 3, or 4 and a plurality of $C^{M2}$ are present, $C^{M2}$ may be the same or different;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, the compound represented by the general formula (i), the compound represented by the general formula (X-4), the compound represented by the general formula (IX-1), the compound represented by the general formula (XI-1), and the compound represented by the general formula (VIII-1) being excluded).

6. A liquid crystal display device comprising the liquid crystal composition according to claim 1.

7. An IPS device comprising the liquid crystal composition according to claim 1.

8. A FFS device comprising the liquid crystal composition according to claim 1.

* * * * *